(12) United States Patent
Redford et al.

(10) Patent No.: US 12,165,345 B2
(45) Date of Patent: Dec. 10, 2024

(54) PERCEPTION UNCERTAINTY

(71) Applicant: Five AI Limited, Bristol (GB)

(72) Inventors: John Redford, Cambridge (GB);
Sebastian Kaltwang, Cambridge (GB);
Jonathan Sadeghi, Bristol (GB);
Torran Elson, Bristol (GB)

(73) Assignee: Five AI Limited, Cambridge (GB)

( * ) Notice: Subject to any disclaimer, the term of this patent is extended or adjusted under 35 U.S.C. 154(b) by 490 days.

(21) Appl. No.: 17/441,276

(22) PCT Filed: Mar. 23, 2020

(86) PCT No.: PCT/EP2020/058038
§ 371 (c)(1),
(2) Date: Sep. 20, 2021

(87) PCT Pub. No.: WO2020/188121
PCT Pub. Date: Sep. 24, 2020

(65) Prior Publication Data
US 2022/0172390 A1 Jun. 2, 2022

(30) Foreign Application Priority Data

Mar. 21, 2019 (GB) .................................... 1903916
Mar. 21, 2019 (GB) .................................... 1903917
(Continued)

(51) Int. Cl.
*G06T 7/593* (2017.01)
*G06T 7/285* (2017.01)
(Continued)

(52) U.S. Cl.
CPC .............. *G06T 7/593* (2017.01); *G06T 7/285* (2017.01); *G06T 7/596* (2017.01); *G06T 7/74* (2017.01);
(Continued)

(58) Field of Classification Search
CPC ......... G06T 7/593; G06T 7/285; G06T 7/596; G06T 7/74; G06T 2207/10012;
(Continued)

(56) References Cited

U.S. PATENT DOCUMENTS

2018/0348374 A1* 12/2018 Laddha ................. G01S 17/931
2019/0188592 A1*  6/2019 Berntorp ............. G05B 13/048
(Continued)

OTHER PUBLICATIONS

International Search Report and Written Opinion for International Application No. PCT/EP2020/058038 mailed Jul. 30, 2020.
(Continued)

*Primary Examiner* — John B Strege
*Assistant Examiner* — Daniel C Chang
(74) *Attorney, Agent, or Firm* — Andrew J. Tibbetts; Samuel S. Stone; Greenberg Traurig, LLP

(57) ABSTRACT

A computer-implemented method of perceiving structure in an environment comprises steps of: receiving at least one structure observation input pertaining to the environment; processing the at least one structure observation input in a perception pipeline to compute a perception output; determining one or more uncertainty source inputs pertaining to the structure observation input; and determining for the perception output an associated uncertainty estimate by applying, to the one or more uncertainty source inputs, an uncertainty estimation function learned from statistical analysis of historical perception outputs.

20 Claims, 29 Drawing Sheets

(30) Foreign Application Priority Data

Mar. 22, 2019 (GB) ..................................... 1903960
Mar. 22, 2019 (GB) ..................................... 1903964

(51) Int. Cl.
    *G06T 7/73*     (2017.01)
    *G06V 20/56*     (2022.01)
    *G06V 20/58*     (2022.01)

(52) U.S. Cl.
    CPC .............. *G06V 20/56* (2022.01); *G06V 20/58* (2022.01); *G06T 2207/10012* (2013.01); *G06T 2207/20076* (2013.01); *G06T 2207/20081* (2013.01); *G06T 2207/20084* (2013.01); *G06T 2207/30252* (2013.01); *G06V 2201/07* (2022.01)

(58) Field of Classification Search
    CPC . G06T 2207/20076; G06T 2207/20081; G06T 2207/20084; G06T 2207/30252; G06V 20/56; G06V 20/58; G06V 2201/07
    See application file for complete search history.

(56) References Cited

U.S. PATENT DOCUMENTS

| | | | | |
|---|---|---|---|---|
| 2020/0005068 | A1* | 1/2020 | Ozog | G06T 7/74 |
| 2020/0326667 | A1* | 10/2020 | Ahuja | G06N 3/08 |
| 2021/0110089 | A1* | 4/2021 | Chen | G06T 7/0004 |

OTHER PUBLICATIONS

Blake et al., Estimating uncertainty in dense stereo disparity maps. Microsoft Research Report MSR-TR-2003-2093, 2003:17 pages.
Blundell et al., Weight uncertainty in neural networks, arXiv:1505.05424. May 2015: 10 pages.
Chen et al., Encoder-decoder with atrous separable convolution for semantic image segmentation. Proceedings of the European conference on computer vision (ECCV LNCS). 2018:18 pages.
Choi et al., Learning descriptor, confidence, and depth estimation in multi-view stereo. Proceedings of the IEEE Conference on Computer Vision and Pattern Recognition Workshops 2018:276-82.
Di Leo et al., Covariance propagation for the uncertainty estimation in stereo vision. IEEE Transactions on Instrumentation and Measurement. Mar. 17, 2011;60(5):1664-73.
Dillon et al., TensorFlow distributions, arXiv:1711.10604. Nov. 2017:13 pages.
Drory et al., Semi-global matching: a principled derivation in terms of message passing. German Conference on Pattern Recognition Sep. 2, 2014:12 pages.
Eigen et al., Depth map prediction from a single image using a multi-scale deep network. In Advances in neural information processing systems. arXiv:1406.2283v1. Jun. 2014: 9 pages.
Feng et al., Towards safe autonomous driving: Capture uncertainty in the deep neural network for lidar 3d vehicle detection. IEEE 2018 21st International Conference on Intelligent Transportation Systems (ITSC) Nov. 4, 2018:3266-73.
Gal et al., Dropout as a bayesian approximation: Representing model uncertainty in deep learning. International conference on machine learning. Jun. 11, 2016:10 pages.
Garg et al., Unsupervised CNN for single view depth estimation: Geometry to the rescue. European conference on computer vision Oct. 8, 2016:16 pages.
Gehrig et al., Exploiting traffic scene disparity statistics for stereo vision. Proceedings of the IEEE International Conference on Computer Vision and Pattern Recognition Workshops, 2014:674-81.
Gehrig et al., Priors for stereo vision under adverse weather conditions. Proceedings of the IEEE International Conference on Computer Vision Workshops 2013:238-45.
Geiger et al., Automatic camera and range sensor calibration using a single shot. IEEE international conference on robotics and automation May 14, 2012:8 pages.
Geiger et al., Efficient large-scale stereo matching. Computer Vision—ACCV Dec. 2010:15 pages.
Geiger et al., Vision meets robotics: The kitti dataset. The International Journal of Robotics Research. Sep. 2013;32(11):1231-7.
Godard et al., Unsupervised Monocular Depth Estimation with Left-Right Consistency. IEEE Conference on Computer Vision and Pattern Recognition (CVPR) Jul. 21, 2017:6602-11.
Green et al., Estimating the parameters of dynamical systems from Big Data using Sequential Monte Carlo samplers. Mechanical Systems and Signal Processing, Preprint 2017:24 pages.
Groenendijk et al., On the benefit of adversarial training for monocular depth estimation. Computer Vision and Image Understanding. arXiv:1910.13340v1 Oct. 2019:11 pages.
Haeusler et al., Ensemble learning for confidence measures in stereo vision. Proceedings of the IEEE International Conference on Computer Vision and Pattern Recognition Workshops, 2013:305-12.
Hastie et al., The elements of statistical learning. New York: Springer series in statistics; 2001:764 pages.
Hirschmüller et al., Evaluation of stereo matching costs on images with radiometric differences. IEEE transactions on pattern analysis and machine intelligence. Oct. 2008;18 pages.
Hirschmüller, Stereo processing by semiglobal matching and mutual information. IEEE Transactions on pattern analysis and machine intelligence. Dec. 2007:14 pages.
Humenberger et al, A census-based stereo vision algorithm using modified semi-global matching and plane fitting to improve matching quality. IEEE Computer Society Conference on Computer Vision and Pattern Recognition—Workshops 2010:8 pages.
Jaynes, Probability theory: The logic of science. Cambridge university press; Apr. 10, 2003:95 pages.
Kendall et al., What uncertainties do we need in Bayesian deep learning for computer vision?. Proceedings of the 31st International Conference on Neural Information Processing Systems Dec. 4, 2017:11 pages.
Kingma et al., Adam: A method for stochastic optimization. arXiv preprint arXiv:1412.6980. Dec. 22, 2014;9 pages.
Kondermann et al., Stereo ground truth with error bars. Asian conference on computer vision. Springer. Nov. 1, 2014:16 pages.
Liu et al., Neural rgb → d sensing: Depth and uncertainty from a video camera. Proceedings of the IEEE/CVF Conference on Computer Vision and Pattern Recognition 2019:10986-995.
Maddern et al., Real-time probabilistic fusion of sparse 3d lidar and dense stereo. 2016 IEEE/RSJ International Conference on Intelligent Robots and Systems (IROS). Oct. 9, 2016:2181-88.
Maskell, A Bayesian approach to fusing uncertain, imprecise and conflicting information. Information Fusion. Apr. 1, 2008;9(2):259-77.
Mayer et al., A large dataset to train convolutional networks for disparity, optical flow, and scene flow estimation. Proceedings of the IEEE conference on computer vision and pattern recognition. Jun. 2016:4040-48.
Patelli et al., OpenCossan 2.0: an efficient computational toolbox for risk, reliability and resilience analysis. Joint ICVRAM ISUMA Uncertainties conference, Apr. 8, 2018:12 pages.
Perrollaz et al., Probabilistic representation of the uncertainty of stereo-vision and application to obstacle detection. 2010 IEEE Intelligent Vehicles Symposium Jun. 2010:6 pages.
Pfeiffer et al., Exploiting the power of stereo confidences. In Proceedings of the IEEE International Conference on Computer Vision and Pattern Recognition, Jun. 2013:4321-28.
Qi et al., Frustum pointnets for 3d object detection from rgb-d data. Proceedings of the IEEE conference on computer vision and pattern recognition. Jun. 2018:918-27.
Quiñonero-Candela et al., Evaluating predictive uncertainty challenge. Machine Learning Challenges Workshop. Springer. Apr. 11, 2005:1-27.
Ross, Introduction to Probability and Statistics for Engineers and Scientists. Academic Press; Aug. 14, 2014;730 pages.

(56) References Cited

OTHER PUBLICATIONS

Sandler et al., Mobilenetv2: Inverted residuals and linear bottlenecks. Proceedings of the IEEE conference on computer vision and pattern recognition 2018:4510-20.

Scharstein et al., Semi-Global Stereo Matching with Surface Orientation Priors. arXiv preprint arXiv:1712.00818. Dec. 3, 2017:12 pages.

Seki et al., Patch based confidence prediction for dense disparity map. Proceedings of the British Machine Vision Conference Sep. 2016:1-13.

Shaked et al., Improved stereo matching with constant highway networks and reflective confidence learning. Proceedings of the IEEE conference on computer vision and pattern recognition 2017:4641-50.

Spyropoulos et al., Ensemble classifier for combining stereo matching algorithms. IEEE International Conference on 3D Vision, Oct. 19, 2015:73-81.

Thrun et al., Probabilistic Robotics. MIT press, 2005:492 pages.

Tran et al., Deep probabilistic programming. arXiv preprint arXiv:1701.03757. Mar. 7, 2017:18 pages.

Uhrig et al., Sparsity invariant cnns. IEEE International conference on 3D Vision (3DV). Oct. 2017:10 pages.

Wang et al., Image quality assessment: from error visibility to structural similarity. IEEE transactions on image processing. Apr. 13, 2004;13(4):600-12.

Weber et al., A very fast census-based stereo matching implementation on a graphics processing unit. IEEE 12th International Conference on Computer Vision Workshops, ICCV Workshops Nov. 2009:9 pages.

Wei et al., A Monte Carlo implementation of the EM algorithm and the poor man's data augmentation algorithms. Journal of the American statistical Association. Sep. 1, 1990;85(411):699-704.

Zabih et al., Non-parametric local transforms for computing visual correspondence. European conference on computer vision May 1994:8 pages.

PCT/EP2020/058038, Jul. 30, 2020, International Search Report and Written Opinion.

* cited by examiner

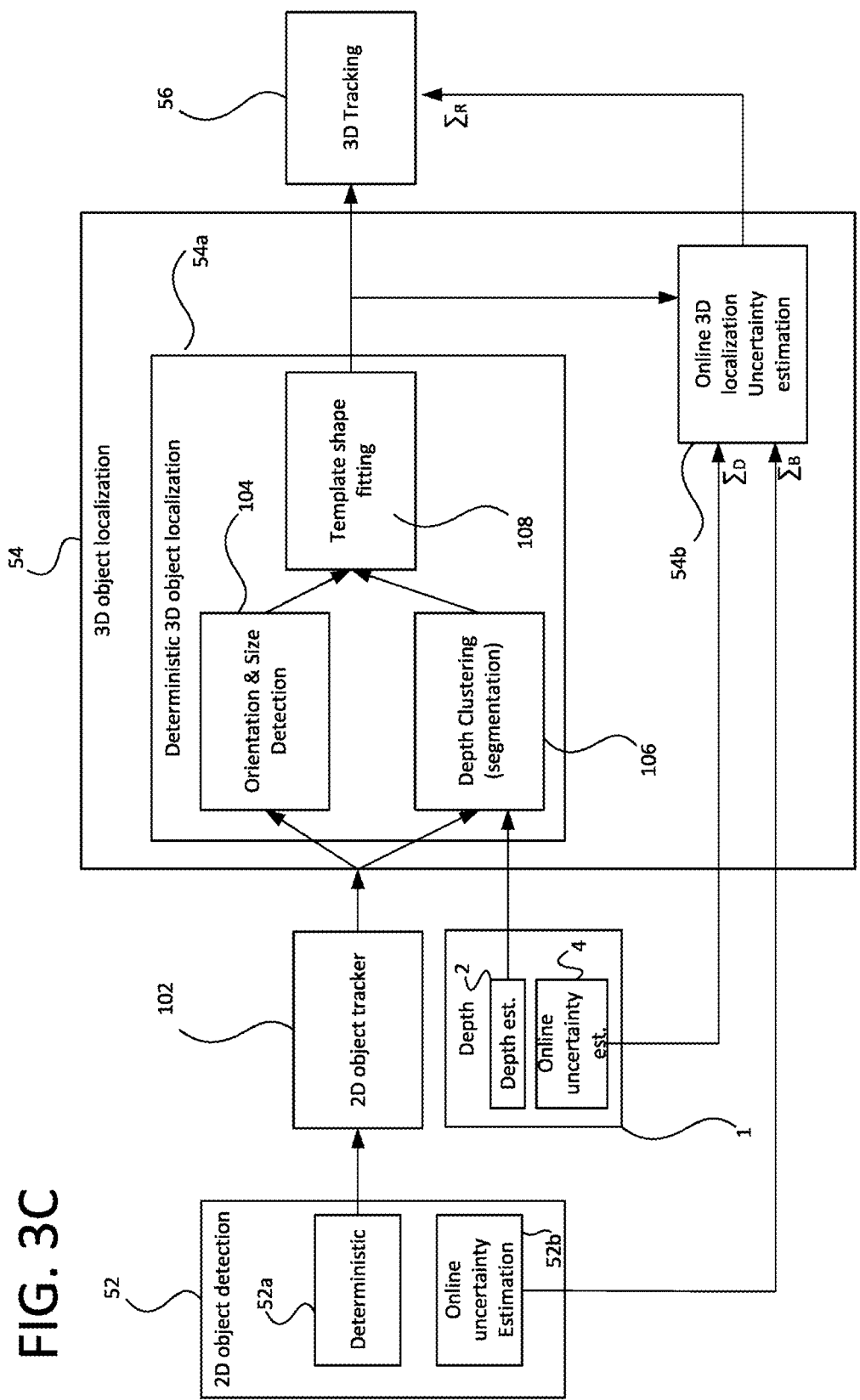

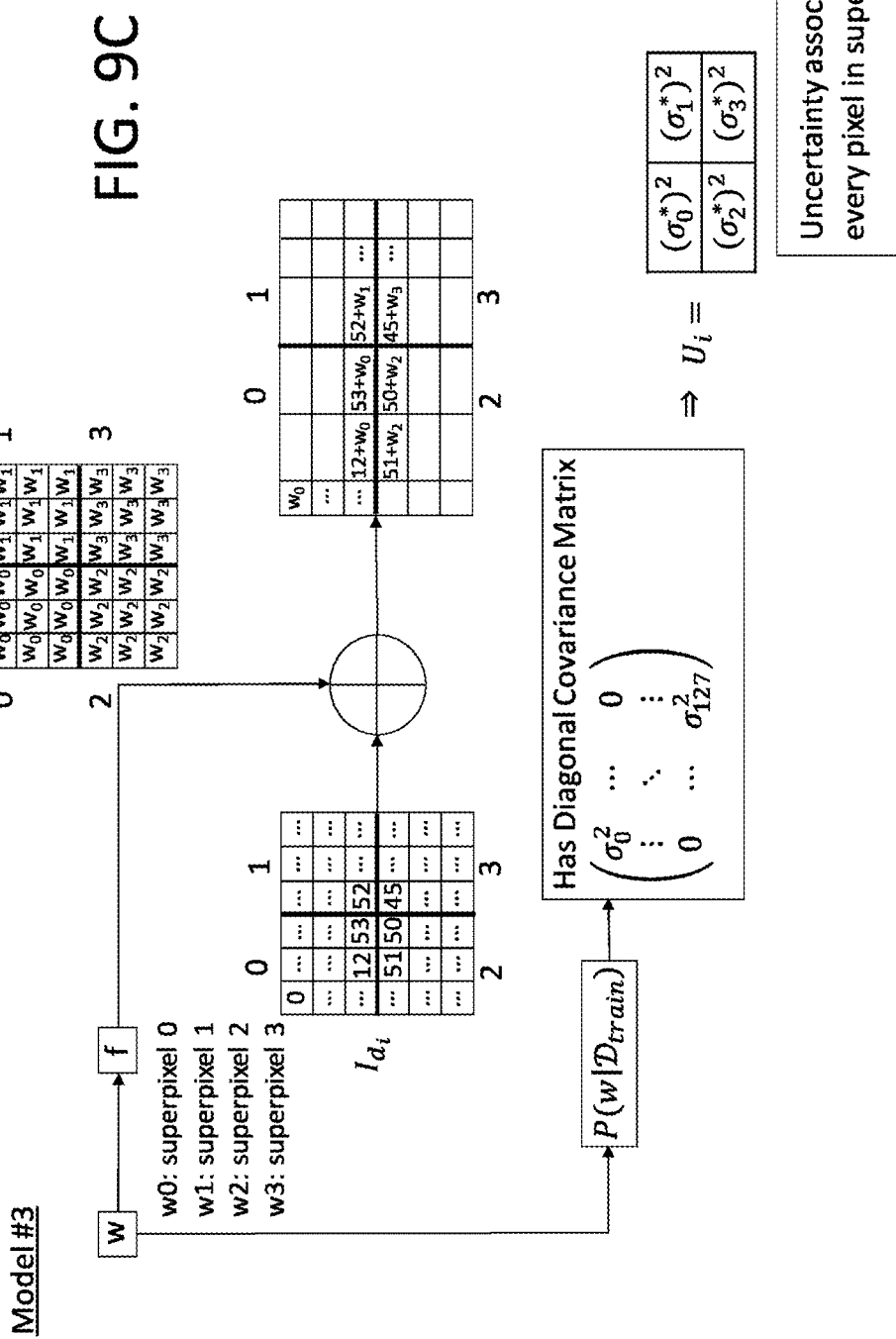

(a) Left Rectified Image (b) Right Rectified Image (c) SGM Depth Map

Mean Squared Euclidian Distance per disparity for Stereo SGM.

Mean Squared Euclidian Distance per disparity for Mono CNN.

(a) Standard deviation map for Model 2.

(b) Standard deviation map for Model 3.

2D object detection:

$p(\Delta x_{UL}, \Delta y_{UL}, \Delta x_{BR}, \Delta y_{BR}) \sim N(0, \Sigma_B)$
Probability distribution over four random variables (defining corner point coordinates)

Depth Estimation:

$p(\Delta D_{0,0}, \ldots \Delta D_{J,0}, \Delta D_{0,1}, \ldots \Delta D_{JK}) \sim N(0, \Sigma_D)$
Probability distribution over JK random variables (depth map pixels)

PERCEPTION UNCERTAINTY

RELATED APPLICATIONS

This application is a national stage filing under 35 U.S.C. § 371 of International Patent Application Serial No. PCT/EP2020/058038, filed Mar. 23, 2020, which claims priority to: United Kingdom patent application number GB 1903960.1, filed Mar. 22, 2019; United Kingdom patent application number GB 1903964.3, filed Mar. 22, 2019; United Kingdom patent application number 1903916.3, filed Mar. 21, 2019; and United Kingdom patent application number 1903917.1, filed Mar. 21, 2019. Each of the foregoing applications is incorporated by reference herein in its entirety.

TECHNICAL FIELD

The present disclosure relates generally to the estimation of uncertainty in a perception pipeline. Such techniques can be usefully applied in many contexts such as (but not limited to) autonomous vehicles.

BACKGROUND

Various sensor systems are available to estimate depth. The most common are optical sensors, LiDAR, and RADAR. Stereo vision is the estimation of depth from a pair of optical cameras (by contrast, monocular vision requires only one camera).

Stereo vision and other depth perception methods has many useful applications, one example being robotics. For example, mobile robotic systems that can autonomously plan their paths in complex environments are becoming increasingly more prevalent. An example of such a rapidly emerging technology is autonomous vehicles that can navigate by themselves on urban roads. An autonomous vehicle, also known as a self-driving vehicle, refers to a vehicle which has a sensor system for monitoring its external environment and a control system that is capable of making and implementing driving decisions automatically using those sensors. This includes in particular the ability to automatically adapt the vehicle's speed and direction of travel based on inputs from the sensor system. A fully autonomous or "driverless" vehicle has sufficient decision-making capability to operate without any input from a human driver. However the term autonomous vehicle as used herein also applies to semi-autonomous vehicles, which have more limited autonomous decision-making capability and therefore still require a degree of oversight from a human driver.

Other mobile robots are being developed, for example for carrying freight supplies in internal and external industrial zones. Such mobile robots would have no people on board. Autonomous air mobile robots (drones) are also being developed. The sensory input available to such a mobile robot can often be noisy. Typically, the environment is perceived through sensors such as based on stereo vision or LiDAR, requiring not only signal processing for smoothing or noise removal, but also more complex "object finding" algorithms, such as for the drivable surface or other agents in the environment.

For example, in an autonomous vehicle (AV) or other robotic system, stereo vision can be the mechanism (or one of the mechanisms) by which the robotic system observes its surroundings in 3D. In the context of autonomous vehicles, this allows a planner of the AV to make safe and appropriate driving decisions in a given driving context. The AV may be equipped with one or multiple stereo camera pairs for this purpose.

In stereo vision, depth is estimated as an offset (disparity) of features on corresponding epipolar lines between left and right images produced by an optical sensor (camera) pair. The depth estimate for a stereo image pair is generally in the form of a disparity map. The extracted depth information, together with the original image data, provide a three-dimensional (3D) description of a scene captured in the stereo images.

Stereo vision is analogous to human vision, so it is intuitive to work with compared to other sensors. It is also relatively inexpensive and can provide dense depth measurement across a whole scene. By contrast, depth estimates from RADAR are often only available for single objects rather than a whole scene, and LIDAR can be expensive and produces sparse measurements.

A stereo image pair consists of left and right images captured simultaneously by left and right image capture units in a stereoscopic arrangement, in which the image capture units are offset from each other with overlapping fields of views. This mirrors the geometry of human eyes which allows humans to perceive structure in three-dimensions (3D). By identifying corresponding pixels in the left and right images of a stereo image pair, the depth of those pixels can be determined as a relative disparity they exhibit. In order to do this, one of the images of a stereoscopic image pair is taken as a target image and the other as a reference image. For each pixel in the target image under consideration, a search is performed for a matching pixel in the reference image. Matching can be evaluated based on relative intensities, local features etc. This search can be simplified by an inherent geometric constraint, namely that, given a pixel in the target image, the corresponding pixel will be appear in the reference image on a known "epipolar line", at a location on that line that depends on the depth (distance from the image capture units) of the corresponding real-world scene point.

For an ideal stereoscopic system with vertically-aligned image capture units, the epipolar lines are all horizontal such that, given any pixel in the target image, the corresponding pixel (assuming it exists) will be located in the reference image on a horizontal line (x-axis) at the same height (y) as the pixel in the target image. That is, for perfectly aligned image capture units, corresponding pixels in the left and right images will always have the same vertical coordinate (y) in both images, and the only variation will be in their respective horizontal (x) coordinates. This may not be the case in practice because perfect alignment of the stereo cameras is unlikely. However, image rectification may be applied to the images to account for any misalignment and thereby ensure that corresponding pixels are always vertically aligned in the images. Hence, by applying image rectification/pre-processing as necessary, the search for a matching pixel in the reference image can conveniently be restricted to a search in the reference image along the horizontal axis at a height defined by the current pixel in the target image. Hence, for rectified image pairs, the disparity exhibited by a pixel in the target image and a corresponding pixel in the reference image respectively can be expressed as a horizontal offset (disparity) between the locations of those pixels in their respective images.

For the avoidance of doubt, unless otherwise indicated, the terms "horizontal" and "vertical" are defined in the frame of reference of the image capture units: the horizontal plane is the plane in which the image capture units substantially lie, and the vertical direction is perpendicular to this plane. By this definition, the image capture units always have a vertical offset of zero, irrespective of their orientation relative to the direction of gravity etc.

SUMMARY

A core problem addressed by the present disclosure is that of uncertainty in a perception pipeline. Such pipelines may be used in robotic systems, such as autonomous vehicles or other mobile robots, to process sensor inputs for the purpose of perceiving structure in an environment of the robotic system. A robust estimate of the uncertainty associated perception inputs/outputs has various practical uses, including by way of example, the following:

1. Robotic decision-making: Such uncertainty estimates can feed into higher-level processing, such as robotic planning and decision making; for example, path planning in an autonomous vehicle or other mobile robot. In the context of autonomous vehicles, providing a robust assessment of the level of uncertainty associated with an output of the perception pipeline—which translates to the level of uncertainty the AV has about its surroundings—allows critical driving decisions to be made in a way that properly accounts for the level of uncertainty associated with the observations on which those decisions are based.
2. Sensor fusion: a statistically-robust estimate of the uncertainty associated with perception results allows those results to be fused in a way that respects their allocated levels of uncertainty (for example, using a Kalman filter or other Bayes filter). This applies generally to the fusion of results derived from different sensor modalities, the same sensor modality but different sensors and/or pertaining to different time instants.
3. Sensor calibration: uncertainty in the outputs associated with a sensor or sensor system, as determined through statistical analysis, can be used to determine when sensor recalibration may be necessary (e.g. when the level of uncertainty becomes unacceptably high).

By way of example, a perception pipeline may have at least one depth input for receiving depth information derived from a sensor modality such as stereo depth, LiDAR, RADAR etc. Such depth information may for example be used as an input to 3D object localization (to determine one or more coordinates of a detected object in 3D space, such as location, orientation size etc.). This may be one of multiple inputs to 3D object localization. For example, depth may be used in conjunction with 2D object detection results (e.g. detected 2D bounding boxes).

The term perception output is generally used herein to refer to the output of a perception component and the term structure observation input is generally used to refer to an input to a perception component, on which its perception output is based. As will be appreciated, this is highly context dependent, and a perception output of one perception component may be provided as a structure observation input to another perception component. A perception output may also serve as an input to a higher-level processing component, such as an autonomous vehicle or other robotic planner.

A first aspect disclosed herein provides a computer-implemented method of perceiving structure in an environment, the method comprising the following steps: receiving at least one structure observation input pertaining to the environment; processing the at least one structure observation input in a perception pipeline to compute a perception output; determining one or more uncertainty source inputs pertaining to the structure observation input; and determining for the perception output an associated uncertainty estimate by applying, to the one or more uncertainty source inputs, an uncertainty estimation function learned from statistical analysis of historical perception outputs.

In embodiments, the method may comprise the step of executing a robotic decision-making process in dependence on the structure perception output and the associated uncertainty estimate.

The robotic decision-making process may be executed to plan at least one mobile robot path in dependence on the perception output and the associated uncertainty estimate.

The perception output and the associated uncertainty may be used to estimate a risk of collision for the mobile robot path.

The structure observation input may comprise a depth estimate.

The depth estimate may be a stereo depth estimate computed from a stereo image pair.

The depth estimate may be in the form of a depth map.

The perception output may be a 3D object localization output computed by applying 3D object localization processing to the depth estimate.

The 3D object localization may comprise at least one of: orientation detection, size detection, and 3D template fitting.

The perception input may be computed based on at least one additional structure observation input.

The additional structure observation input may be a 2D object detection result.

The 2D object detection result may be computed by applying 2D object recognition to at least one image of the stereo image pair.

The uncertainty estimate may be outputted by the uncertainty estimation function in the form of a covariance or other distribution parameter(s) defining a probabilistic uncertainty distribution for the perception output, whereby the covariance or other distribution parameter(s) varies in dependence on the one or more uncertainty source inputs.

The method may comprise the steps of: receiving at least one additional perception output and an associated uncertainty estimate; and computing a fused perception output based on the perception outputs according their associated uncertainty estimates.

The uncertainty estimate associated with the additional perception output may be in the form of a distribution parameter(s) and the fused perception output may be computed by applying a Bayes filter to the perception outputs according to their defined probabilistic uncertainty distributions.

The uncertainty estimate for the additional perception output may be a covariance and the fused perception output may be computed by applying a Kalman filter to the perception outputs according to their respective covariances.

The robotic decision-making process may be executed based on the fused perception output.

The uncertainty estimation function may be embodied as a lookup table containing one or more uncertainty estimation parameters learned from the statistical analysis.

The one or more uncertainty source inputs may comprise at least one of: an input derived from the structure observation input, and an input derived from the perception output.

The one or more uncertainty source inputs may comprise an uncertainty estimate provided for the structure observation input.

The one or more uncertainty source inputs may comprise at least one of: an input derived from the additional structure observation input, and an uncertainty estimate provided for the additional structure observation input.

The one or more uncertainty source inputs may comprise one or more attributes of a detected object and the estimated uncertainty pertains to the detected object.

The one or more detected object attributes may comprise a depth of the detected object derived from the depth estimate.

The one or more detected object attributes may comprise at least one detected object coordinate.

The at least one detected object coordinate may be derived from at least one of the 3D object localization output or the 2D object detection result.

The at least one detected object coordinate may comprise a position, orientation and/or size coordinate.

The one or more detected object attributes may comprise at least one of: an object type, a measure of object occlusion, and an indication of object motion.

The one or more uncertainty source inputs may comprise: a lighting, weather and/or other environmental condition; and/or pixel location information.

The method may comprise the step of providing a 3D object tracker output comprising or based on the fused perception output.

The robotic decision-making process may be executed based on the 3D object tracker output.

The perception output and the additional perception output may be derived from different sensor modalities, or from the same sensor modality but for different time instants and/or different sensors.

For example, the additional perception output may be a derived from LiDAR or RADAR, or from a second stereo image pair captured at a different time instant and/or by a different optical sensor pair.

The 3D localization processing may be based on at least one of segmentation and depth clustering.

A second aspect disclosed herein provides a computer-implemented method of processing stereo image pairs to determine 3D object localization outputs, the method comprising the following steps: receiving at least one stereo image pair; processing the stereo image pair to extract a stereo depth estimate therefrom; determining an estimated uncertainty for the stereo depth estimate; applying 3D object localization processing to the stereo depth estimate, so as to compute a 3D object localization output therefrom; and determining an estimated uncertainty for the 3D object localization output based on the estimated uncertainty for the stereo depth estimate.

In embodiments, the method may comprise: applying 2D object detection to at least one of: the stereo depth estimate, and at least one image of the stereo image pair, so as to compute a 2D object detection output; determining an estimated uncertainty for the 2D object detection output; wherein the estimated uncertainty for the 3D object localization output is determined based on the estimated uncertainties for the stereo depth estimate and the 2D object detection output.

The estimated uncertainty may be used to learn one or more uncertainty estimation parameters of an uncertainty estimation function for processing, in an online processing phase, at least one uncertainty source input according to the one or more parameters to determine an online uncertainty estimate. For example, in an offline learning phase.

Multiple 3D object localization uncertainties may be determined from multiple stereo image pairs, and the one or more uncertainty estimation parameters may be learned so as to fit the uncertainty estimation function to the multiple 3D object localization uncertainties.

The estimated uncertainty for the stereo depth estimate may be provided as an uncertainty source input to an uncertainty estimation function to compute the uncertainty estimate for the 3D object localization output as an output of the uncertainty estimation function. For example in an online processing phase.

The estimated uncertainty for the 2D object detection output may be provided as a second uncertainty source input to the uncertainty estimation function to compute the uncertainty estimate for the 3D object localization output as an output of the uncertainty estimation function.

A third aspect disclosed herein provides a computer-implemented method of processing stereo image pairs to determine 3D object localization outputs, the method comprising the following steps: receiving at least one stereo image pair; processing the stereo image pair to extract a stereo depth estimate therefrom; determining an estimated uncertainty for the stereo depth estimate; receiving at least one additional structure observation input associated with the stereo image pair and an uncertainty estimate for the additional structure observation output; and combining the stereo depth estimate and the at least one additional structure observation input based on their respective uncertainty estimates.

The additional structure observation input may be a second stereo depth estimate extracted from a second stereo image pair, which was captured at a different time instant and/or by a different optical sensor pair than the stereo image pair; or a second depth estimate of a sensor modality other than stereo depth, for example LiDAR or RADAR.

Each of the uncertainty estimates may be in the form of a probabilistic uncertainty distribution parameter(s), for example a covariance, and the stereo depth estimate and the additional structure observation input are combined by applying thereto a Bayes filter according to their respective uncertainty distribution parameter(s), for example a Kalman filter applied according to their respective covariances.

A fourth aspect disclosed herein provides a computer implemented method of planning a path for a mobile robot, the method comprising: receiving at least one stereo image pair captured from an environment of the mobile robot; processing the stereo image pair to extract a stereo depth estimate therefrom; determining an estimated uncertainty for the stereo depth estimate; determining a risk of collision for at least one candidate path through the mobile robot environment in dependence on the stereo depth estimate and the estimated uncertainty for the stereo depth estimate.

For example, 3D object localization may be applied to the depth estimate to compute a probabilistic obstacle position distribution for at least one detected obstacle based on the estimated depth uncertainty, the probabilistic obstacle position function being used to compute the risk of collision.

The path planning may be performed as disclosed in International Patent Application Nos. PCT/EP2019/054910 and PCT/EP2019/054911, each of which is incorporated herein by reference in its entirety.

A fifth aspect provides a computer-implemented method of processing sensor data for perceiving structure in an environment, the method comprising the following steps as implemented in a computer system: processing the sensor data to determine at least one probabilistic structure observation as an observed structure distribution; wherein the computer system executes a perception function for: receiving, as at least one input, a structure observation, and computing a perception output based on the at least one input, and the method further comprises: determining a set of input samples, each input sample comprising a simulated structure observation sampled based on the structure distribution respectively; providing each input sample to the perception function to compute a sampled perception output therefrom; and applying a statistical analysis to the sampled perception outputs, and thereby determining one or more uncertainty estimation parameters for estimating the uncertainty in perception outputs of the perception function.

The processing step may comprise processing at least a first portion of the sensor data to determine a first type of probabilistic structure observation as a first observed structure distribution, and processing at least a second portion of the sensor data to determine a second type of probabilistic structure observation as a second observed structure distribution; the perception function for: receiving, as first and a second inputs, structure observations of the first and second types respectively, and computing a perception output by combining the first and second inputs; wherein each input sample comprises a simulated structure observation of the first type and a simulated structure observation of the second type, as sampled based on the first and second observed structure distributions respectively.

The probabilistic structure observation may be a probabilistic depth estimate or a probabilistic 2D object detection result.

The first type of probabilistic structure observation may be a probabilistic depth estimate and the second type of probabilistic structure observation may be a probabilistic 2D object detection result.

The perception function may be a 3D object localization function.

The perception function may be deterministic such that each perception output is deterministic.

The or each probabilistic structure observation may be determined by computing a deterministic structure observation and determining an uncertainty estimate for the deterministic structure observation, in the form of one or more distribution parameters of the observed structure distribution.

The one or more uncertainty estimation parameters may define an uncertainty estimation function for determining an uncertainty estimate based on one or more uncertainty source inputs, wherein the statistical analysis may be performed to fit the uncertainty parameters to the sampled perception outputs.

Each of at least some of the sampled perception outputs may denote at least one detected object, and the one or more uncertainty source inputs may comprise one or more detected object attributes.

The one or more detected object attributes may comprise a depth of the detected object.

The one or more detected object attributes may comprise at least one of: an object type, a measure of object occlusion, and an indication of object motion.

The one or more detected object attributes may comprise at least one detected object coordinate.

The at least one detected object coordinate may comprise a position, orientation and/or size coordinate.

The one or more uncertainty source inputs may comprise: a lighting, weather and/or other environmental condition; and/or pixel location information.

The one or more uncertainty source inputs may comprise an uncertainty estimate provided for the input or at least one of the first and second inputs.

The uncertainty estimation function may output the uncertainty estimate in the form of a covariance or other uncertainty distribution parameter(s).

The uncertainty parameters may be fit to the sampled perception outputs by: fitting at least one distribution to each of at least some of the sampled perception outputs, determining an uncertainty estimate for that sampled output based on the one or more uncertainty estimation parameters, the uncertainty estimate denoting at least one predicted distribution; and adapting the one of more uncertainty estimation parameters to minimize a difference between the fitted distributions and the predicted distributions determined for the sampled perception outputs.

The method may comprise, in fitting the uncertainty parameters to the sampled perception outputs: determining for that sampled perception output one or more uncertainty source inputs, and determining the uncertainty estimate for that sampled output by applying the uncertainty estimation function to those one or more uncertainty source inputs.

Each of the at least some sampled perception outputs may denote at least one detected object, and a distribution may be fitted to each of those sampled perception outputs for each detected object.

The input samples may be determined by applying Monte Carlo sampling to the perception function based on the or each observed structure distribution.

The sensor data may comprise depth data derived from multiple sensor modalities, such as two or more or: stereo depth, RADAR, LiDAR.

The sensor data may comprise depth data and optical sensor data.

A sixth aspect provides a computer-implemented method of configuring a mobile robot to perform real-time stereo depth uncertainty estimation, the method comprising: receiving historical stereo depth estimates computed from stereo image pairs; applying a statistical analysis to the historical stereo depth estimates, in order to determine one or more uncertainty estimation parameters from the historical stereo depth estimates; storing the one or more uncertainty estimation parameters in memory of the mobile robot accessible for use by at least one processor of the mobile robot, in a real-time processing phase, in determining uncertainty estimates for stereo depth estimates computed by a stereo depth estimator of the mobile robot in the real-time processing phase.

A seventh aspect provides a computer-implemented method of detecting misalignment in a stereo pair of optical sensors of a mobile robot, the method comprising: receiving historical stereo depth estimates which have been computed, by at least one processor of the mobile robot, from stereo image pairs, as captured by a pair of optical sensors of the mobile robot; applying a statistical analysis to the historical stereo depth estimates; and detecting a misalignment of the stereo pair of optical sensors based on the statistical analysis of the depth estimates.

The statistical analysis may be applied in an offline processing phase, for example.

The method may be executed by the at least one processor of the mobile robot, so as to perform the statistical analysis on-board the mobile robot itself.

The offline processing phase may be executed when the mobile robot is operating in a diagnostics mode.

The statistical analysis may measure discrepancies between the historical stereo depth estimates and corresponding depth ground truth, in the form of simultaneously captured depth data of a different sensor modality, such as LIDAR or RADAR.

The statistical analysis may comprise an unsupervised machine learning process applied to determine (the) one or more uncertainty estimation parameters from the historical stereo depth estimates without ground truth depth data.

The statistical analysis may be re-performed at different times based on a set of most-recent historical stereo depth estimates.

The method may comprise the step of instigating a recalibration procedure in response to the detected misalignment, The recalibration procedure may be instigated in response to determining the detected misalignment exceeds a threshold.

The recalibration may be an automatic or manual recalibration.

The recalibration procedure may comprise adapting one or more image rectification parameters of a stereo depth estimator of the mobile robot to compensate the detected misalignment.

The one or more uncertainty estimation parameters may be stored in a lookup table which operates as a real-time uncertainty estimation function.

The one or more uncertainty estimation parameters may have been learned by applying any of the above mentioned methods of learning uncertainty estimation parameter(s).

Another aspect provides a processing system comprising a memory and one or more processors configured to execute computer code stored in the memory which, when executed, causes the one or more processors to carry out any of the method steps disclosed herein.

For example, the computer code may cause the one or more processors to implement any of the training steps disclosed herein, in order to learn one or more uncertainty estimation parameters of an uncertainty estimation function and store the one or more uncertainty estimation parameters in the memory; and in an online processing phase, implement any of the uncertainty estimation steps disclosed herein, using the learned one or more uncertainty estimation parameters stored in the memory to implement the uncertainty estimation function in the online processing phase.

The uncertainty estimation function may be implemented as a lookup table containing the one or more uncertainty estimation parameters, for example in an autonomous vehicle or other mobile robot.

The processing system may be embodied in a simulator.

Another aspect provides a computer program product comprising executable code which is configured, when executed on one or more processors, to implement any of the steps disclosed herein.

BRIEF DESCRIPTION OF FIGURES

For a better understanding of the present invention, and to show how embodiments of the same may be carried into effect, reference is made to the following figures in which:

FIG. 3C shows further details of an AV perception pipeline to demonstrate how uncertainty may be estimated for inter-dependent perception components;

FIGS. 9A-D schematically illustrate the principles of different perturbation models (models 1 to 4 respectively);

DETAILED DESCRIPTION

Figure 1:
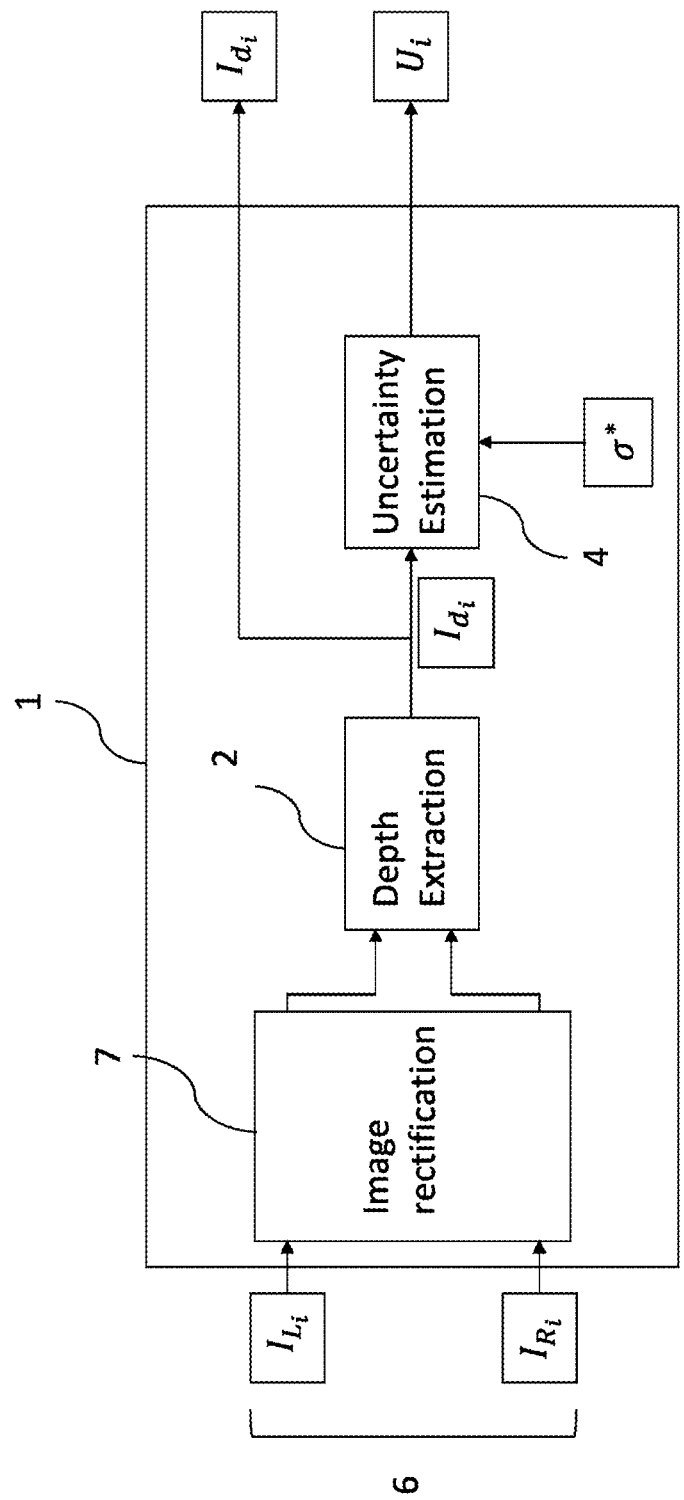
FIG. 1 shows a schematic function block diagram of a stereo image processing system.

A robotic system, such as an autonomous vehicle or other mobile robot, relies on sensor inputs to perceive its environment and thus make informed decisions. For autonomous vehicles, the decisions they take are safety critical. However, sensors measure a physical system and thus are inherently imperfect, they have uncertainty. As a consequence, the robotic system's perception is uncertain. Decisions should therefore be made by taking the uncertainty into account. This paradigm can be described as probabilistic robotics or, in a more general sense, decision making under uncertainty.

Propagating uncertainty though a robotic perception pipeline in a statistically robust manner, taking into account the effect of multiple sources of uncertainty where appropriate, facilitates robust decision making under uncertainty. In the context of autonomous vehicles in particular, this directly translates into a safe and appropriate driving decisions. Autonomous vehicles are presented as an example context in the description below, however it will be appreciated that the same benefits apply more generally in the context of probabilistic robotics based on stereo depth estimation and/or other perception modalities (such as 2D or 3D object detection/localisation). Reliable depth uncertainty estimates can be usefully applied in other practical contexts.

Stereo depth is referred to by way of example at various instances, but it will be appreciated that the principles disclosed herein apply equally to other sensor modalities.

Stereo depth estimation allows the locations of objects in 3D space to be determined. However, many methods do not provide uncertainty in their depth estimates. This prevents the application of Bayesian techniques, such as Bayesian Sequential Tracking, data fusion and calibration checks, to algorithms using stereo depth as input. Other methods do provide uncertainty in their depth estimates, but they are too slow for real-time applications.

By contrast, the described embodiments of the invention provide a method for quantifying the uncertainty in disparity estimates from stereo cameras in real-time. Moreover, the techniques herein can be applied to perception modalities other than stereo depth.

The uncertainty is computed as a covariance, which allows it to be propagated with Bayesian methods (Bayesian filtering); in turn, allowing it to be used in a probabilistic robotics setting (see below for further details).

This reflects a second important application of "sensor fusion", where multiple noisy sensor measurements are fused in a way that respects their relative levels of uncertainty. A Kalman filter or other Bayesian fusion component may be used to fuse sensor measurements in real-time, but in order to do so effectively, it requires robust, real-time estimates of uncertainty to be provided for each sensor signal to be fused.

For example, distance estimates may be necessary to perceive the static environment and dynamic objects moving in the scene. Distances can be determined from active sensors, such as LiDAR and RADAR, or passive sensors such as monocular or stereo cameras. A robotic system, such as an autonomous vehicle, typically has numerous sensor modes. Quantifying the uncertainty in each of these modes allows the Bayesian fusion of different sensor modalities, which can reduce the overall uncertainty in estimated distances.

Bayesian fusion may require uncertainty estimates in the form of covariances. The present method allows for direct computation of a stereo depth covariance directly, hence a benefit of the method is that is provides a depth uncertainty estimate in a form that can be directly input (without conversion) to a Kalman filter or other Bayesian fusion component (in contrast to existing confidence-based methods, as outlined above). In other words, the method directly provides the uncertainty estimate in the form that is needed for Bayesian sensor fusion in order to be able to fuse it effectively with other measurements in a way that respects uncertainty.

Note that, whilst references may be made herein to Bayesian propagation of uncertainty or similar based on covariances, the techniques disclosed herein allow uncertainty to be propagated by specifying covariances on measurements more generally. More generally, quantifying the uncertainty allows Bayesian uncertainty propagation and defining covariances allows tractable methods to be applied.

As a third example application, statistical analysis of depth estimates from a stereo optical sensor pair may be used to facilitate optical sensor calibration scheduling, as describe later.

FIG. 1 shows a schematic function block diagram of a stereo image processing system 1. The stereo image processing system 1 is shown to comprise an image rectifier 7, a stereo depth estimator 2 and a stereo depth uncertainty estimator 4. The latter may be referred to simply as the depth estimator 2 and the uncertainty estimator 4 respectively.

The image rectifier 7, depth estimator 2 and the uncertainty estimator 4 are functional components of the stereo image processing system 1 which can be implemented at the hardware level in different ways. For example, the functionality of the stereo image processing system 1 can be implemented in software, i.e. by computer code executed on a processor or processors such as a CPU, accelerator (e.g. GPU) etc., or in hardware (e.g. in an FPGA fabric and/or application specific integrated circuit (ASIC)), or using a combination of hardware and software.

The depth estimator 2 receives rectified stereo image pairs and processes each stereo image pair 6 to compute a depth estimate therefrom in the form of a depth image. Each stereo image pair 6 consists of a left and right image represented in mathematical notation as $I_{L_i}$ and $I_{R_i}$ respectively. The depth estimate extracted from that pair is in the form of a disparity map represented by $I_{d_i}$.

The image rectifier 7 applies image rectification to the images before the depth estimation is performed to account for any misalignment of the image capture units 8L, 8R. The image rectifier 7 may be re-calibrated intermittently as needed to account for changes in the misalignment, as described later.

There are various known algorithms for stereo image processing. State of the art performance in stereo depth estimation is mainly achieved by the application of Deep Neural Networks, however these neural networks can be time consuming to run online and require power-heavy hardware. Alternative approaches, which do not make use of machine learning, are possible such as Global Matching and Local Matching. Global Matching is too computationally expensive to be used online using current hardware (although that may change as hardware performance increases) and the accuracy of Local Matching is too poor to be used in an industrial context. At the time of writing, a satisfactory balance between accuracy and evaluation time can be achieved by using the known Semi-Global Matching algorithm (SGM). Power efficient real-time hardware implementations of SGM have recently been demonstrated in an industrial context—see United Kingdom Patent Application Nos. 1807392.4 and 1817390.6, each of which is incorporated herein by reference in its entirety. This details a variation of SGM which can be entirely implemented on a low-power FPGA (field programmable gate array) fabric without requiring the use of a CPU (central processing unit) or GPU (graphics processing unit) to compute the disparity map.

When choosing a suitable stereo vision algorithm, there will inevitably be some trade-off between accuracy and speed. For an AV, real-time processing is critical: typically, stereo images need to be processed at a rate of at least 30 frames per second (fps), and potentially higher, e.g. 50 fps (a frame in this context refers to a stereo image pair in a stream of stereo image pairs captures by the AV's optical sensors). It may therefore be necessary to make certain compromises on accuracy in order to achieve the required throughput. In the event that the compromises do need to be made on accuracy in order to achieve sufficiently fast performance, having a robust assessment of the uncertainty associated with the resulting depth estimates is particularly important.

The uncertainty estimator 4 determines an uncertainty estimate $U_i$ for the depth estimate $I_{d_i}$. That is, an estimate of the uncertainty associated with the depth estimate $I_{d_i}$ in the form of an uncertainty image.

Figure 2:
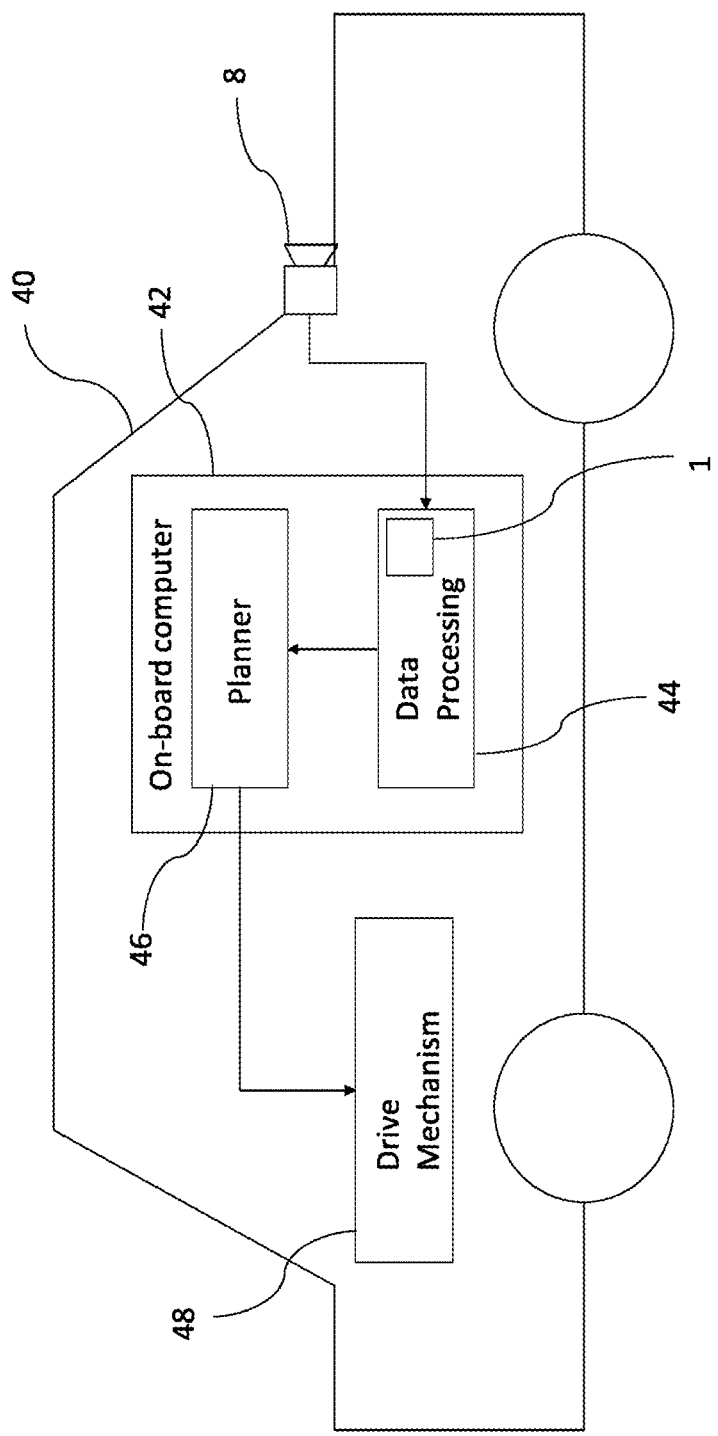
FIG. 2 shows a highly schematic block diagram of an autonomous vehicle.

FIG. 2 shows a highly schematic block diagram of an AV 40. The AV 40 is shown to be equipped with at least one stereo image capture device (apparatus) 8 of the kind referred to above. For example, the AV 40 may be equipped with multiple such stereo image capture devices, i.e. multiple pairs of stereo cameras, to capture a full 3D view of the AV's surroundings. An on-board computer system 42 is shown coupled to the at least one stereo image capture device 8 for receiving captured stereo image pairs from the stereo image capture device 8.

As will be appreciated, at the hardware level, there are numerous ways in which the on-board computer system 42 may be implemented. It is generally expected that it will comprise one or more processors, such as at least one central processing unit (CPU) and at least one accelerator such as a GPU or similar which operates under the control of the CPU. It is also quite feasible that the on-board computer system 42 will include dedicated hardware, i.e. hardware specifically configured to perform certain operations, such as a field programmable gate array (FPGA), application specific integrated circuit (ASIC) or similar. For instance, as noted above, there exist highly efficient variations of SGM depth estimation that may be implemented on a FPGA fabric configured for that purpose. Such dedicated hardware may form part of the on-board computer system 42 along with more general-purpose processors such as CPUs, accelerators etc. which carry out functions encoded in executable computer code (software). The term processor as used herein can refer to a general-purpose, instruction-based processor such as a CPU, GPU etc. but also a more specialized or dedicated hardware processor such as an FPGA or ASIC.

FIG. 2 shows, implemented within the on-board computer system 42, a data processing (sub)system 44 and an AV planner 46. The data processing system 44 and planner 46 are functional components of the on-board computer system 42, that is, these represent particular functions implemented by the on-board computer system 42. These functions can be implemented in software, i.e. response to computer code executed on one or more processors of the on-board computer system 42 and/or by any dedicated hardware of the on-board computer system 42.

The stereo image processing system 1 of FIG. 1 forms part of the data processing system 44. The general function of the data processing system 44 is the processing of sensor data, including images captured by the stereo image capture device 8. This may include low-level sensor data processing such as image rectification, depth extraction etc., as well as somewhat higher-level interpretation, for example, computer vision processing (object detection in 2D and 3D, image segmentation, object tracking etc.). The output of the data processing system 44, which may be complex and highly sophisticated, serves as a basis on which the AV planner 46 makes driving decisions autonomously. This includes immediate low-level decisions to be taken by the vehicle such as rotating the steering by a certain number of degrees, accelerating/decelerating by a certain amount through braking, acceleration etc. as well as more long-term high-level planning decisions on which those low-level action decisions are based. Ultimately it is the output of the planner 46 that controls a drive mechanism 48 of the AV 40, which is coupled to the necessary components of the AV in order to be able to implement those decisions (such as the engine, transmission, braking/acceleration systems, steering etc.).

Moreover, the functions described in relation to FIG. 2 can be implemented off-board that is in a computer system such as a simulator which is to execute those functions for modelling or experimental purposes. In that case, stereo image pairs may be taken from computer programs running as part of a simulation stack.

Figure 3:
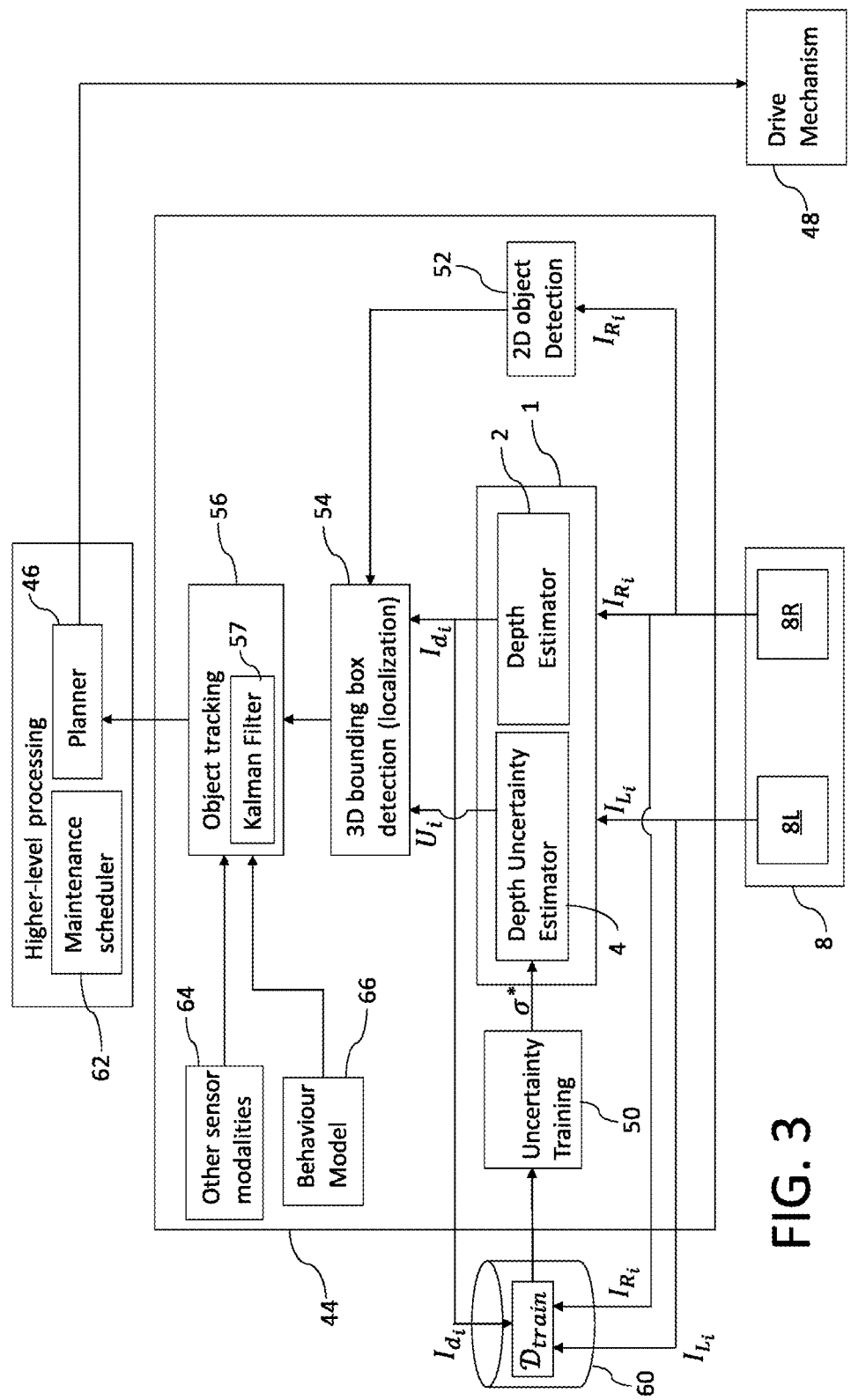
FIG. 3 shows a function block diagram of an AV perception pipeline.

FIG. 3 shows a schematic functional block diagram of a perception pipeline representing functions implemented within the on-board computer system 42 in further detail. In addition to the stereo image processing system 1, the data processing system 44 is shown to comprise an uncertainty training component 50, a two-dimensional (2D) object detector 52, a 3D object localisation component in the form of a 3D bounding box detector 54 and an object tracker 56. The stereo image processing system 1 is shown coupled to both left and right image capture units 8L, 8R of the stereo image capture device 8 to receive left and right images therefrom. The stereo image processing system 1 processes such image pairs as described above in order to provide a depth estimate for each stereo pair (from the depth estimator 2) and an uncertainty estimate for each such depth estimate (from the depth uncertainty estimator 4).

In addition, left and right stereo images captured by the stereo image capture device 8 are stored in a data store of the autonomous vehicle 40. That is, in on-board persistent electronic storage 60 of the AV 40 which is not shown in FIG. 2 but is shown in FIG. 3.

Such stereo image pairs are stored in the persistent electronic storage 60 as training data ($\mathcal{D}_{train}$) for use by the uncertainty training component 50.

Although not indicated in FIG. 3, the images may be stored after rectification has been applied by the image rectifier 7, i.e. the training data may comprise the rectified versions of the stereo images.

This stored training data additionally comprises, for each stereo image pair of the training data $I_{L_i}, I_{R_i}$, a corresponding depth estimate $I_{d_i}$ which has been estimated from that stereo image pair by the depth estimator 2. Hence, the output of the depth estimator 2 is shown in FIG. 3 as providing part of the training data. Note that not every stereo image pair and corresponding depth estimate needs to be stored as training data. As explained below, the stereo image pairs used for training are captured sufficiently far apart in time that they can be assumed to be independent hence it may be appropriate to store only a relatively small fraction of captured stereo images in the persistent electronic storage 60 for the purpose of depth uncertainty training.

The uncertainty training component 50 uses the stored training data $\mathcal{D}_{train}$ to compute value(s) of one or more uncertainty estimation parameters for estimating the uncertainty in the output(s) of one or more components of the perception pipeline, such as the depth estimator 2, the 2D object detector 52 and the 3D object localization component 54. The training process that is executed by the uncertainty training component 50 to learn these parameters is described in detail below. The uncertainty estimation parameters are learned from a statistical analysis the training data $\mathcal{D}_{train}$. For the avoidance of doubt, the term "uncertainty training" (or similar) as used herein encompasses any process in which uncertainty estimation parameter(s) are learned from historical data.

FIG. 3 shows an output labelled "σ*" (represented more generally below using the notation $\theta_D$) from the uncertainty training component 50 to the depth uncertainty estimator 4. The notation σ* represents one or more depth uncertainty parameters for estimating the uncertainty in stereo depth estimates provided by the depth estimator 2. Although not shown in FIG. 3, the uncertainty training component 50 may provide equivalent parameter(s) for estimating the uncertainty in the output(s) of other perception component(s), such as the output of the 2D object detector 52 and/or the output of the 3D object localization component 54.

In respect of stereo depth, the training process is executed on an intermittent basis according to a schedule that is determined by a diagnostics and maintenance scheduler 62 of the AV 40. For example, the training process may be repeated on a daily or weekly basis or in any other way specified by the schedule in order to regularly update the depth uncertainty estimation parameters σ*. Each instance (repetition) of the training process is executed based on training data which has been collected since the previous most-recent iteration of the training process in order to provide up-to-date uncertainty estimation parameters. It is generally expected that each iteration of the training process will be executed during an interval of "downtime" when the AV 40 is stationary and operating in a diagnostics mode, and therefore has available computing resources which can be used to execute the training process. Updating the training for stereo depth on a regular basis is appropriate as changes in the misalignment of the stereo optical sensors 8L, 8R can have a significant impact on the uncertainty in the depth estimates obtained using those sensors. The training process may also be repeated intermittently for other perception component(s) as appropriate. Miscalibration may be detected based on discrepancy from corresponding ground truth such as LiDAR (see below).

Although the uncertainty training component 50 is shown to be implemented within the on-board computer system 42, the collected training data could instead be uploaded to an external training computer system for executing the training process at the external training computer system. In that event, once the training process has been executed externally, the depth uncertainty estimation parameters σ* (and/or one or more uncertainty estimation parameters for another perception modality or modalities) obtained as a result can be downloaded from the external training system to the AV 40. Once downloaded, those parameters can be used in exactly the same way. It will thus be appreciated that all references herein to a training computer system can, depending on the context, refer to the on-board computer system 42 of the AV 40 itself or to an external training computer system to which the relevant training data D train is provided. Moreover, the training can be performed in part on-board the vehicle and in part externally. For example, where uncertainty learning is applied to at least two perception components (e.g. two or more of stereo depth, 2D object detection, 3D object localization), training for one such component may be performed on-board the vehicle (such as stereo depth, using a supervised approach or a unsupervised approach based on automatically-captured ground truth such as LiDAR) and training for the other component may be performed externally (such as 2D object detection, based on manual annotation ground truth).

Stereo depth uncertainty estimates from the uncertainty estimator 4 are propagated through the perception pipeline of the data processing system 44 such that they ultimately feed into driving decisions that are taken by the AV planner 46. An example of the manner in which stereo depth uncertainty estimates can propagate through the pipeline in this manner up to the planner 46 will now be described with reference to FIG. 3.

FIG. 3 shows the 3D bounding box detector 54 receiving, from the stereo image processing system 1, both depth estimates computed from stereo image pairs and the corresponding depth uncertainty estimates.

In addition, the 3D bounding box detector 54 is shown coupled to an output of the 2D object detector 52. The 2D object detector 52 applies 2D object detection to images captured by the right image capture unit 8R. The 2D object detector 52 applies 2D object detection to images captured by the right image capture unit 8R in order to determine 2D object bounding boxes within those images and an uncertainty estimate for each detected 2D bounding box. 2D object detection methods are well known and are therefore not described in any further detail herein. The uncertainty associated with 3D bounding box estimates can be estimated by comparison with manual annotation ground truth data for a suitable set of training images in order to learn a parametric error model. This is described in further detail later.

Although not shown in FIG. 3, 2D object detection is performed on rectified right images. More generally, depth estimates and 2D object detection results are provided in a common frame of reference, so their outputs can be meaningfully combined.

In the present context, each depth estimate $I_{d_i}$ produced by the depth estimator 2 is a disparity map for the corresponding right image (i.e. the image captured by the right image capture unit 8R). In the terminology of stereo vision, the right images are target images and the left images serve as reference images. It is generally most appropriate to use the right images as target images for left-hand drive vehicles in which the right image capture unit 8R will be positioned closest to the centre line of the road i.e. closest to where a human driver would be seated in a regular vehicle. For right-hand vehicles it will generally be more appropriate to use the left images as the target images and to apply 2D object detection etc. to the left images instead of the right images. In general, 2D object detection is applied to whichever images serve as the target images within the depth estimation process.

The 3D bounding box detector 54 uses the depth estimates and 2D bounding boxes to determine 3D bounding boxes for each detected 2D bounding box. That is, a bounding box in three-dimensional space which provides an approximation of the location, orientation and size of each corresponding object in 3D space. This is quantified as a 3D location, pose and dimensions (height, length, width) that define each 3D bounding box. In addition, the 3D bounding box detector 54 uses the estimated depth uncertainty and the uncertainty associated with each 2D bounding box to compute an estimated uncertainty for each 3D bounding box. It is noted that the term bounding box is used in a broad sense. A bounding box can be a simple cuboid but also a more complex 3D template or the like.

3D bounding box estimates and their associated uncertainties serve as inputs to the object tracker 56. The primary function of the object tracker 56 is to determine correspondence between objects captured at different times. That is to say, the object tracker 56 is the component that determines that a particular object captured in a stereo image pair at time t1 (or more generally, in one or more sensor inputs) is the same as an object captured and detected in a stereo image pair at time t2. In the case of moving objects, this allows a trajectory of particular objects to be tracked in space over time. In addition to the 3D bounding boxes, the object tracker 56 also receives inputs from other sources which it uses for this purpose. For example, it may receive data corresponding to other sensor modalities such as LiDAR, RADAR etc. denoted by reference numeral 64. The object tracker 56 is also shown to receive inputs from an object behaviour model 66 which provides information about the expected behaviour of certain types of objects such as other vehicles. If a reasonable assumption can be made about how a certain type of object (e.g. vehicle) does and does not behave, then the object tracker 56 can leverage that knowledge to ensure that the conclusions it is making about object correspondence are generally consistent with the expected behaviour of that type of object. The inputs received from the other sensor modality/modalities 64 and the behaviour model 66 also have associated uncertainty estimates. The object tracker uses a Kalman filter 57 to combine the various inputs it receives in a manner that gives appropriate weight to their relative uncertainty. Generally, this means giving greater weight to inputs with a relatively lower level of uncertainty. In the present context, the uncertainty associated with the 3D bounding box detection depends on the lower-level depth uncertainty estimates provided by the depth uncertainty estimator 4 as well as the 2D object detection uncertainty. Hence the depth uncertainty estimates are at least partially determinative as to the weight given by the object tracker 56 to 3D bounding box detection versus the other inputs it receives (other sensor modalities and modelled behaviour in this example). Hence it can be seen that, in order to effectively combine measurements and information from multiple sources for the purpose of object tracking, robust estimates of the respective uncertainties associated with those inputs are needed.

Object tracking results are provided by the object tracker 56 as an output which serves as a basis for driving decisions made by the planner 46.

As well as allowing the object tracker 56 to combine such inputs in a way that respects their relative uncertainties, the object tracker 56 may also use these uncertainty estimates to provide an uncertainty estimate for its own object tracking output. This object tracking uncertainty estimate can then in turn, be taken into account in the driving decisions taken by the planner 46.

It can thus be seen that estimated depth uncertainty influences critical driving decisions taken by the AV planner 46, because the depth uncertainty may influence both the object tracking output and the uncertainty associated with the object tracking output at any given time.

Object tracking in the present context generally refers to the tracking of external objects such as other vehicles and pedestrians relative to the autonomous vehicle 40. This allows the behaviour of other such actors to be taken into account.

FIG. 3C shows further details of the perception pipeline which are relevant to uncertainty estimation. In particular, further details of the 2D object detector 52 and 3D object localization component 54 are shown.

The output of each of the 2D object detector 52, the stereo image processing system 1 and the 3D object localization component 54 is overall probabilistic. In the following examples, that probabilistic output is made up of a deterministic component and an associated uncertainty estimate (uncertainty component) applicable to the deterministic component.

For stereo depth, the deterministic output is the depth map provided by the depth estimator 2. In combination with the uncertainty estimate provided by the stereo depth uncertainty estimator 4, this provides a probability distribution over possible "true" depth maps. According to the terminology used herein, the depth estimator constitutes a deterministic processing module whose output is deterministic. The 2D object detector 52 and the 3D object localization component are shown to comprise analogous deterministic processing modules denoted by reference signs 52a and 54a respectively, which provide deterministic 2D object detection and 3D object localization outputs respectively. In addition, each is shown to comprise an analogous uncertainty estimation component denoted by reference signs 52b and 54b respectively, which provide uncertainty estimates for the deterministic 2D object detection and 3D object localization outputs respectively. Hence, the overall output of each of these perception components is a probabilistic output comprising a deterministic component (i.e. the deterministic output of the relevant deterministic processing module) and an uncertainty component (i.e. the uncertainty estimate associated with that deterministic output). The uncertainty estimation components operate in real-time to apply the relevant uncertainty estimation parameter(s) which have been learned in the applicable training process. Each uncertainty component may for example be implemented as a time-efficient O(1) lookup table in which those uncertainty parameter(s) are stored. Such uncertainty estimation components may be referred to as "online" components, in order to distinguish from the "offline" statistical analysis that is applied to learn the uncertainty estimation parameter(s) applied by the online components.

The terms online and offline are used in the statistical/machine learning sense. Offline statistical analysis may for example be performed in non-real time, either at an external training system or on-board the AV when operating in a diagnostics mode. This will generally be appropriate given current hardware constraints, however it may be that, as the speed and processing capabilities of hardware increases, real-time computation of the uncertainty estimation parameters may become feasible.

Figure 20:
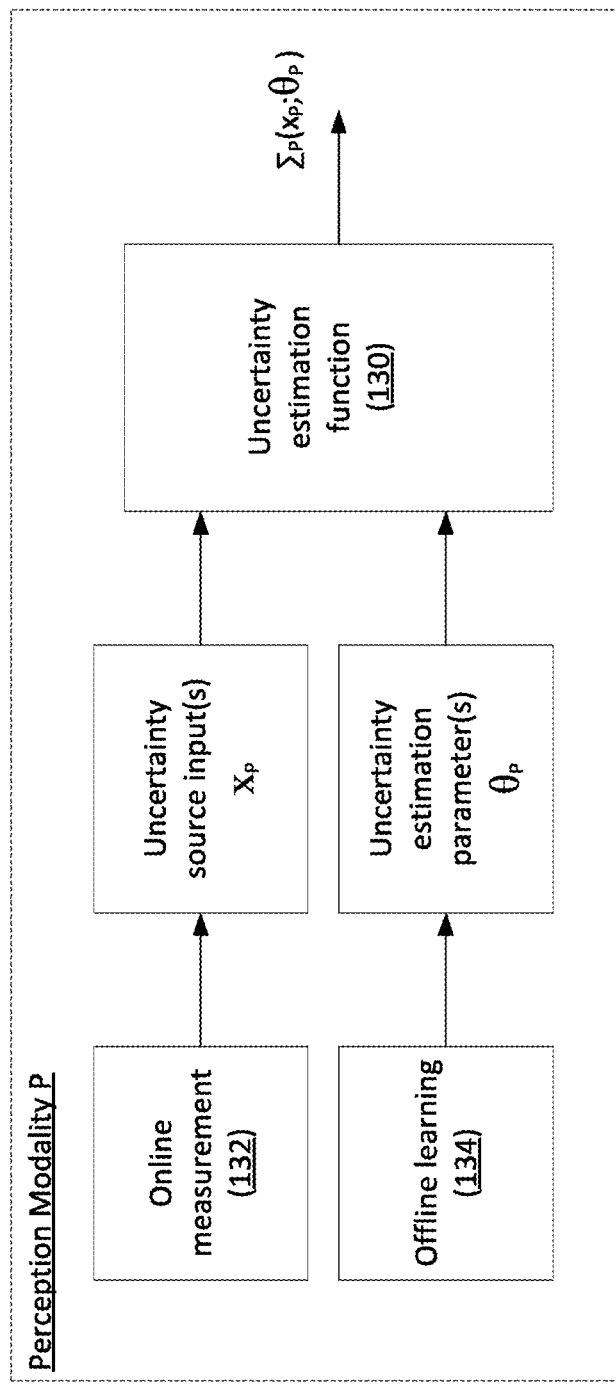
FIG. 20 shows a schematic block diagram of an uncertainty estimation function learned for a given perception modality from an analysis of relevant historical data.

FIG. 20 shows a highly schematic block diagram of an uncertainty estimation function 130 learned for a given perception modality P (such as stereo depth, 2D object detection, 3D object localization etc.). The uncertainty estimation function receives as an input one or more uncertainty estimation parameters $\theta_P$ which have been learned from a statistical analysis of historical data pertaining to perception modality P. The statistical analysis is denoted by block 134, and typically this will be an offline learning process. Depending on the form of the function 130, it may also receive as a second input one or more uncertainty source inputs $x_P$ which are determined during online processing based on real-time measurement, i.e. these are the variable(s) on which the uncertainty estimation function 130 can depend. The output of the uncertainty estimation function (i.e. the uncertainty component for perception modality P) is in the form of a covariance or other probabilistic distribution parameter(s) for perception modality P, denoted in mathematical notation as:

$$\sum_p (x_p; \theta_p).$$

Herein, depth is denoted by P=D, 2D object detection by P=B and 3D object localization by P=R.

In the present example, the probabilistic output computed for a particular perception modality (such as stereo depth, 2D object detection, 3D object localization etc.) is a probabilistic Gaussian (normal) distribution. The uncertainty component $\Sigma_P(x_P; \theta_P)$ is provided in the form of a covariance which, in combination with the associated deterministic output, defines the Gaussian distribution for that perception modality. The covariance can be a scalar variance (i.e. consisting of a single scalar parameter) defining a univariate distribution or a covariance matrix (that is, comprising multiple scalar parameters) defining a multivariate distribution. The used covariance/Gaussians allows a Kalman filter to be applied as a means of fusing the probabilistic outputs of perception. It is however noted that the techniques are not limited in this respect. More generally, the uncertainty estimate for a given perception modality may be provided as one or more distribution parameters which, in combination with the associated deterministic output, define a probabilistic uncertainty distribution (Gaussian or non-Gaussian) for the perception modality in question. In that case, fusion of perception outputs can be performed by applying another form of Bayes filter. A parametrized uncertainty distribution of this nature may be referred to herein as a "parametric error model".

Within the perception pipeline, in the present example, the deterministic output of the 2D object detector 52 is shown as an input to a 2D object tracker 102. The 2D object tracker 102 operates in a similar manner to the 3D object tracker 56, but in the 2D spatial domain, in order to track correspondences between 2D objects detected at different times. This, in turn, allows the behaviour of 2D detected objects to be tracked over time.

The deterministic processing module 45a of the 3D object localization component 54 is shown to comprise an orientation and size detection component 104, a segmentation component 106 and a template fitting component 108. The orientation and size detection component 104 (which may for example be in the form of a trained convolutional neural network) operates in the 2D spatial domain, based on the output of the 2D object detector 52 and 2D object tracker 56, in order to detect an orientation and size of 2D detected object. The segmentation component 106 operates on those 2D outputs in combination with the deterministic depth estimate provided by the stereo image processing system 1, in order to isolate depth pixels that belong to specific objects. This is a form of depth clustering, the aim being to isolate, for each detected object, the subset of pixels in the computed depth map that belong to that object. This may use both the depth value associated with that pixel in the depth map and the visual information associated with that pixel in the corresponding right image. The template shape fitting component 108 uses the outputs of the orientation and size detection components 104 and the segmentation component 106 to fit a 3D template to each detected object. That is, to determine a 3D location, 3D orientation (pose) and 3D size of each detected object, using the depth information isolated for that object and the associated 2D orientation and size detection. The output of the template fitting component is provided as an output of the 3D object localization component 54 and serves as input to the 3D object tracker 56.

In the present example, that output is deterministic—which is to say that, in the present example, the 3D object localization component is a deterministic perception component, which computes a deterministic output as function of its deterministic inputs.

In order to obtain a probabilistic 3D object localization output, which in turn can be used as a basis for Kalman or other Bayesian filtering, an associated uncertainty estimate $\Sigma_R = \Sigma_P(x_P; \theta_P)$ is provided by the uncertainty estimation component 54b of the 3D object localization component 54.

In the present example, that uncertainty estimation component 54b of the 3D object localization component 54 is shown having three inputs ($x_P$), namely (i) the deterministic 3D object localization output, (ii) the stereo depth uncertainty estimate $\Sigma_D$ and (iii) the 2D object detection uncertainty estimate $\Sigma_B$. Hence, during online processing, the uncertainty estimates provided for the deterministic 3D object localization output may have an explicit dependency on each of those three inputs. These inputs are examples of what is referred to herein as "uncertainty source inputs" (being inputs that characterize a variable source of uncertainty), and an uncertainty source input refers generally to a variable input to an online parametric error model. Other examples of such inputs are given below. The uncertainty estimation parameter(s) that define that model, as learned offline, map uncertainty source inputs to estimated uncertainty.

It is, however, important to note that this level of dependency is not essential. As explained below, a simpler parametric model may be applied to obtain the 3D object localization uncertainty estimate. For example, a simple, but nonetheless viable parametric model, estimates the 3D object localization with only a single uncertainty source input, namely detected object depth. In that case, during real-time processing, the uncertainty estimate associated with the 3D object localization output will only vary in dependence on the detected depth of the object or objects to which it pertains; any dependency on stereo depth and/or 2D object detection uncertainty will be a fixed dependency encoded in the uncertainty estimation parameter(s) learned offline, as explained below.

In summary, the perception pipeline of FIG. 3 and 3D operates, in an online processing phase, to compute real-time probabilistic perception outputs for perception modalities such as stereo depth, 2D object detection and 3D object localization outputs. Those probabilistic outputs have a deterministic component and an uncertainty component in the form of an estimated covariance or other distribution parameter(s). The uncertainty component is provided based on one or more uncertainty estimation parameters $\theta_P$ learned for the perception modality P in question from statistical analysis of relevant historical data, typically in an offline training phase.

An example of the type of statistical analysis that may be applied to learn the uncertainty estimation parameter(s) $\theta_P$ will now be described. The type of analysis that is described immediately below is based on what is referred to herein as "sampling-based uncertainty propagation". This generally means propagating lower-level uncertainty estimates through the perception pipeline of FIG. 3 and 3D based on sampling, and measuring and parameterising the effect on the output of higher-level perception components. By way of example, the following description propagates stereo depth uncertainty and 2D object detection uncertainty through the 3D object localization component 45, in order to build a parametric error model for the output of the 3D object localization component for subsequent use online. However, in general, the methodology can be applied to any perception component having one or more structure observation inputs (e.g. stereo depth, and/or another depth modality (or modalities), and/or 2D object detection), to determine a parametric uncertainty model for that perception component.

The following description assumes that uncertainty estimates are provided in the form of covariances applicable to the relevant output. However, the description applies equally to other forms of distribution parameter.

Figure 16:
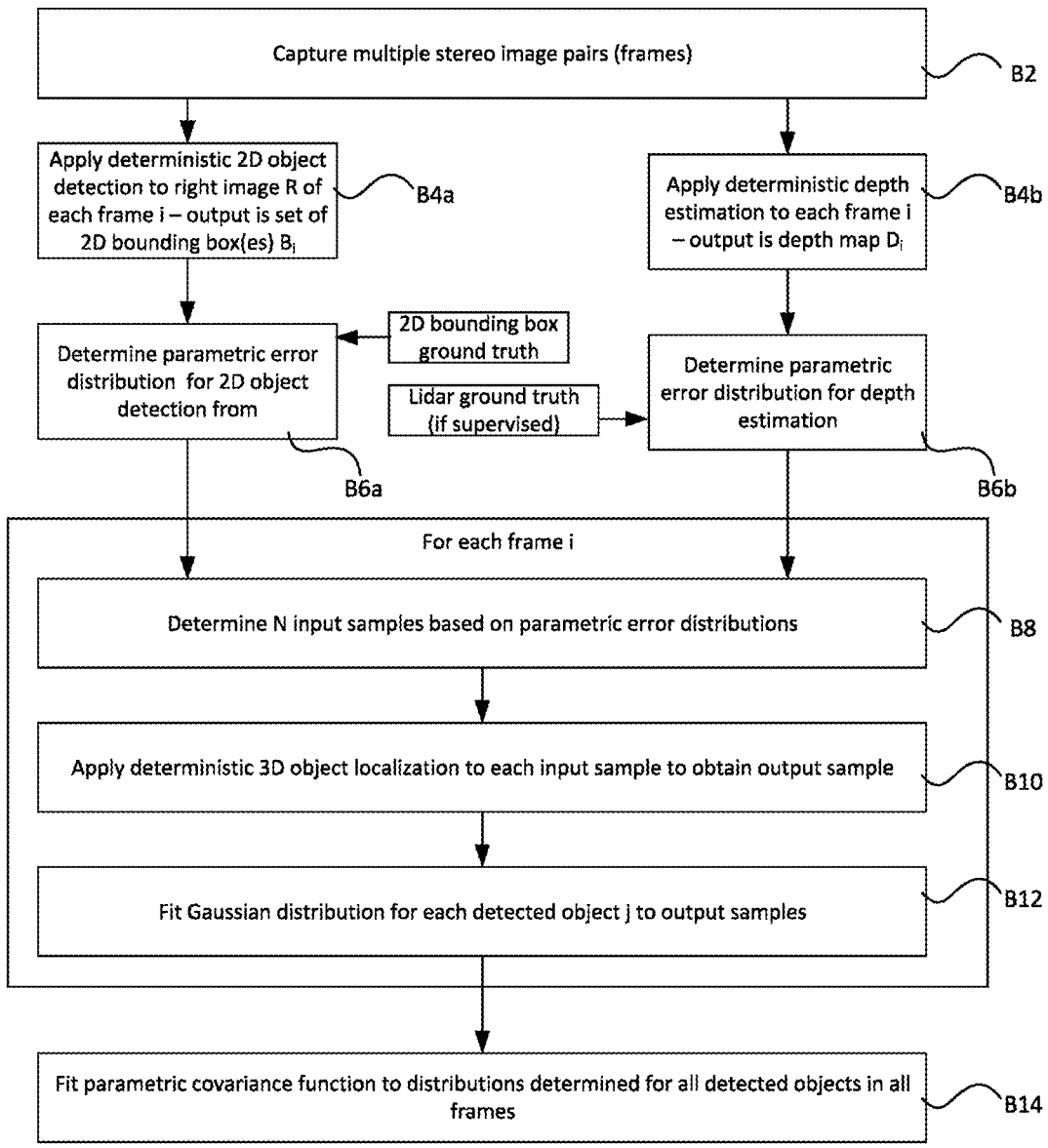
FIG. 16 shows a flowchart for a method of learning uncertainty estimation parameters based on uncertainty propagation.

FIG. 16 shows a flow chart for an offline method of determining a parametric error (uncertainty) distribution for 3D object localization based on Monte Carlo sampling (MCS). This is a form of training as that term is used herein, where the parametric 3D object localization distribution is considered an unknown function (uncertainty estimation function) to be learned from training data of the kind described above.

The method is offline in the machine learning/statistical analysis sense of the term. The purpose of the offline method is to allow online uncertainty models to be determined, which in turn can be applied "online", e.g. in an autonomous vehicle when the autonomous vehicle is in operation. The offline method can be performed onboard the vehicle itself, for example when operating in a diagnostics or maintenance mode, or externally.

At step B2, the training data is captured over time. This comprises multiple stereo image pairs captured over an extended time interval. A stereo image pair is denoted by index 1, and may be referred to as a frame (corresponding to a particular time instant).

At step B4a, deterministic 2D object detection is applied to (in this example) the right image of each frame, to obtain a 2D object detection output $B_i$ for each frame i.

Figure 16A:
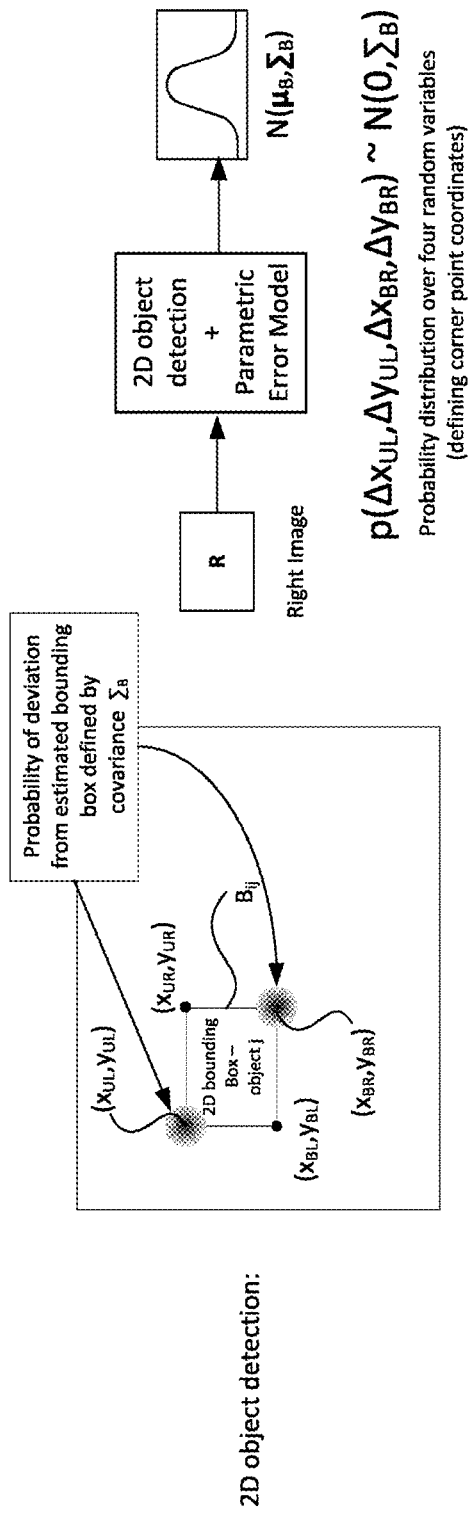
FIG. 16A illustrates schematically a parametric error (uncertainty) model for 2D object detection.

With reference to FIG. 16A, the 2D object detection output $B_i$ for each frame i comprises an estimated 2D bounding box for each detected object j in that frame. The estimated bounding box for detected object j in frame i is denoted $B_{ij}$.

Each bounding box has four corners—upper left (UL), upper right (UR), bottom left (BR) and bottom right (BR)—but it is fully defined by either the bottom right corner plus the upper left corner or the bottom left corner plus the upper right corner (i.e. by one of the upper corners and the bottom corner diagonally opposite thereto—referred to as the reference corners herein). Each corner is, in turn, defined by two spatial coordinates (denoted x and y). In the present example, the upper left corner and bottom right corner are chosen as the reference corners but this is arbitrary.

At step B4b, deterministic stereo depth estimation is applied to each frame image to obtain a depth estimate $D_i$ for each frame i.

Note: in other parts of this disclose, the depth map for frame i is denoted using the notation $I_{d_i}$, rather than $D_i$.

The depth estimate $D_i$ is generated initially in the form of a disparity map (using e.g. SGM), which in turn is converted to a map of depth values in units of distance (e.g. meters) based on the known properties of the stereo camera pair 6 which captured the images. There is an inverse relationship between depth and disparity:

$$\text{depth in units of distance} \propto \frac{1}{\text{disparity}};$$

hence, an uncertainty equal to one unit of disparity translates to a greater depth uncertainty for pixels of greater depth, i.e. a pixel with a lower disparity value (further from camera) and a given uncertainty in the disparity domain has a greater uncertainty in the depth domain than a pixel with a greater disparity value (nearer the camera) and the same uncertainty in the disparity domain.

For the avoidance of any doubt, it is noted that, in the context of this offline method, the term depth may be used to refer specifically to a quantity in units of distance, as distinct from disparity which depends on the inverse of distance. Elsewhere in this document, the term depth is used more generally such the term depth estimate covers disparity maps and the like. It will be clear in context what is meant, and the broader meaning is intended unless context demands otherwise.

Steps B4a and B4b may be performed on-board the autonomous vehicle itself, using the on-board pipeline of FIG. 3, so as to allow uncertainty modelling specific to that vehicle.

At step B6a, 2D object detection outputs are used to determine a parametric error model for 2D object detection. This recognizes that the estimated bounding box $B_{ij}$ may be imperfect and attempts to quantify the 2D bounding box detection error by comparing the estimated bounding boxes to correspond ground truth data—in this case, manual annotations. Note that the 2D object detection error model need not be generated based on the frames captured at step B2—it could, for example, be generated in advance based on previously captured images which have been manually annotated and which are provided to the 2D object detector 52 to detect bounding boxes for comparison with the corresponding manual annotations.

With reference to FIG. 16A, the 2D object detection parametric error model is a probabilistic distribution defined with respect the bounding box reference corners. It is assumed to take the form of a multivariate Gaussian having covariance $\Sigma_B$. Given a deterministically estimated bounding box $B_{ij}$, the probability that the "true" bounding box is $B_{ij} + \Delta B$ is estimated as:

$$p(\Delta B) \sim N\left(0, \sum\nolimits_B\right).$$

Here, $\Delta B$ denotes the unknown deviation between the estimated bounding box and the true bounding box, and can be embodied as the unknown deviation in the bounding box reference corners from the true bounding box reference corners:

$$\Delta B = (\Delta x_{UL}, \Delta y_{UL}, \Delta x_{BR}, \Delta y_{BR})$$

Here, the reference corners are treated as random variables, with the probability of deviation from the estimated (i.e. observed) reference corners being defined by the covariance $\Sigma_B$ (2D object detection covariance).

The covariance $\Sigma_B$ is determined by comparing the bounding box estimates with the corresponding ground truth (manually annotated bounding boxes). In a simple model, the covariance is a constant value $\Sigma_B$, i.e. an "average" bounding box uncertainty. In that case, when the model is applied, $\Sigma_B$ is independent of the estimated bounding box $B_{ij}$. In other words, in that case, a single uncertainty estimation parameter is determined for 2D object detection, namely the constant-valued 2D object detection covariance $\Sigma_B$. This single, constant uncertainty estimation parameter $\Sigma_B$ applies, in turn, to all 2D object detection outputs computed online.

However, as indicated above, a more sophisticated model could incorporate a dependence of the covariance matric $\Sigma_B$ on one or more relevant inputs $x_B$ (uncertainty source input(s) for 2D object detection). In that case, the covariance becomes a function of the input(s) $x_B$ (uncertainty estimation function for 2D object detection), in recognition of the fact that the 2D bounding box uncertainty may be different in different circumstances:

$$\Sigma_B = \Sigma_B(x_B; \theta_B)$$

Here, $\theta_B$ denotes one or more learned uncertainty estimation parameters which define the function $\Sigma_B(\ldots)$, i.e. parameter(s) which map any given (combination of) input(s) $x_B$ to a corresponding covariance (or set of covariances, e.g. for a set of detected objects). That function $\Sigma_B(\ldots)$ can for example be embodied as a lookup table that maps each possible (combination of) input(s) $x_B$ to the corresponding 2D object detection covariance. It is these parameter(s) that are learned at step B6a.

The notation $N(0, \Sigma)$ means a normal distribution with mean zero and covariance E (scalar or matrix), noting that the distribution is defined above over the unknown deviation $\Delta$ from the actual measurement. This is equivalent to defining the distribution over the measurement itself, but with the mean equal to the actual deterministic measurement. In other words, this assumes the error distribution is 'centred' on the actual deterministic measurement that has been obtained. In general, however, the mean can be zero or non-zero, and in general the relationship between a deterministic measurement and the mean of the corresponding uncertainty distribution can be encoded in the uncertainty estimation parameters $\theta_B$ and learned in training. In that event, the uncertainty estimation function provides both the covariance and the mean of the corresponding uncertainty distribution. This applies equally to other perception modalities such as depth and 3D object localization.

The uncertainty source inputs $x_B$ may for example include one or more of:
- the location of the estimated bounding box $B_{ij}$,
- a type (or class) of the detected object j,
- a measure of occlusion for object j,
- weather conditions at the time of detection,
- lighting conditions at the time of detection,
- relative orientation to the camera of object j,
- measure of motion (speed, acceleration etc.) for object j.

Hence, in the online processing phase, the 2D object detection covariance $\Sigma_B$ may vary in dependence on one or more of the above.

At step B6b, a parametric error model is determined for depth estimation. This is the step in which the depth uncertainty estimation parameter(s) $\theta_B$ are learned. The principles are similar to those of step B6a, but applied to depth estimates.

Figure 16B:
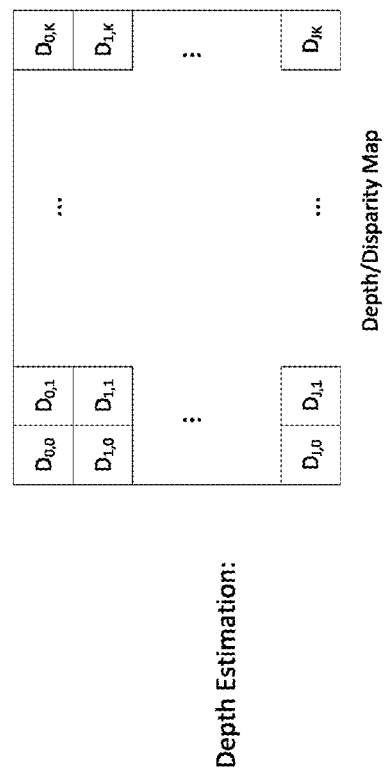
FIG. 16B illustrates schematically a parametric error model for depth estimation.

With reference to FIG. 16B, the depth estimate $D_i$ is a two-dimensional, J×K array of depth values, an individual component (pixel) of which is denoted $D_{ijk}$ (note the i subscript is omitted in FIG. 16B for simplicity).

In this case, each pixel of the depth map $D_i$ is treated as a random variable and the value pixel $D_{ijk}$ is assumed to deviate from a "true" depth value by an unknown amount $\Delta D_{ijk}$, with:

$$p(\Delta D_i) = p(\Delta D_{i,0,0}, \ldots, \Delta D_{i,J,0}, \Delta D_{i,0,1}, \ldots, \Delta D_{ijk}) \sim N(0, \Sigma_D)$$

That is to say, given an estimated (observed) value of depth map $D_i$, the probability that the true pixel is actually $D_i + \Delta D_i$ is given by a depth covariance $\Sigma_D$. This is a probability distribution over JK random variables, namely the set of pixels in each depth map.

The depth covariance $\Sigma_D$ can be determined in a similar way to the 2D object detection covariance $\Sigma_B$, i.e. by comparison with ground truth data. In this context, simultaneously captured LiDAR data may be used as ground truth for the depth estimates. It is again noted that the parametric error model for depth need not be determined necessarily based on the images captured at step B2—it could be determined, e.g. in advance, based on earlier images.

Alternatively, an unsupervised machine learning approach may be applied to estimate $\Sigma_D$ without the use of ground truth data. By way of example, a form of "variational inference" is described later, which can be used to this end. In this context, the unknown deviation from the true disparity is defined as a function F of a set of weights w:

$$\Delta D_i = f(w, D_i)$$

and a distribution over the weights w is learned, which in turn provides the depth covariance $\Sigma_D$. In that context, the depth estimate $D_i$ serves as an uncertainty source input for depth detection (generally denoted $x_D$), to permit different levels of uncertainty to be associated with different depth values. Alternatively or in addition, uncertainty may be permitted to vary with pixel location, in which case the location of a depth pixel serves as a depth uncertainty source input $x_B$, as described later.

A simple model assumes a constant depth covariance $\Sigma_D$, i.e. the same uncertainty for each pixel irrespective of its values.

A more complex model could introduce dependency of the depth covariance $\Sigma_D$ on one or more variable uncertainty source inputs $x_D$:

$$\Sigma_D(x_D; \theta_D)$$

in which $\theta_D$ denotes one or more uncertainty estimation parameters learned for depth using supervised or unsupervised training. In the example above, those parameter(s) $\theta_D$ comprise or are derived from a learned covariance $\sigma^*$ over the unknown perturbation weights w.

The depth uncertainty source input(s) $x_D$ may for example comprise one or more of:
- value (depth) and/or x-y location of depth map pixels (examples of this in the context of the variational inference approach are described later)
- weather conditions
- image content (e.g. edge detection)
- weather conditions at the time of detection;
- lighting conditions at the time of detection
- relative orientation to the camera or a measure of motion (speed, acceleration etc.) of object j, to which a given depth pixel is determined to belong In the present context, the parametric error models for depth and 2D object detection are used as a basis for propagating uncertainty up through the pipeline of FIG. 3, to allow the uncertainty associated with higher level perception functions (such as 3D object localization) to be learned.

Figure 17:
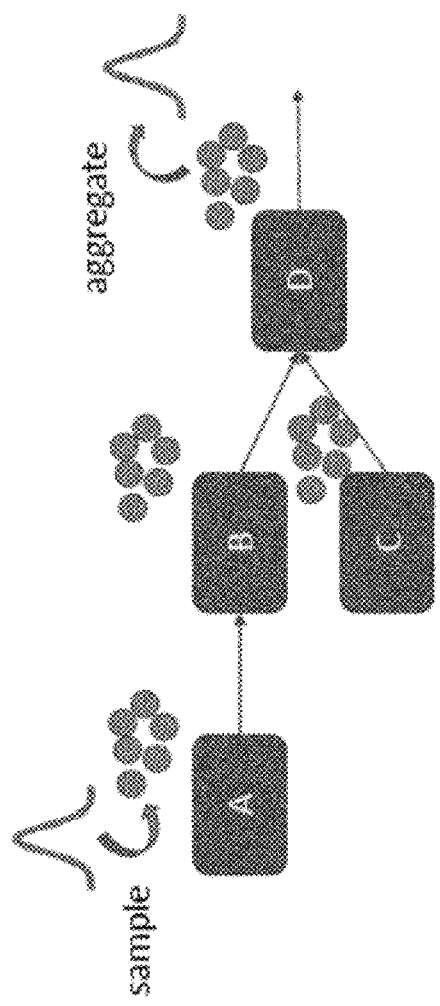
FIG. 17 illustrates general principles of uncertainty propagation.

FIG. 17 shows a highly schematic illustration of this approach, with general components A-D. These components are provided as general example and there is no direct mapping to the actual perception pipeline of FIG. 3—although 2D object estimation is comparable component A, depth is comparable to component C and those feed both into the 3D object estimation which is comparable to component D. Monte Carlo Simulation (MCS) is used as a basis for uncertainty propagation. Once parametric error models have been determined for two or more lower-level structure observation components, denoted A and C (such as depth and 2D object detection), input samples can be determined by sampling possible inputs according to those distributions. Each input sample is then propagated through the pipeline nodes B and D, to obtain a set of output samples—the resultant outputs of higher-level perception component D—which, in turn, are aggregated to determine a parametric error model for the higher-level perception component—in this case, component D.

This is described below as steps B8 to B12 with reference to the specific example of propagating depth and 2D object detection uncertainty though 3D object localization. These steps are schematically illustrated in FIG. 16C and those steps and FIG. 16C are described in conjunction.

Figure 16C:
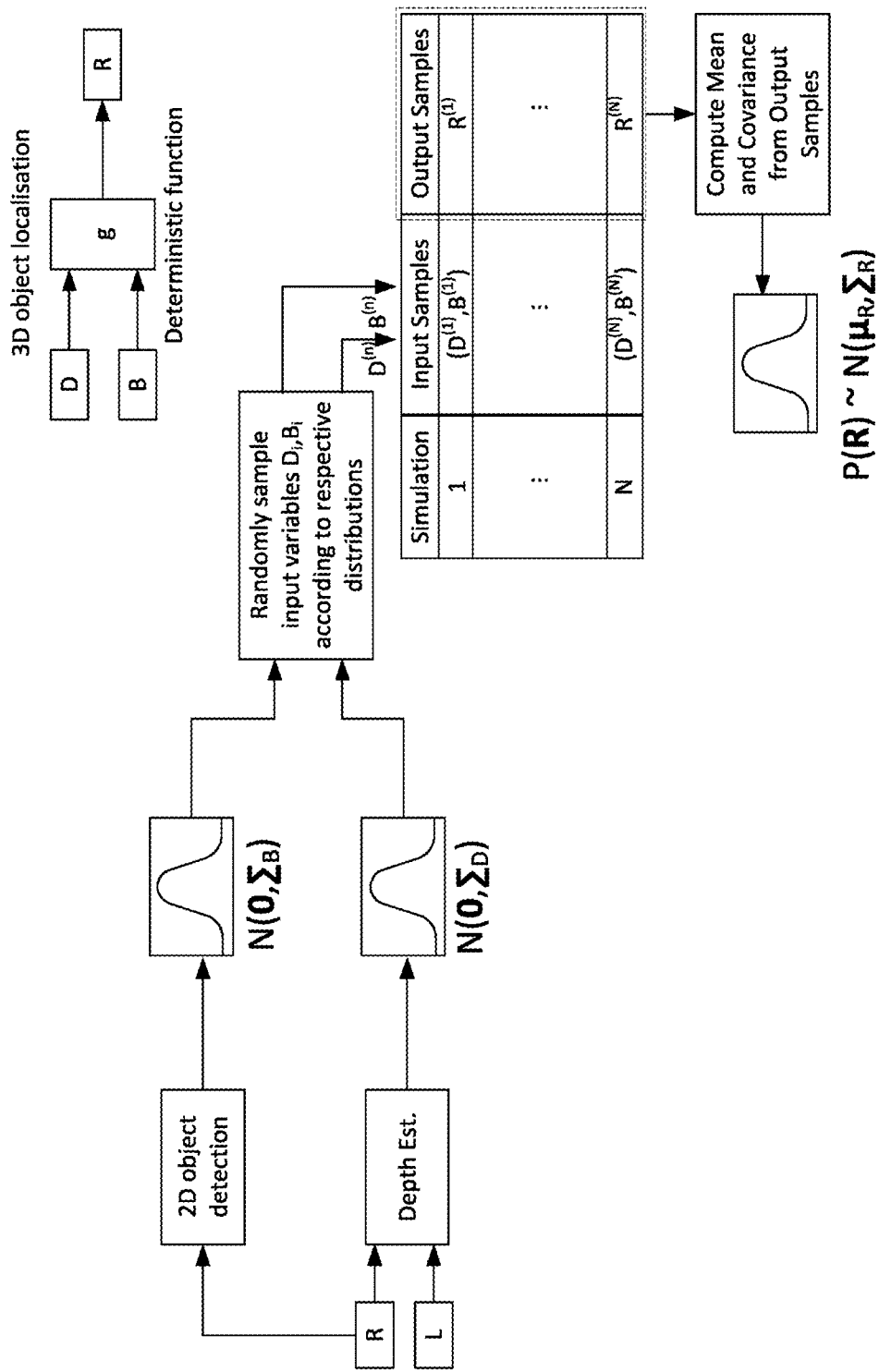
FIG. 16C illustrates schematically the principles of Monte Carlo sampled applied to uncertainty learning.

Note: the i subscripts are also omitted from FIG. 16C for simplicity.

The steps are performed for each frame i of the data collected at step B2, so as to run N "simulations" for each frame i.

This exploits the fact that the 3D object localization process is deterministic with respect to its depth and 2D object detection inputs (however, this is not essential—see below). Hence, for the purpose of MCS, it may be treated as a deterministic function g:

$$R_i = g(B_i, D_i)$$

Here, $R_i$ is the output of the 3D localization for frame i and will generally comprise at least an estimated 3D location $r_{ij}$ for each object j in each frame i and a 3D pose (orientation in 3D space) $p_{ij}$. It may also include other variables such as object size.

For each frame i, a set of N input samples is obtained (B8), by sampling the 2D object detection and depth parametric error distributions. Each input sample is a tuple comprising a "simulated" depth map and a simulated 2D bounding box. These samples are deterministic quantities as that term is used herein (i.e. each sample is a deterministic input obtained by sampling based on the corresponding probabilistic output). The term simulated in the present context refers to the fact that they are sampled in accordance with their respective error distributions. The sampling is such that the mean and covariance as measured across the sampled inputs should at least approximately match the mean and covariance of the distribution from which they are sampled. This is an application of Monte Carlo sampling, which is known per se. The nth input sample of the N input samples for frame i is denoted:

$$(D_i^{(n)}, B_i^{(n)})$$

For each frame i, 3D object localization is then applied (B10) to each of the N input samples to determine N input samples, as:

$$R_i^{(n)} = g(D_i^{(n)}, B_i^{(n)})$$

Then, for each frame i, a Gaussian distribution is fitted (B12) to the set of output samples $R_i^{(n)}$ for each detected object j in frame j, i.e. one fitted Gaussian per frame per detected object. Each Gaussian distribution has a covariance, determined through fitting, denoted:

$$\Sigma_{R_{ij}}$$

At step B14, the aim is to fit a parameterized uncertainty function $\Sigma_R (x_R; \theta_R)$ (covariance function for 3D object detection) to the observed covariances $\Sigma_{R_{ij}}$ across all objects and all frames, such that $$\Sigma_R(x_R; \theta_R) \approx \Sigma_{R_{ij}}$$

for each object j in each frame i. Here, $x_R$ denotes one or more uncertainty source inputs on which 3D object localization uncertainty can depend (such as detected object depth) and $\theta_R$ denotes one or more uncertainty estimation parameters learned for 3D object localization which map the uncertainty source input(s) $x_B$ to a corresponding 3D object detection covariance for each detected object j.

In this context, the Gaussian fitted to the output samples for frame i corresponding to object j is defined over the 3D object localization variables—and constitutes a parametric error model for the 3D object localization output. As noted the 3D object detection variables generally comprise at least 3D location $r_{ij}$ and 3D pose $p_{ij}$ (and possibly also size). In this context, the position and pose coordinates (and any other coordinates, such as size) are treated as random variables. Once the parametric error model has been determined in this way then, given an estimated 3D localization output $R_{ij}$ for object j, the probability that the "true" 3D coordinates of the object deviates from the estimated (observed) coordinates $R_{ij}$ by an amount $\Delta R_{ij}$ is given by:

$$p(\Delta R_{ij}) = p(\Delta r_{ij}, \Delta p_{ij}) \sim N(0, \Sigma_R(x_R; \theta_R))$$

Due to the inverse relationship between depth and disparity, it is expected that greater covariances will be observed for further-away objects (even if the depth and 2D object covariances are modelled as constants). This is illustrated schematically in FIG. 18, which shows 3D object detection error distributions projected into a top-down view. The position of an ego vehicle is denoted by the circle labelled "AV", and it can be seen that increasing uncertainty in the depth direction (along the optical axis of the AV) occurs for further-away objects.

It is important to note that, whilst in the above, sampling is based on a deterministic perception function g, that function need not be deterministic in general (i.e. its output need not be deterministic, even for deterministic input(s)). In the case of a probabilistic perception function, given one or more deterministic inputs, the output will be a probability distribution specific to that deterministic input(s). Sampling can be used to derive an uncertainty distribution over all possible inputs by first sampling from the probabilistic input distribution(s) to obtain deterministic input samples, and then sampling from the resulting probabilistic outputs to obtain deterministic output samples, to which, in turn, a generally-applicable uncertainty estimation function can be fit.

Figure 18:
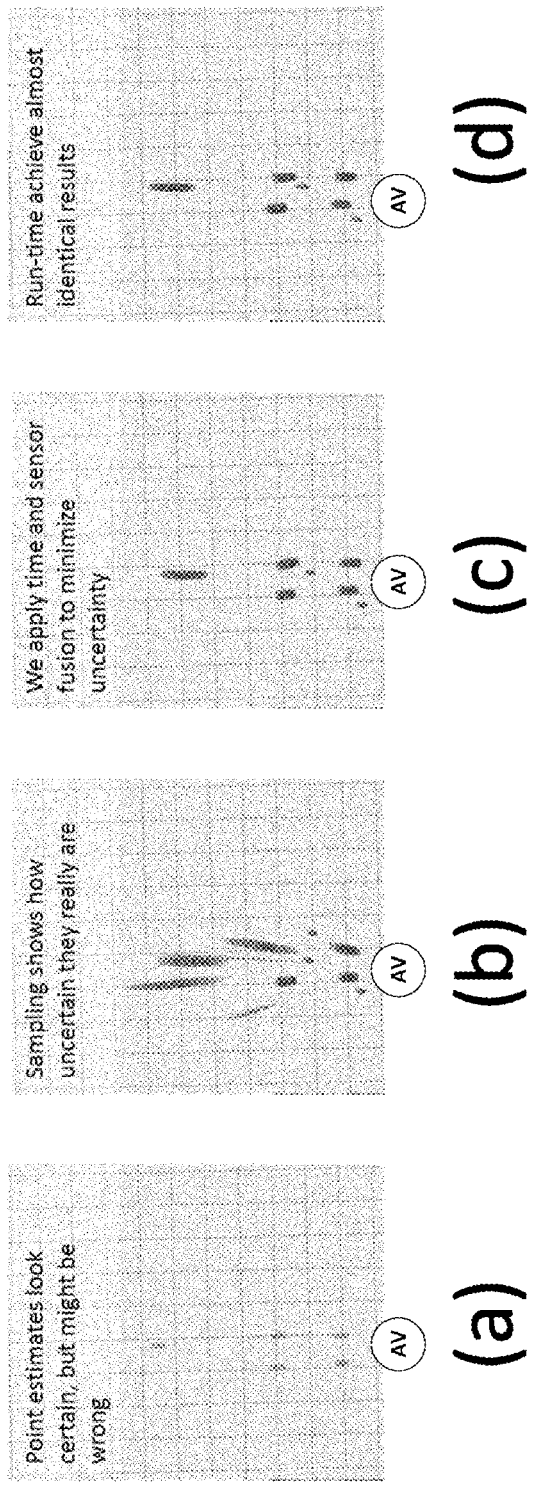
FIG. 18 generally shows 3D object localization results into an observation plane.

FIG. 18 generally shows 3D object localization results into an observation plane, and in particular shows (a) projected point estimates, (b) projected uncertainties for a given time instant, (c) projected uncertainties obtained offline though sensor fusion and (d) run time (online) results which mirror offline results. The online results are obtained using trained parametric error model(s).

It is therefore expected that a constant covariance will not be suitable in this context, for at least that reason, and that the 3D object localization uncertainty estimation function $\Sigma_R$ should vary in dependence on depth at least, i.e. the inputs(s) $x_R$ should at least include a dependence on a depth coordinate of $r_{ij}$, i.e. a depth of detected object j (more generally, $\Sigma_R$ may comprise or depend on the estimated 3D coordinates $R_{ij}$ of the object j in frame i).

If it is assumed that depth and 2D object detection have constant uncertainty, no explicit dependency on depth or 2D object detection uncertainty is needed, i.e. in that event, $\Sigma_R$ may have no explicit dependency on $\Sigma_D$ or $\Sigma_B$ (contrary to the example shown in FIG. 3C).

However, where the depth and/or 2D object detection error models allow for varying uncertainty, $\Sigma_R$ may also have an explicit dependence on depth and/or 2D object detection, i.e. $x_R$ may include depth uncertainty $\Sigma_D$ and/or 2D object detection uncertainty $\Sigma_B$ (as in the example shown in FIG. 3C).

This may be expressed in mathematical notation as:

$$\Sigma_{R_{ij}} = \Sigma_R(R_{ij}, \Sigma_{D_i}, \Sigma_{B_{ij}}; \theta_R)$$

in which $\Sigma_R(\ldots)$ denoted an uncertainty estimation function learned for 3D object localization, and in this context $\Sigma_{R_{ij}}$ denoted the online modelled online uncertainty for object j and frame i. Other possible dependences (i.e. uncertainty source inputs $x_R$ for 3D object localization) include:
- image content, e.g. a detected type/class of object j
- weather conditions
- lighting conditions
- measure of occlusion for object j (e.g. a simple example: the 3D object detection uncertainty $\Sigma_R$ may be increased by a fixed amount when it is determined that object j is partially occluded).
- Orientation and/or motion of object j relative to the camera One example application, as indicated on the right-hand side of FIG. 18, is that uncertainty estimates on 3D object detection outputs determined at different time instants (i.e. for different frames) may be fused in a way that respects their respectively levels of uncertainty (i.e. weights them according to uncertainty); for example, using a Kalman filter.

In general, a Kalman or other Bayes filter may be applied to fuse two or more structure observation inputs for which respective uncertainty estimates are provided. It is noted that, in this context, the structure observation inputs may be derived from the different sensor modalities (such as optical, LiDAR, RADAR etc.) or from the same sensor modalities but at different times (possibly from the same sensor(s) at different times).

A Kalman filter fuses multiple observations across time. Adapted observation uncertainty (covariance) per frame allows for correct weighting of reliable an unreliable (or less reliable) observations.

Figure 21A:
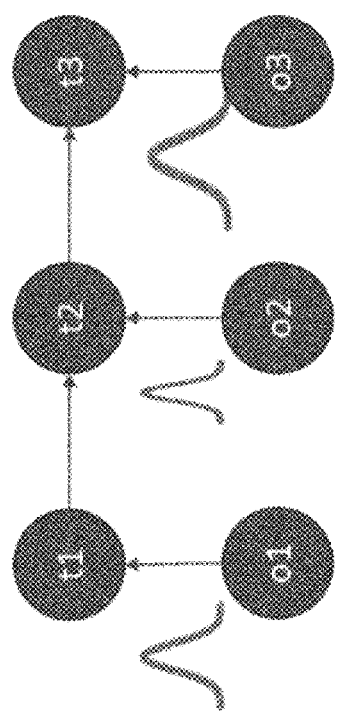
FIG. 21A illustrates general principles of a Kalman filter which operates on single observations at different time instants.
Figure 21B:
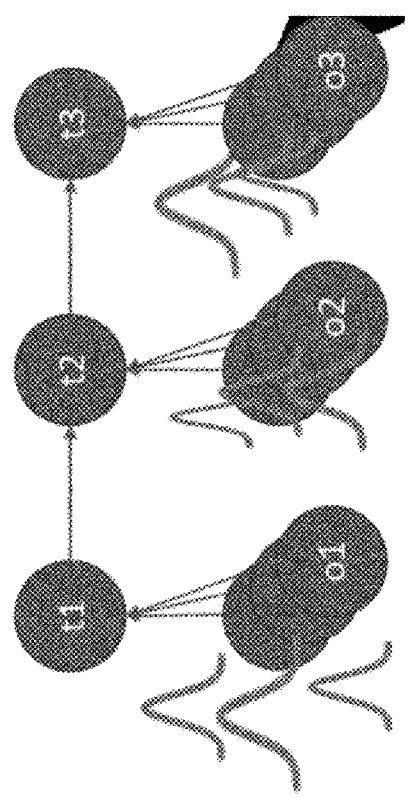
FIG. 21B illustrates general principles of a Kalman filter which operates on multiple observations at different time instants.

FIG. 21A shows a schematic block diagram of an example Kalman filter which operates on a single perception modality but at different time instants (time instants $t_1$, $t_2$, $t_3$ are labelled by way of example). In this case, for each time instant $t_i$ (~frame i) on which the Kalman filter operates, the Kalman filter determines a fused perception output for that time instant based on a single observation $o_i$ (such as observations $o_1$, $o_2$, $o_3$) for provided that time instant $t_i$. Hence, the structure observation inputs to the Kalman filter for time $t_i$ are:
1. The observation $o_i$ made at time $t_i$, and
2. An input derived from one or more earlier observations (such as the fused perception output computed for the previous time instant $t_{i-1}$)

The same principles can extend to multi-modal fusion: good estimates of the covariance per modality leads to the correct weighting when those estimates are combined.

FIG. 21A shows an extension in which multiple observations are provided for each time instant, e.g. from different sensors and/or different perception modalities. Assuming N observations are made per time instant, there are at least N+1 structure observation inputs to the Kalman filter for each time instant, namely the N observations made at that time instant $t_i$ plus at least one input derived from earlier observation(s) (such as the fused perception output computed at time $t_{i-1}$).

Thus it can be seen that the different structure observation inputs to which a Kalman filter is applied at a different time instance can correspond to the 'same' observation (i.e. the same perception modality) but at different times.

In FIG. 3, this could for example be the Kalman filter 57 implemented as part of the 3D object tracking at block 56.

Figure 19:
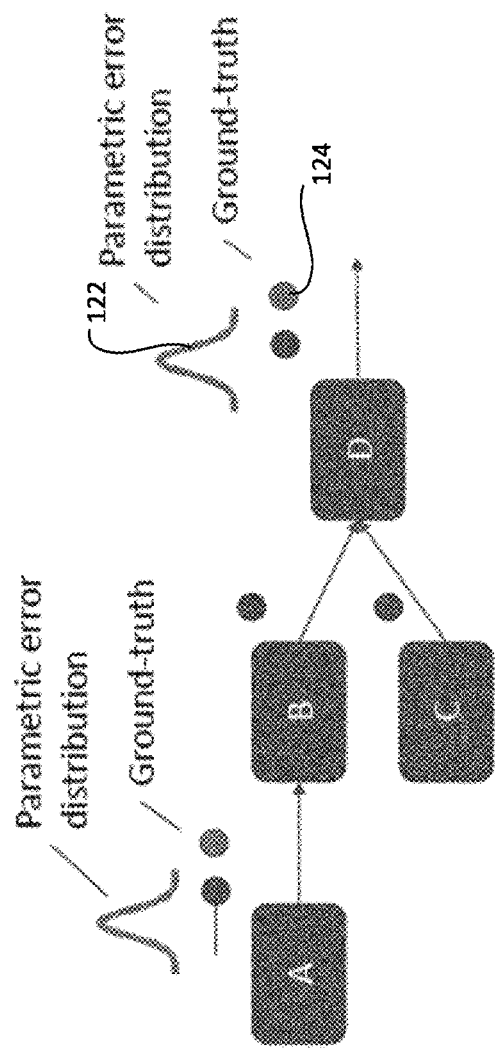
FIG. 19 illustrates the general principles of higher-level uncertainty learning by direct comparison with ground truth.

FIG. 19 shows an alternative approach for learning an uncertainty estimation function for a higher-level perception component such as 3D object localization. In this case, rather than sampling based on its probabilistic inputs, a parametric error model is determined for the 3D object localization output directly by comparison with 3D object localization ground truth (such as manually annotated 3D bounding boxes). In FIG. 19, 3D object localization corresponds to component D, and a parametric error model 122 is determined for 3D object localization by directly comparing the 3D object localization with corresponding ground truth 124. This is preferable in one sense because it can reveal unexpected sources of uncertainty, based on unexpected deviation from ground truth. However, obtaining the necessary 3D ground truth data requires significant time and effort, due to the need for 3D annotation. The direct approach of FIG. 19 may therefore be used in combination with the uncertainty propagation/sampling approach described above. For example, significant sources of uncertainty may be determined based on comparison with 3D ground truth, and then modelled using the uncertainty propagation method.

Figure 3A:
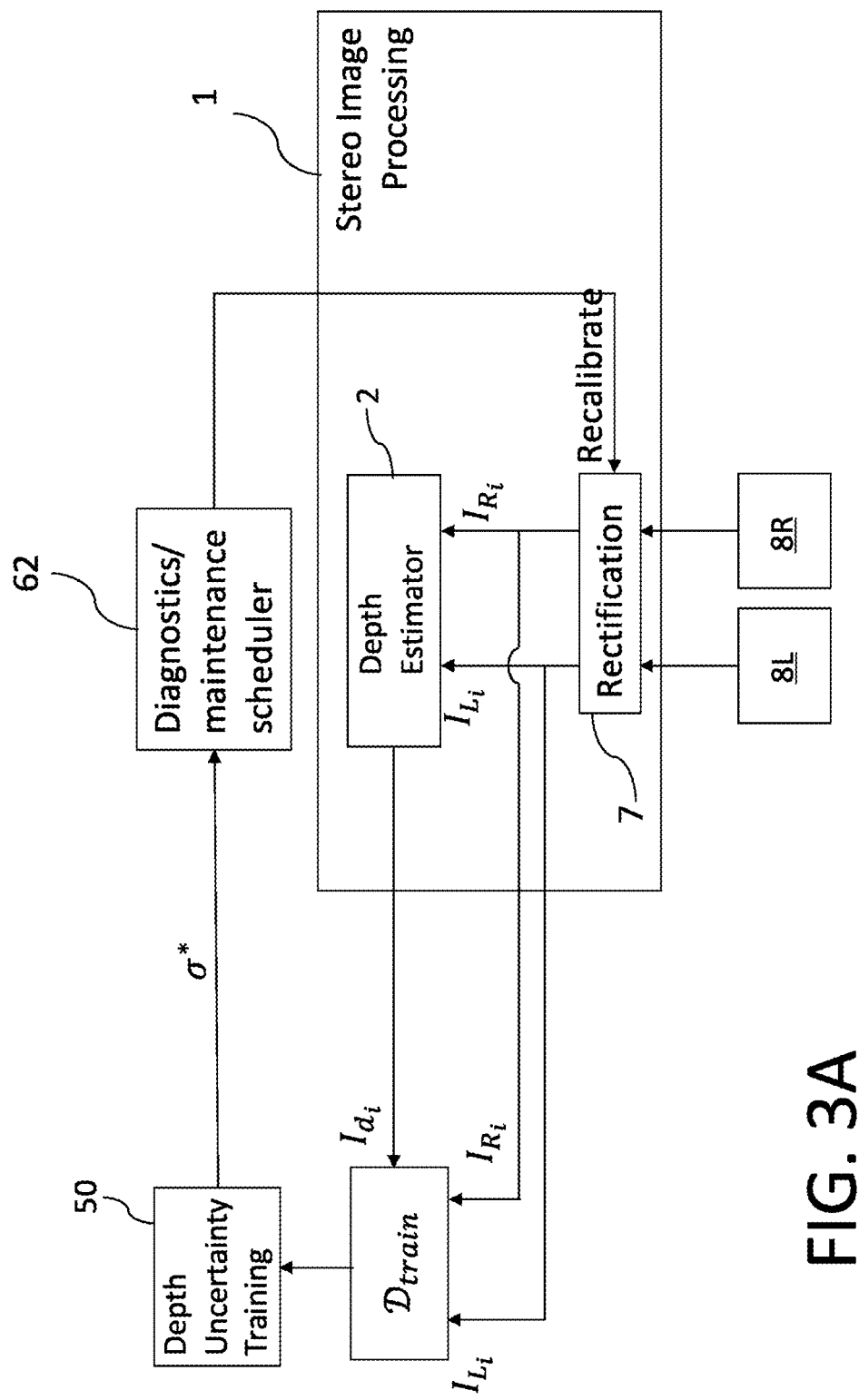
FIGS. 3A and 3B show further details of an AV perception pipeline.

FIG. 3A shows further details of the perception pipeline which are omitted from FIG. 3, and which are relevant to optical sensor calibration. FIG. 3A shows how changes observed in the depth uncertainty estimation parameters σ* (more generally, $\theta_D$), can cause the diagnostics and maintenance scheduler 62 to instigate a (manual or automatic) re-calibration of the image rectification applied by the image rectifier 7 of the stereo image processing system 1.

More generally, miscalibration in the optical sensors 8L, 8R can be determined through statistical analysis of depth estimates derived from those sensors—using either a supervised approach in which e.g. LiDAR is used as comparable ground truth (of the kind described above), or an unsupervised approach of the kind described below. In the supervised approach, miscalibration is detected based on a measured discrepancy between stereo depth estimates and corresponding ground truth such as simultaneously captured LiDAR.

By executing the training process repeatedly in respect of stereo depth, changes in the uncertainty associated with stereo depth estimates can be tracked, and in particular any general trends of increasing depth uncertainty can be detected. Such changes may for example result from physical disruption to the stereo image capture device 8. For example, even slight shifts in the relative orientation of the stereo image capture unit 8L, 8R (i.e. changes in their misalignment) can mean that any rectification that is applied to the captured stereo image pairs within the stereo image processing system 1 no longer fully compensates for the misalignment of the image capture units 8L, 8R. Such changes in the extent of misalignment between the left and right image capture units 8L and 8R can be detected as an increase in the average uncertainty associated with depth estimates produced by the depth estimator 2. For this reason, the uncertainty estimation parameters σ* are shown to be provided as an input to the diagnostics and maintenance scheduler 62 for the purpose of detecting general increases in the average depth uncertainty. If the new value(s) of the uncertainty estimation parameters σ* meet a calibration trigger condition (e.g. if the average uncertainty increases above a certain threshold), then the diagnostics and maintenance scheduler 62 can schedule an appropriate calibration action such as a recalibration of the image rectifier 7 for the stereo image capture units 8L, 8R. This can be an automatic calibration process performed by the AV 40 or it can be a manual calibration that is instigated in response to an alert or other notification instigated by the diagnostics and maintenance scheduler 62 when the calibration trigger condition is met.

This is another example of practical context in which robust stereo uncertainty estimates can drive important decisions that are taken by or in relation to an autonomous vehicle 40.

Figure 3B:
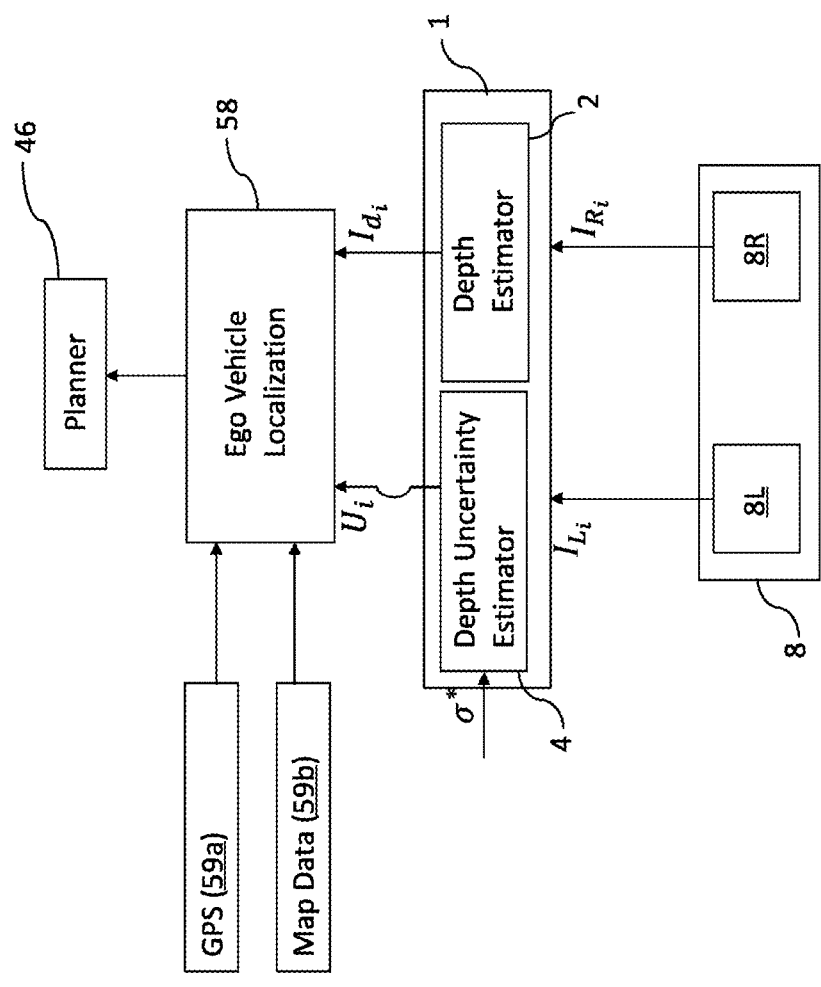

FIG. 3B shows additional details of the perception pipeline, which are omitted from FIG. 3, and which relate depth uncertainty in the context of vision-based ego-vehicle localization.

In addition to external object tracking, the AV 40 also needs to have some understanding of its own location relative to its surroundings. For example, the autonomous vehicle 40 needs to understand where it is currently located relative to surrounding road structure etc.

The function of an ego vehicle localisation component 58 is to determine a location of the autonomous vehicle 40 (the ego vehicle) relative to its surroundings, and in particular its location on the road. It can use a variety of information sources to do this including, for example, satellite positioning data 59a (e.g. GPS) and road map data 59b. In addition, in the present example, the ego vehicle localisation component 58 also uses image data as a basis for localisation. By applying image segmentation to images captured by (in this example) the right image capture unit 8R, it can detect and identify surrounding road structure at various levels of granularity. This detected road structure can then be matched to the predetermined map data 59b in order to determine the location of the AV 40 on a road map encoded in the road map data 59b. For further details of this kind of "vision-based localisation" see International Patent Application No. PCT/EP2019/056355, which is incorporated herein by reference in its entirety. In brief, this discloses the use of vision-based localisation together with other forms of localisation which are combined using a particle filter, Kalman filter or similar in a way that respects their relative levels of uncertainty. Depth data is used in this context to transform images captured by the right image capture unit 8R into a co-ordinate system that can be compared to the map data 59b. In general, the map data 59b encodes a 2D high definition (HD) road map and, in order to compare detected road structure with the road map, this needs to be projected geometrically into the plane of the road map. This provides a top-down view of detected road structure in the vicinity of the AV 40 which can be matched to corresponding road structure on the road map. The projected road structure has an uncertainty associated with it which comes from a combination of the uncertainty associated with the image segmentation process that is applied to detect the road structure but also the uncertainty associated with the depth data that is used to perform the geometric projection into the plane of the road map. These two uncertainty estimates are combined in order to provide an overall measure of uncertainty associated with the vision-based localisation. This in turn can be used to combine the vision-based localisation results with other localisation inputs such as GPS 59a in a way that respects their respective levels of uncertainty. This is described in further detail in the above-referenced document. The output of the ego vehicle localisation process also serves as an input on which planning decisions by the AV planner 46 are based, and this is therefore another way in which depth uncertainty can influence AV driving decisions.

Unsupervised Depth Uncertainty Training

An unsupervised approach to learning depth uncertainty will now be described. As indicated, this approach may be applied as an alternative to the supervised approach described above, in order to lean the one or more uncertainty estimation parameters $\theta_D$, for which the notation σ* is used in the present context.

Once learned, these parameter(s) can be used to quantify the uncertainty in disparity estimates from stereo cameras in real-time.

An unsupervised Bayesian algorithm is used to predict the uncertainty in depth predictions. Training uses a pair of rectified stereo images and a disparity image, it is generally performed offline. Variational inference is applied to make the training computationally tractable on large datasets. The resulting model is simple and can be evaluated with minimal computational overhead online, in real-time. The method can also be applied to mono-depth detection from a single image as explained below.

The described method is agnostic to the depth estimation used, which is treated as a "black box".

Moreover, the uncertainty can be computed as a covariance, which allows it to be propagated with Bayesian methods; in turn, allowing it to be used in a probabilistic robotics setting (see below for further details).

The approach fills a gap in the prior art, since no previous uncertainty quantification methods have been presented that run in real-time, allow a Bayesian interpretation and are agnostic to the stereo method used.

Moreover, the training process is unsupervised (i.e. it does not require ground-truth depth data, such as LiDAR), which allows a large, dense and diverse dataset to be cheaply collected (although sparse LiDAR data can be used for verification in the present context, as described later). An alternative would be to use LiDAR data as ground truth for supervised depth uncertainty training. However, a disadvantage of that approach is that LiDAR data is sparse; and whilst interpolation schemes and model fitting can be used to improve the density of LiDAR ground truth, this introduces artefacts which cause the uncertainty measure to be distorted. Hence, the present method has significant benefits over the use of supervised depth estimation training based on ground-truth LiDAR data.

The method can also perform effectively where the noise may be unevenly distributed. This may be due to various reasons, e.g. objects close-by may have a different appearance from the ones far away and reflections may introduce large noise within confined regions.

As noted, bayesian fusion may require uncertainty estimates in the form of covariances. The present method allows for direct computation of a stereo depth covariance directly, hence a benefit of the method is that is provides a depth uncertainty estimate in a form that can be directly input (without conversion) to a Kalman filter or other Bayesian fusion component (in contrast to existing confidence-based methods, as outlined below). In other words, the method directly provides the uncertainty estimate in the form that is needed for Bayesian sensor fusion in order to be able to fuse it effectively with other measurements in a way that respects uncertainty.

By way of testing and validation, the described method has been benchmarked on data collected from the KITTI dataset. The method has been compared to an approach using a CNN to estimate depth and variational drop out to determine the uncertainty. In each case the uncertainty estimate is validated against ground truth. The results are provided at the end of this description. As described in further detail bellow, the method predicts left-right pixel disparity between a stereo camera pair, which is directly related to distance through an inverse mapping and parameterised by the intrinsic camera calibration. The depth uncertainty is quantified in disparity rather than depth space, since the target methods directly operate on pixels (e.g. Semi-global Matching or monocular disparity from CNNs) and thus its errors are naturally quantified in pixel space. Depth errors in disparity space can be straightforwardly converted to distance errors, as needed, based on the inverse mapping between disparity and distance, as described above and in further detail below. Different approaches exist to estimate uncertainty in the outputs of algorithms. If the algorithm is understood well then one can estimate uncertainty in the inputs and propagate these through the algorithm. Alternatively, in a supervised learning approach, ground truth data can be used to find a function which represents the average empirical error (deviation of the algorithm's predictions from the data). In some circumstances this function can be estimated by unsupervised approaches. Bayesian theory offers a computationally tractable and logically consistent approach to understanding uncertainty.

However, disparity uncertainty is deceptively difficult to calculate as the ground truth data available is often insufficient for supervised learning. Sampling based uncertainty algorithms (e.g. MCMC (Markov Chain Monte Carlo) simulation) perform poorly for stereo depth estimates as the disparity images have high dimensionality, and independence assumptions are incorrect since the pixel correlations enforced by the cost functions contribute strongly to the performance of the algorithms. Furthermore, the full cost function of stereo algorithms is expensive to calculate and thus uncertainty in-formation is not available in real-time.

Alternatively, disparity can be estimated from monocular images using a CNN. Variational drop-out is one of the standard methods to obtain predictive uncertainty and thus can be used to quantify the depth uncertainty. However, the process is computationally intensive since it involves multiple passes through the CNN, and thus is not suitable for real-time applications.

Methods exist for determining the confidence in a stereo disparity estimate exist—see [17]. These provide a confidence measure, denoting the probability of a given pixel being correct. However, these provide confidence measures cannot be directly transformed into co-variance matrices, so cannot be used with Bayesian fusion methods. These methods can be adapted to create a covariance matrix, e.g. with the application of the Chebyshev inequality, but this requires resampling, which makes the method insufficiently fast.

The approach to estimating the stereo depth uncertainty described herein provides a system that can be used in real time settings, outputs measures that can be readily transformed into a covariance matrix useful for fusion methods, and is agnostic to the stereo method used.

Figure 15:
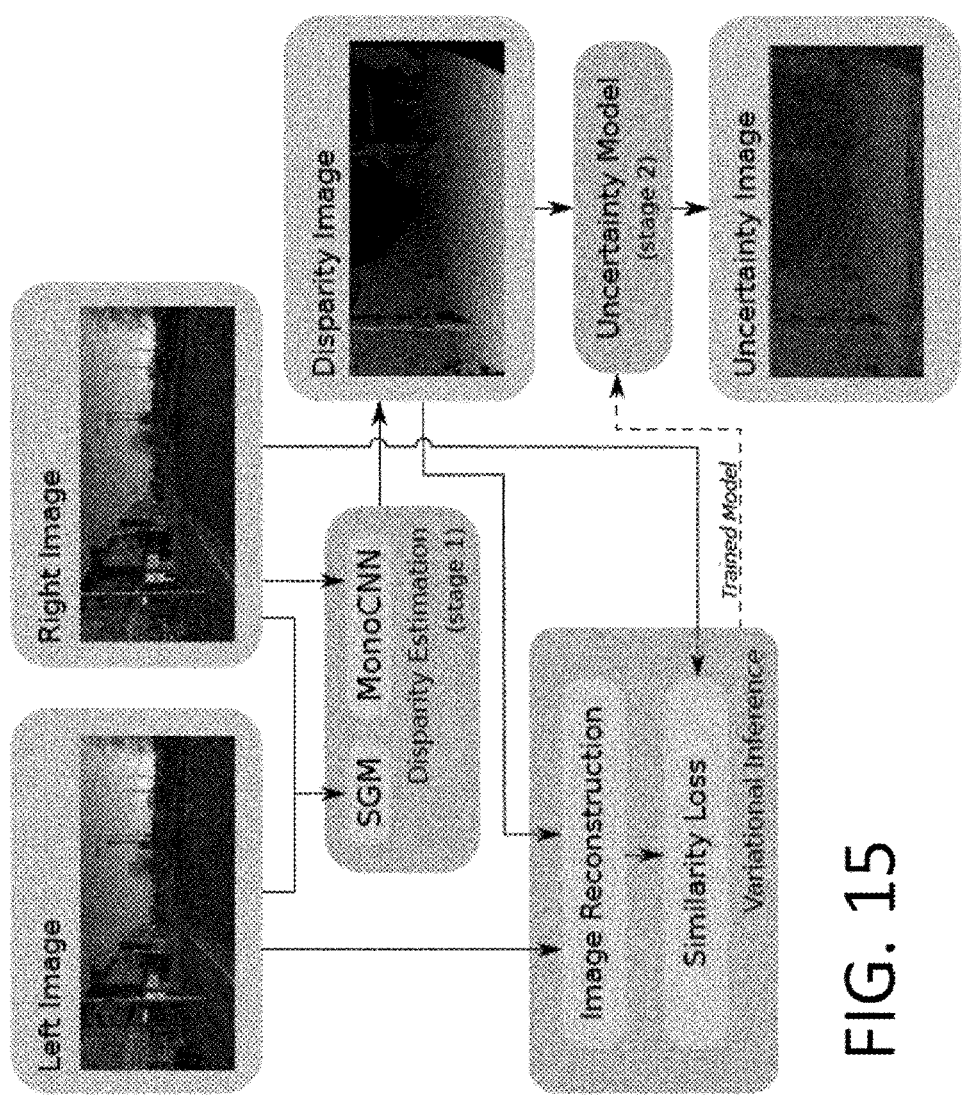
FIG. 15 is a schematic overview illustrating how an uncertainty model may be trained and used in practice.

FIG. 15 is a schematic showing how an uncertainty model is trained and used in practice, in accordance with the described embodiments. At a first stage, a standard disparity estimation technology, such as SGM or CNN, is applied to produces point estimates. At a second stage, an uncertainty model (UM) receives the point estimates as input and predicts the uncertainties—encoded as variances-per pixel. At run-time the UM is implemented as a look-up table detailing the variance. The lookup can be dependent on pixel location and disparity value. The UM can be stored as an array, meaning the result can be looked up in O(1) time.

The UM uses an unsupervised training scheme. Three inputs are given: the left and right rectified stereo images and a disparity map. Importantly for real world applications the unsupervised approach allows a large variety of data, in different environ-mental conditions, to be cheaply collected and processed.

Using the left and disparity images, the right image is reconstructed. The reconstruction is compared with the original right image and structural similarity is used to infer the error in the disparity. With a large corpus of data, the errors can be combined into a variance. The UM training is explained in detail below.

It is noted that, although stereo images are needed in this context to allow the reconstruction and comparisons, the depth estimate itself need not be stereo. Rather, it can be a monocular depth estimate extracted from only one of the images—as shown in FIG. 15, which shows how a depth image may be computed from only the right image. A reconstruction of the right image can be computed, for comparison with the original, in the same way, based on the left image and the mono depth estimate.

The unsupervised training scheme is a form of Bayesian unsupervised machine learning. Depth uncertainty training is performed offline (generally not in real-time) with no requirement for ground truth depth data. Once the training has been completed, depth uncertainty estimation can be performed in real-time at inference, using one or more uncertainty estimation parameters σ* learned in training.

This harnesses the principles of Bayesian theory to provide a computationally tractable and logically consistent approach to understanding depth uncertainty. Uncertainty is represented by probability distributions and inference is performed by applying a probability calculus, in which a prior belief is represented by a prior probability distribution and an understanding of the world is represented by a likelihood function. In most cases, the inference cannot be performed analytically so a sampling-based algorithm is used to perform it approximately. In the described embodiments, the sampling algorithm is an optimisation-based algorithm such as "variational inference".

An unsupervised Bayesian reconstruction strategy is used to calibrate several models of the standard deviation of pixels in an SGM (semi-global matching) or other estimated disparity image. Specifically, a search is performed for a standard deviation (scalar or non-scalar) which maximises the log likelihood of a reconstructed image (reconstructed from one image of a rectified stereo image pair), using the structural similarity loss (SSIM) between the reconstructed image and the other image from the rectified pair. This is performed across a set of training data.

The approach may be validated by applying Bayesian Model Selection and posterior checks using ground truth from a validation dataset (containing LiDAR scans collected simultaneously with the training data).

The training process described in this section may be executed on an intermittent basis according to a schedule that is determined by a diagnostics and maintenance scheduler 62 of the AV 40, as outlined above. For example, the training process may be repeated on a daily or weekly basis or in any other way specified by the schedule in order to regularly update the depth uncertainty estimation parameters $\sigma^*$. This is one example of a form of statistical analysis which can be used as a basis for sensor re-calibration scheduling (although, as noted, other forms of statistical analysis may be used in this context, such as the measurement of discrepancy in stereo depth from ground truth LiDAR).

Although the depth uncertainty training component 50 is shown to be implemented within the on-board computer system 42, the collected training data could instead be uploaded to an external training computer system for executing the training process at the external training computer system. In that event, once the training process has been executed externally, the depth uncertainty estimation parameters $\sigma^*$ obtained as a result can be downloaded from the external training system to the AV 40. Once downloaded, those parameters can be used in exactly the same way. It will thus be appreciated that all references herein to a training computer system can, depending on the context, refer to the on-board computer system 42 of the AV 40 itself or to an external training computer system to which the relevant training data D train is provided.

Returning to FIG. 1, as noted above, the uncertainty estimate $U_i$ is determined based on one or more depth uncertainty estimation parameters $\sigma^*$. The following description pertains to depth uncertainty learning, and those parameter(s) may be referred to simply as uncertainty estimation parameter(s) for conciseness. The one or more uncertainty estimation parameters $\sigma^*$ are predetermined in an offline training phase using a form of unsupervised machine learning referred to as "variational inference". This is described in detail later.

Herein, $\sigma^*$ may be referred to as a set of uncertainty estimation parameters or similar (noting for the avoidance of doubt that a parameter set can contain multiple parameters or consist of a single parameter). The depth estimate $I_{d_i}$ for the stereo image pair 6 and the uncertainty estimate $U_i$ for that depth estimate $I_{d_i}$ are provided as associated outputs of the stereo image processing system 1.

As described in further detail below, the determination of the uncertainty estimate $U_i$ is dependent on a selected "perturbation model".

FIG. 1 shows the uncertainty estimator 4 coupled to the depth estimator 2 for receiving the depth estimate $I_{d_i}$, and for certain perturbation models the uncertainty $I_{U_i}$ is indeed computed based on a combination of the uncertainty estimation parameters $\sigma^*$ and the values of the disparity map $I_{d_i}$. However, for other perturbation models, the estimated uncertainty $U_i$ may be independent of the actual computed values of the disparity map $I_{d_i}$. In that case, the uncertainty estimation parameters directly provide the uncertainty estimate for every computed disparity map. Illustrative perturbation model examples are described later.

The stereo image processing system 1 process stereo image pairs in real-time—for example, at a rate of at least 10-30 image pairs per second, to produce that number of depth estimates per second. The rate can be different on different cameras, and it will be appreciated that frame rates of 10 Hz and 30 Hz are given merely by way of example.

Figure 4:
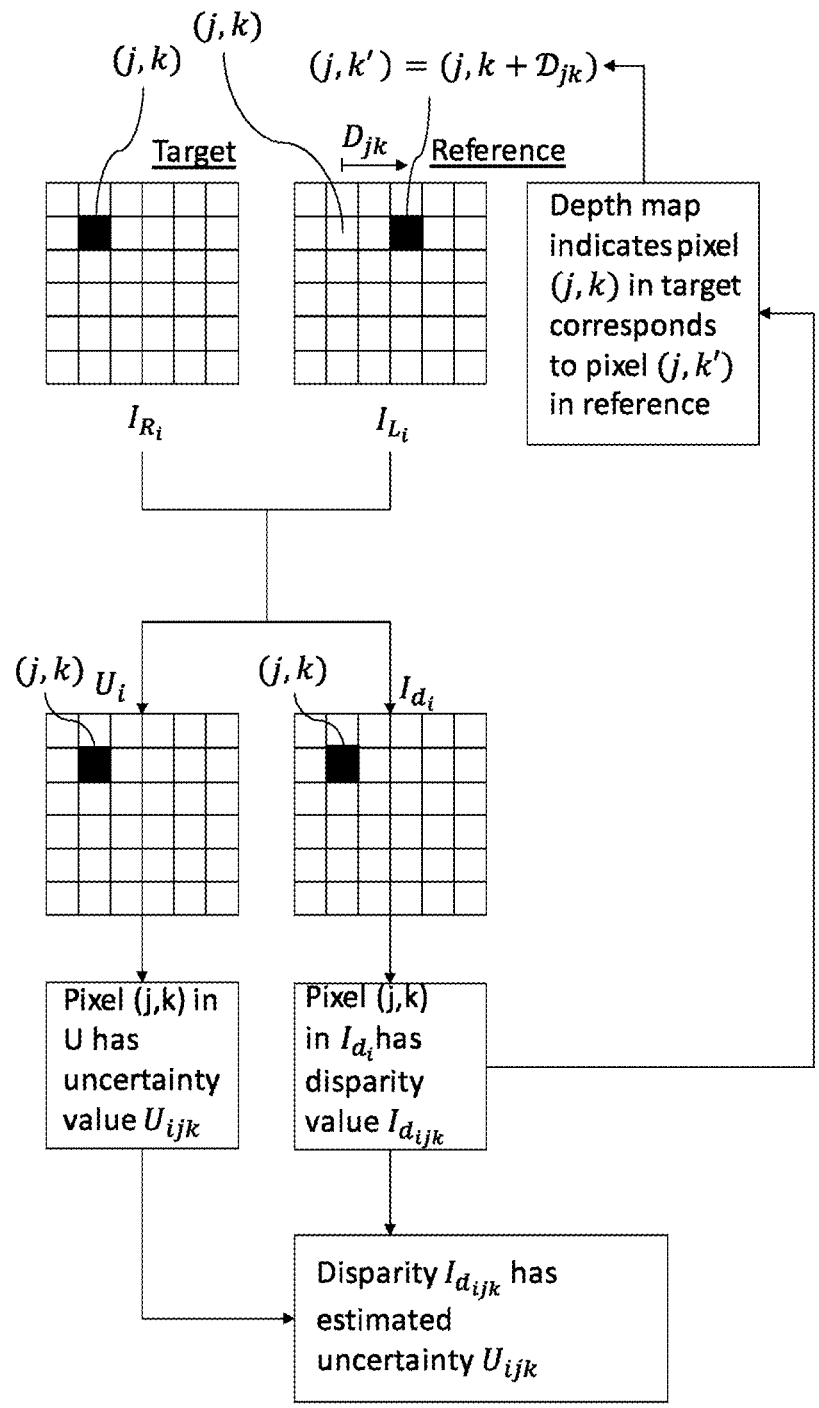
FIG. 4 illustrates the relationship between a stereo image pair, a disparity map estimated therefrom, and an uncertainty estimated for the depth map.

FIG. 4 is a schematic diagram which illustrates the relationship between a stereo pair of images $I_{L_i}$, $I_{R_i}$, the disparity map $I_{d_i}$ estimated for that image pair, and the uncertainty estimate $U_i$ for that depth estimate $I_{d_i}$.

Unless otherwise indicated, the subscript i herein is a frame index. A frame in this context means a stereo image pair, hence $I_{L_i}$, $I_{R_i}$ constitute frame i and $I_{d_i}$ is the depth estimate for frame i. The index i serves as a label for the tuple $(I_{L_i}, I_{R_i}, I_{d_i})$.

The disparity map $I_{d_i}$ is a rank 2 tensor having dimensions J×K, where the value of each component (pixel) of $I_{d_i}$ is a disparity for pixel (j,k) in the target image of the stereo image pair 6:

$$I_{d_i} = (I_{d_{ijk}}) = \begin{pmatrix} I_{d_{i,0,0}} & \cdots & I_{d_{i,0,K}} \\ \vdots & \ddots & \vdots \\ I_{d_{i,J,0}} & \cdots & I_{d_{iJK}} \end{pmatrix} \quad \text{Equation 1}$$

Herein, "pixel (j,k)" means the pixel at location (j,k) in the relevant tensor; or, more precisely, the pixel of that tensor having index (j,k). In the above notation, the value of pixel (j,k) is $I_{d_{ijk}}$.

In the present example, the left image $I_{L_i}$ is used as the reference image, hence according to the estimated disparity map $I_{d_i}$, pixel (j,k) of the right image $I_{R_i}$ (the target image) corresponds to pixel (j, k') of the left image $I_{L_i}$ with:

$$k' = k + I_{d_{ijk}} \quad \text{Equation 2}$$

That is, pixel (j,k) in $I_{R_i}$ is estimated to correspond to the pixel in $I_{L_i}$ that is horizontally offset from location (j,k) by an amount $I_{d_{ijk}}$.

The principles of stereo (stereographic) image processing are well known and are therefore only described briefly in order to provide context to the above.

Figure 5:
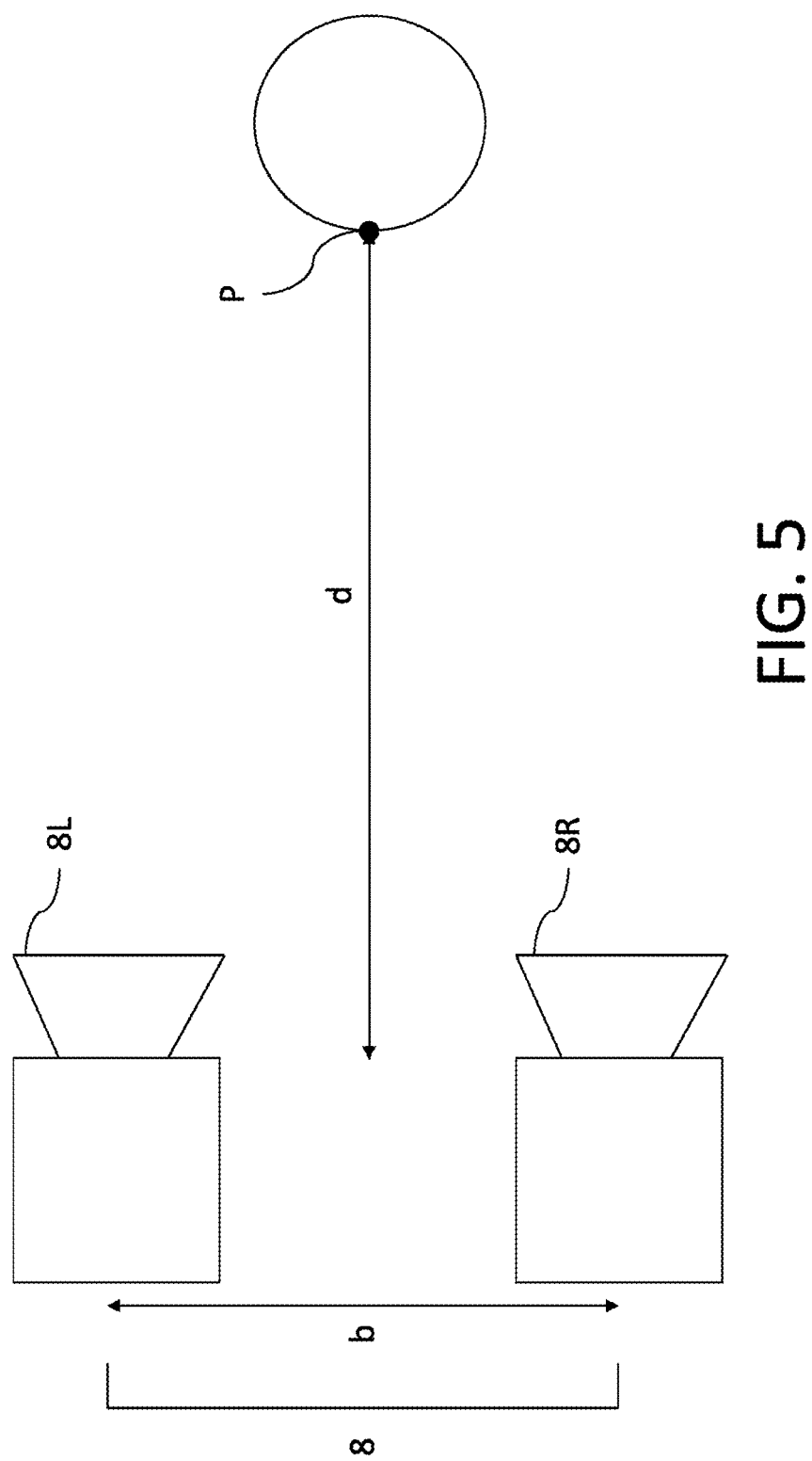
FIG. 5 shows a schematic plan view of a stereo image capture device.

FIG. 5 shows a highly schematic plan view of a stereo image capture device 8 comprising left and right image capture units (equivalently referred to herein as cameras or optical sensors). The left and right image capture units are denoted by reference numerals 8L and 8R respectively. The image capture units 8L, 8R have overlapping fields of view such that at least part of an object 10 is contained within both fields of view. The image capture units 8L, 8R simultaneously capture left and right images $I_{L_i}$ and $I_{R_i}$ respectively. Those simultaneously captured left-right images $I_{L_i}$, $I_{R_i}$ constitute a stereo image pair. The object 10 (or at least part of it) appears in both of the images $I_{L_i}$ and $I_{R_i}$. However, the relative location of that object 10 in each of the images may be different and such differences are used to infer the depth of the object.

In the plan view of FIG. 5, it can be seen that the image capture units 8L and 8R are horizontally offset from each other by a distance b (the baseline). A point P on the object 10 (scene point) has a depth d relative to the image capture device 8, i.e. it is a distance d away from the image capture units 8L, 8R in a direction generally parallel to their optical axes.

Returning to the top-half of FIG. 4, assuming scene point P corresponds to pixel (j,k) in the right image $I_{R_i}$ (target image), then that scene point P will correspond to the pixel horizontally offset from that pixel by an amount $$\frac{bf}{d}$$

where b is the baseline, $f$ is the focal length of the cameras, and d is the depth of point P. The aim of the depth estimation is to determine values for the disparity map such that:

$$I_{d_{ijk}} \approx \frac{bf}{d} \qquad \text{Equation 3}$$

The depth estimation does this by searching for matching pixels in the left and right images based on intensity/feature matching etc., in order to compute $I_{d_{ijk}}$.

This assumes that each of the cameras 8L, 8R has the same focal length, although this is not essential as techniques exist for dealing with cameras with unequal focal length.

Hence the depth d of pixel (j,k) in the right image $I_{R_i}$ can be estimated in units of distance from the computed disparity $I_{d_{ijk}}$ given sufficient knowledge about the relevant physical attributes $f$, b of the image capture units 8L, 8R.

Regarding terminology, it is noted for the avoidance of doubt, it that the disparity map $I_{d_i}$ may be referred to herein as a depth estimate. In general, a "depth estimate" can be any depth information extracted from a stereo image pair, such as a disparity map (which is considered to quantify depth in inverse units of distance and on a scale that depends on the camera geometry and optics).

As will be apparent, this assumes that the left and right images $I_{L_i}$, $I_{R_i}$ have been rectified such that, for every pixel in $I_{L_i}$, the corresponding pixel is only ever horizontally offset from the location of that pixel in the right image, i.e. the vertical offset between corresponding pixels in the left and right images is always zero. Rectification is the process of making the images $I_{L_i}$, $I_{R_i}$ co-planar. This ensures that epipolar lines in the images are horizontal, so that each scene point's projection in the images can only be offset horizontally and not vertically. This is a geometric transformation determined as part of a camera calibration process and applied to each stereo image pair 6 that is captured by the stereo image capture device 8 within the stereo image processing system 1 (by the image rectifier 7).

Returning to FIG. 4, the granularity of the uncertainty estimate $U_i$ depends on the perturbation model. It can be a single uncertainty value associated with the depth map $I_{d_i}$ as a whole (as in perturbation model 1 below), or it can be a set of uncertainty values associated either with respective regions (e.g. "superpixels") of the depth map $I_{d_i}$ (as in perturbation model 3 below) or with individual pixels (as in perturbation model 2 below).

In the example of FIG. 4, the uncertainty estimate $U_i$ is provided at pixel-level granularity: it is therefore a rank 2 tensor having dimensions matching those of the disparity map $I_{d_i}$, and the value of each pixel (j,k) of the uncertainty estimate $U_i$ indicates the level of uncertainty associated with the corresponding pixel (j,k) of the disparity map $I_{d_i}$. That is, in mathematical notation, $U_{ijk}$ is the estimated level of uncertainty in disparity $I_{d_{ijk}}$.

The uncertainty $U_i$ in the estimated disparity map $I_{d_i}$ is estimated herein according to the principles of Bayesian statistics.

Figure 6:
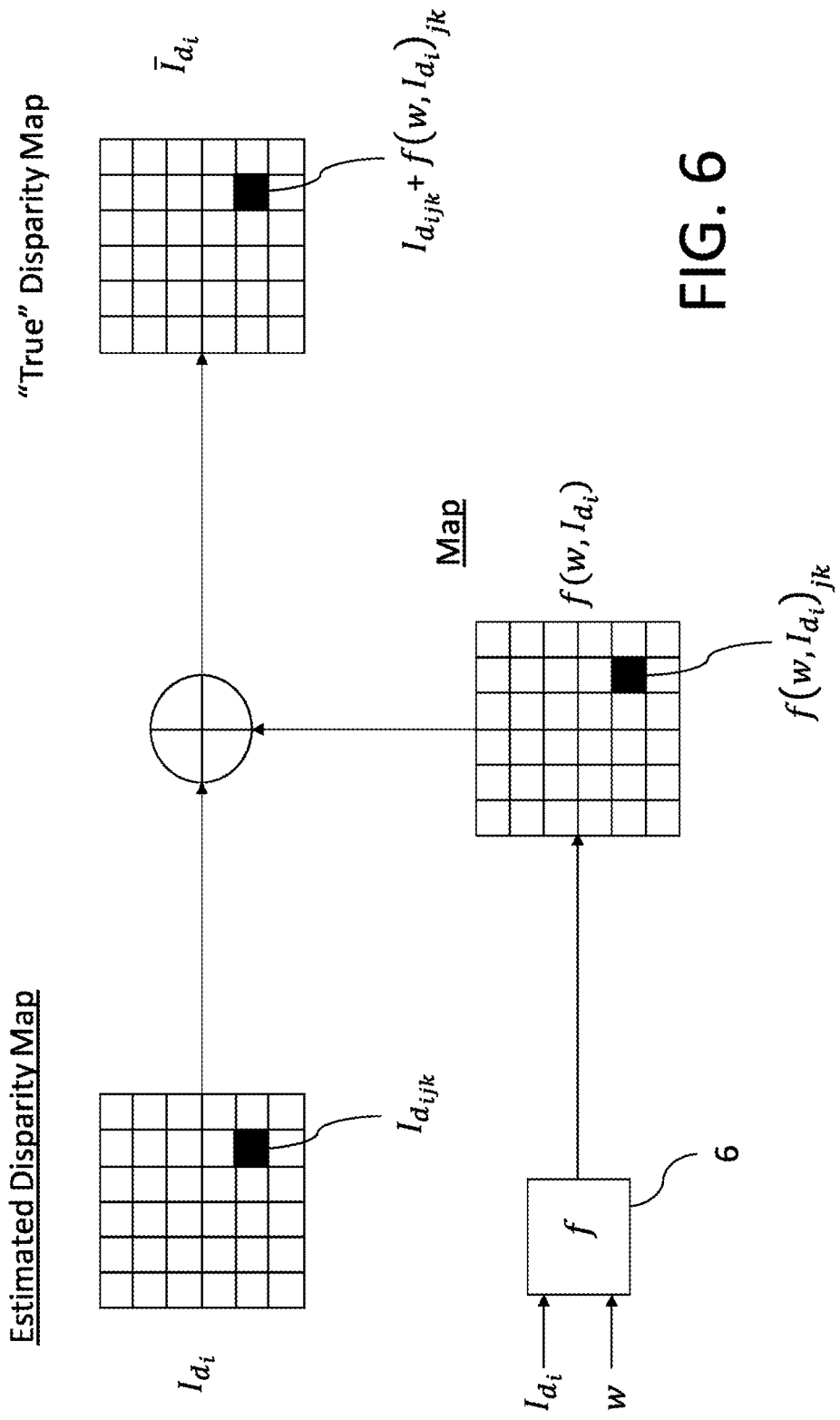
FIG. 6 shows a schematic function block diagram of a perturbation function.

With reference to FIG. 6, given any estimated disparity map $I_{d_i}$ computed by the depth estimator 2, it is notionally assumed there exists some "true" disparity map represented by $\bar{I}_{d_i}$, which may differ from the estimated disparity map $I_{d_i}$. The true disparity map $\bar{I}_{d_i}$ is of course unknown. However, although the true disparity $\bar{I}_{d_i}$ cannot itself be determined, it is possible to estimate a probability distribution for the true disparity map $\bar{I}_{d_i}$ given the estimated probability distribution $I_{d_i}$. This is represented using Bayesian notation as:

$$P(\bar{I}_{d_i} \mid I_{d_i}). \qquad \text{Equation 4}$$

In other words, given any estimated disparity map $I_{d_i}$, the probability distribution indicates the probability that the true disparity map is actually $\bar{I}_{d_i}$. In this context, the true disparity $\bar{I}_{d_i}$ is treated as an unknown variable (specifically an unknown rank 2 tensor) and the probability that the true disparity $\bar{I}_{d_i}$ takes a given set of values can be estimated given the disparity estimate $I_{d_i}$ that has actually been computed.

The distribution $P(\bar{I}_{d_i} \mid I_{d_i})$ may be considered a "generative noise model"—where the true disparity map is treated an unknown "true" signal $\bar{I}_{d_i}$ and the estimated disparity map $I_{d_i}$ is a "noisy" signal that is actually observed.

The uncertainty estimate $U_i$ is, in turn, determined as a covariance of the distribution $P(\bar{I}_{d_i} \mid I_{d_i})$, as described later.

In order to make the necessary computations tractable, a suitable perturbation model is selected. The perturbation model embodies a set of assumed restrictions on the relationship between the unknown true disparity map $\bar{I}_{d_i}$ and the given disparity estimate $I_{d_i}$. In other words, although the true disparity map $\bar{I}_{d_i}$ is unknown, the perturbation model places some reasonable constraints on the possible values that $\bar{I}_{d_i}$ can take for any given estimated disparity map $I_{d_i}$.

A number of example perturbation models are described later. Underpinning each of the described perturbation models is an assumption that the difference between the true disparity $\bar{I}_{d_i}$ and the given disparity estimate $I_{d_i}$ is captured as a function that depends, at most, on the disparity estimate $I_{d_i}$ and a set of one or more unknown perturbation weights w whose value(s) are unknown. That is to say, an assumption that:

$$\bar{I}_{d_i} = I_{d_i} + f(w, I_{d_i}) \qquad \text{Equation 5}$$

where $f$ is referred to herein as a "perturbation function" denoted by reference numeral 26 in FIG. 4. The perturbation function $f$ can take various functional forms, as described later. The output of the perturbation function, for a given estimated disparity map $I_{d_i}$ and a given set of perturbation weights w, is a "perturbation map" $f(w, I_{d_i})$. The perturbation map $f(w, I_{d_i})$ is a rank 2 tensor whose dimensions match $I_{d_i}$ and $I_{d_i}$. Pixel (i, j) of the perturbation $f(w, I_{d_i})$ is denoted $f(w, I_{d_i})_{jk}$ and represents the difference between the corresponding pixels of the true and estimated disparity maps.

As will be appreciated, w may be treated as a rank 0 tensor in the case of a single perturbation weight and higher rank tensor in the case of multiple perturbation weights.

It is assumed that:
- the (set of) perturbation weight(s) w is independent of the estimated disparity $I_{d_i}$ and the left and right images $I_{L_i}$, $I_{R_i}$ from which $I_{d_i}$ has been computed (any dependency of on the estimated disparity comes from the perturbation function $f$ itself); and
- if there are multiple perturbation weights, these are independent of each other.

Based on these assumptions, a "posterior" probability distribution over the perturbation weights w can be estimated given a suitable set of training data $\mathcal{D}_{train}$:

$$P(w \mid \mathcal{D}_{train}) \qquad \text{Equation 6}$$

The motivation is that $P(\bar{I}_{d_i} \mid I_{d_i})$ can be derived from $P(w \mid \mathcal{D}_{train})$.

To construct a perturbation model, a parametric form for the perturbation map is selected which encodes the constraints on the relationship between the estimated and true disparity maps $I_{d_i}, \bar{I}_{d_i}$.

Note, the notation $f(w, I_{d_i})$ reflects the fact that the perturbation function depends at most on w and $I_{d_i}$. However, in some models, the perturbation function may be independent of $I_{d_i}$ and depend only on the one or more perturbation weights w.

Offline unsupervised learning is used to estimate the posterior distribution $P(w \mid \mathcal{D}_{train})$. As explained in detail below, $P(w \mid \mathcal{D}_{train})$ is assumed to be a normal (Gaussian) distribution represented as:

$$q(w \mid \sigma) = \mathcal{N}(w; 0, \sigma^2) \qquad \text{Equation 7}$$

Note: $\mathcal{N}(w; 0, \sigma^2)$ may be written as $\mathcal{N}(0, \sigma^2)$ for simplicity below.

With a single perturbation weight, this is a univariate Gaussian with scalar variance $\sigma^2$. With multiple perturbation weights, this is a multivariate Gaussian with covariance matrix $\sigma^2$. The covariance matrix is diagonal to encode the assumption that the weights are independent of each other.

The purpose of training is to find value(s) of $\sigma$ which provide the best fit of $q(w \mid \sigma)$ to the training data $\mathcal{D}_{train}$. The one or more uncertainty estimation parameters $\sigma^*$ referred to above and shown in FIG. 1 correspond to the value of a (scalar variance or diagonal matrix) which provides the best fit to the training data.

Figure 7:
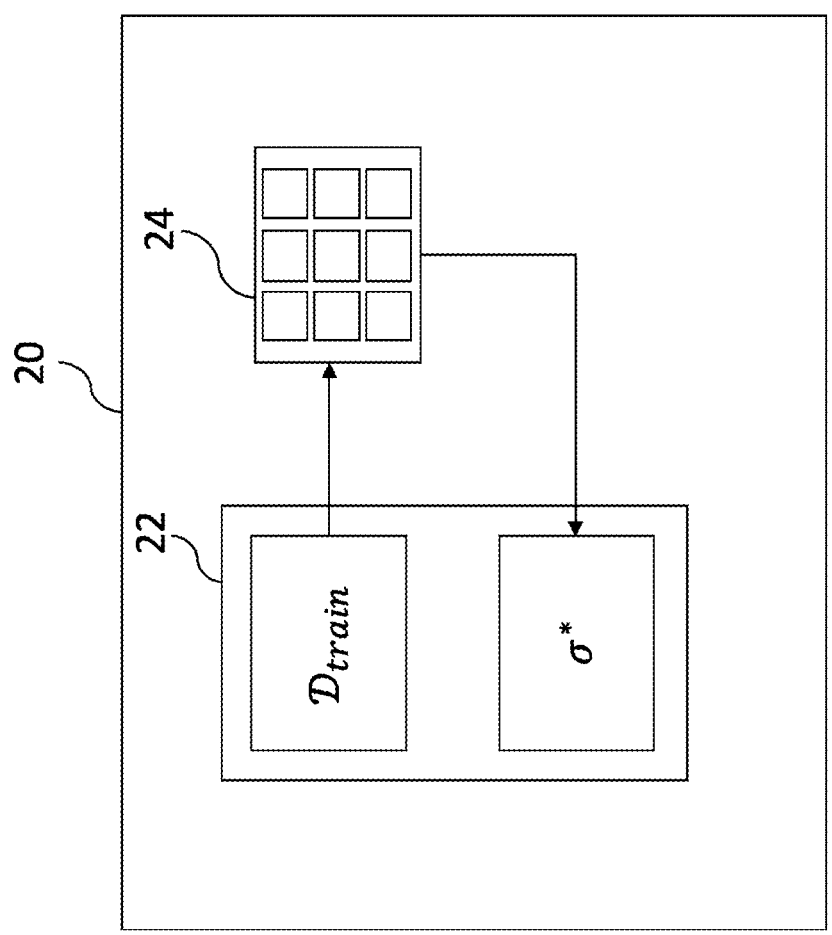
FIG. 7 shows a schematic block diagram of a training computer system.

FIG. 7 shows a schematic block diagram of a training computer system 20 in which the unsupervised training process is executed. The training computer system 20 is shown to comprise memory 22 in which the training data $\mathcal{D}_{train}$ is stored. The training process is executed on one or more processors of the training system 20. In FIG. 7, a plurality of processors 24 are shown in a parallel computing arrangement. Typically, this will include at least one CPU and one or more accelerators (such as GPUs) which operate under the control of the CPU to carry out the training process. The processors 24 are coupled to the memory 22. Each of the processors fetches instructions (not shown) from the memory 22 and executed those instructions (computer code) to perform operations of the training process. During the training process, the training data $\mathcal{D}_{train}$ is processed in order to ultimately obtain the one or more depth estimation parameters $\sigma^*$, which are determined in the training process to provide the best fit of $q(w \mid \sigma)$ to the training data $\mathcal{D}_{train}$.

The training process is described in the context of SGM depth estimation. However, no assumptions are made about the specifics of the depth estimation algorithm—this is treated as a "black box". Hence, the described techniques can be applied to any form of depth estimate.

An unsupervised strategy is used to train SGM uncertainty models using stereo image pairs collected from an optical camera pair and SGM disparity map estimates computed from those stereo image pairs. Each individual training example consists of one stereo image pair and the disparity map computed from it. For each training example, an expected right image is reconstructed from the left image and the disparity map and compared with the actual right image in a probabilistic Bayesian framework so that the uncertainty in the disparity map can be measured.

The depth estimator 2 of FIG. 1 is treated as a "quick-to-evaluate black box", which outputs a (best estimate) disparity image, $I_{d_i}$, given the left and right images, $I_{L_i}$ and $I_{R_i}$. The disparity image is aligned with the right image, such that it is a map from pixel coordinates in the right image to their horizontal offset in the left image.

The training data can be collected in road tests by a vehicle on which stereo image capture devices are mounted. This can for example be collected as the vehicle drives though urban settings. After collecting data from road tests, a dataset of images is obtained:

$$\mathcal{D} = (I_{R_i}, I_{L_i}, I_{d_i}) \qquad \text{Equation 8}$$

where $(I_{R_i}, I_{L_i}, I_{d_i})$ constitutes an individual training example; $I_{R_i}$ and $I_{L_i}$ being right and left images of a stereo pair, and $I_{d_i}$ being the estimated disparity map computed from $I_{R_i}, I_{L_i}$ by the depth estimator 2.

In certain contexts, it may be appropriate to partition $\mathcal{D}$ into training and validation sets $\mathcal{D}_{train}, \mathcal{D}_{test}$. However, in contexts where validation is omitted, $\mathcal{D} = \mathcal{D}_{train}$.

An unknown probability density over the disparity map is assumed to take the form:

$$P(\bar{I}_{d_i} \mid w, I_{d_i}) = \delta(\bar{I}_{d_i} - (f(w, I_{d_i}) + I_{d_i})) \qquad \text{Equation 9}$$

with perturbation weights (parameters) w, that produces the "true" disparity map, $\bar{I}_{d_i}$, given the SGM estimated disparity map, $I_{d_i}$. Here, $\delta(x)$ is the Dirac delta function which has a singularity at x=0 and is zero for all other values of x. The above equation simply amount to an expression of the fact that, if the perturbation parameters w were known, then, given a disparity estimate $I_{d_i}$, the true disparity would be known to be $\bar{I}_{d_i} = f(w, I_{d_i}) + I_{d_i}$ (the value of $\bar{I}_{d_i}$ at which a singularity occurs in the delta function). This simply a way of encoding the definition of the perturbation function with a continuous variable w. Of course, the perturbation weights w are unknown—which is accounted for in the following by treating w as an unknown random variable.

Given the unknown probability density function over the disparity map, the posterior distribution over the perturbation parameters w, given training data, $P(w|\mathcal{D}_{train})$, is inferred in the manner described below.

As noted above, finding the covariance of the distribution representing the generative noise model, $P(\bar{I}_{d_i}|I_{d_i})$ is the primary main motivation for finding the posterior distribution over the weights, $P(w|\mathcal{D}_{train})$. Applying to the principles of Bayesian statistics, the generative noise model can be determined from the posterior distribution as follows:

$$P(\bar{I}_{d_i} | I_{d_i}) = \mathbb{E}_{P(w|\mathcal{D}_{train})}[P(\bar{I}_{d_i} | w, I_{d_i})] \qquad \text{Equation 10}$$

The posterior distribution is estimated using variational inference, which is an optimization-based sampling method. Variational inference is known per se. For example [1], which is incorporated herein by reference in its entirety, sets out the principles of variational inference in another context. Herein, those same general principles are applied to the problem of depth uncertainty training.

In order to determine a suitable likelihood function to be optimized by variational inference, first Bayes' law is applied to yield:

$$P(w|\mathcal{D}_{train}) = \frac{P(\mathcal{D}_{train}|w)P(w)}{P(\mathcal{D}_{train})} \qquad \text{Equation 11}$$

Independence of training examples is assumed to yield:

$$P(w|\mathcal{D}_{train}) = P(w) \prod_i \frac{P(I_{R_i}, I_{L_i}, I_{d_i} | w)}{P(I_{R_i}, I_{L_i}, I_{d_i})} \qquad \text{Equation 12}$$

$$= P(w) \prod_i \frac{P(I_{R_i} | w, I_{L_i}, I_{d_i})P(I_{L_i}, I_{d_i} | w)}{P(I_{R_i} | I_{L_i}, I_{d_i})P(I_{L_i}, I_{d_i})}$$

$$= P(w) \prod_i \frac{P(I_{R_i} | w, I_{L_i}, I_{d_i})}{P(I_{R_i} | I_{L_i}, I_{d_i})}$$

The second equality follows form the definition of conditional probability and the final equality follows from the independence of the perturbation weights w from the training examples (see above), i.e.:

$$P(I_{L_i}, I_{d_i} | w) = P(I_{L_i}, I_{d_i}) \qquad \text{Equation 13}$$

Or, to put it another way, knowledge of the perturbation weights does not provide any additional knowledge about the probability of the occurrence of $I_{L_i}$ and $I_{d_i}$ (absent knowledge of the right image).

Independence between training images by ensuring that the training set is composed of frames collected suitably far apart so the scene is sufficiently different. In practice, care should also be taken to ensure that a variety of weather conditions are present in the training data set.

Here, $P(I_{R_i}|I_{L_i},I_{d_i})$ is a marginal likelihood, which acts as a normalising constant in Equation 12, and $P(w)$ is a prior over w.

The likelihood function is obtained by reconstructing the right image from the left image, by resampling the left image using the disparity map. That is, for each training example, a reconstructed image is computed from the left image and the disparity map for comparison with the right image. The reconstructed image is denoted as:

$$\tilde{I}_{R_i}(I_{L_i}, I_{d_i}) \qquad \text{Equation 14}$$

Note that this operation is differentiable (see [15]).

The reconstructed right image can then be compared to the true right image to yield the likelihood function (log likelihood—the numerator in Equation 11):

$$\log P(I_{R_i} | w, I_{L_i}, I_{d_i}) = \frac{N_{pixels}}{N_{valid\ pixels}} \qquad \text{Equation 15}$$

$$\int \alpha\left(\left(\frac{SSIM(I_{R_i}, \tilde{I}_R(\bar{I}_{d_i}, I_{L_i}))}{2} - \frac{1}{2}\right) - \kappa |I_{R_i} - \tilde{I}_R(\bar{I}_{d_i}, I_{L_i})|\right)$$

$$P(\bar{I}_{d_i} | w, I_{d_i}) d\bar{I}_{d_i}$$

This is derived as follows. Applying the principles of Bayesian statistics:

$$P(I_{R_i} | w, I_{L_i}, I_{d_i}) = \mathbb{E}_{P(\bar{I}_{d_i}|w,I_{d_i})}[P(I_{R_i} | w, I_{L_i}, I_{d_i}, \bar{I}_{d_i})] \qquad \text{Equation 16}$$

$$= \int d\bar{I}_{d_i} P(\bar{I}_{d_i} | w, I_{d_i}) P(I_{R_i} | I_{L_i}, \bar{I}_{d_i})$$

$$= P(I_{R_i} | I_{L_i}, I_{d_i} + f(w, I_{d_i}))$$

In this context, the right image $I_{R_i}$ is treated as an unknown random variable for the purpose of the calculations. The simplification in the final line of Equation 16 is simply a reflection of the fact that, if the true disparity $\bar{I}_{d_i}$ is known and the left image $I_{L_i}$ is also known, the perturbation weights w and the estimated disparity map $I_{d_i}$ provide no additional information that is relevant to the probability of the right image $I_{R_i}$, hence:

$$P(I_{R_i} | w, I_{L_i}, I_{d_i}, \bar{I}_{d_i}) = P(I_{R_i} | I_{L_i}, \bar{I}_{d_i}) \qquad \text{Equation 17}$$

As assumption is then made that $\log P(I_{R_i}|I_{L_i},\bar{I}_{d_i})$ is proportional to (i) the structural similarity and (ii) the direct pixel similarity between $I_{R_i}$ and the reconstructed image $\tilde{I}_{R_i}(I_{L_i},\bar{I}_{d_i})$.

Here, SSIM represents the structural similarity operator between images, which is differentiable, and |•| represents the sum of absolute errors on an image (that image being formed of the pixel-wise difference values between the right image and the reconstructed image). The former captures the structural comparison of the images and the latter the direct pixel-wise comparison.

The term $N_{pixels}$ is the number of pixels in the image (e.g. 512×1120), $N_{valid\ pixels}$ is the number of valid, i.e. non-NaN pixels in the image (Not a Number pixels—which can occur in certain floating point systems and effectively represent "missing" pixels) and $\kappa$ and $\alpha$ are arbitrary positive constants (since the log likelihood must be negative). Note that not all pixels might be valid depending on the disparity estimation method: e.g. SGM only converges for a sub-set of all pixels.

SSIM (the Structural Similarity Index) is a known function for making a structural comparison of images. It is computed by comparing defined window regions within the images, as is known in the art.

Returning to Equation 15, it follows by integrating-out the delta function in Equation 9 that the likelihood function is given by:

$$\log P(I_{R_i} | w, I_{L_i}, I_{d_i}) = \frac{N_{pixels}}{N_{valid\ pixels}} \alpha \left( \left( \frac{SSIM(I_{R_i}, \tilde{I}_R(I_{d_i} + f(w, I_{d_i}), I_{L_i}))}{2} - \frac{1}{2} \right) - \kappa |I_{R_i} - \tilde{I}_R(I_{d_i} + f(w, I_{d_i}), I_{L_i})| \right)$$

Equation 18

Hence, the likelihood function can be evaluated algorithmically for any given training example $(I_{R_i}, I_{L_i}, I_{d_i})$ and any given value(s) of the perturbation weight(s) w as follows:
1. Determine a reconstructed image by:
   a. modifying the estimated disparity map $I_{d_i}$ based on the given value(s) of the perturbation weight(s) w, as $I_{d_i} + f(w, I_{d_i})$—i.e. by applying the perturbation function $f$ defined by the given weight value(s) to the estimated disparity map, and transforming the depth estimate according to the resultant perturbation map $f(w, I_{d_i})$;
   b. transforming the left image $I_{L_i}$ based on the modified disparity map to obtain the reconstructed image $\tilde{I}_R(I_{d_i} + f(w, I_{d_i}), I_{L_i})$.
2. Comparing the actual right image $I_{R_i}$ and the reconstructed image based on a combination of:
   a. a Direct pixel comparison; and
   b. a structural similarity comparison (e.g. SSIM).

Figure 8:
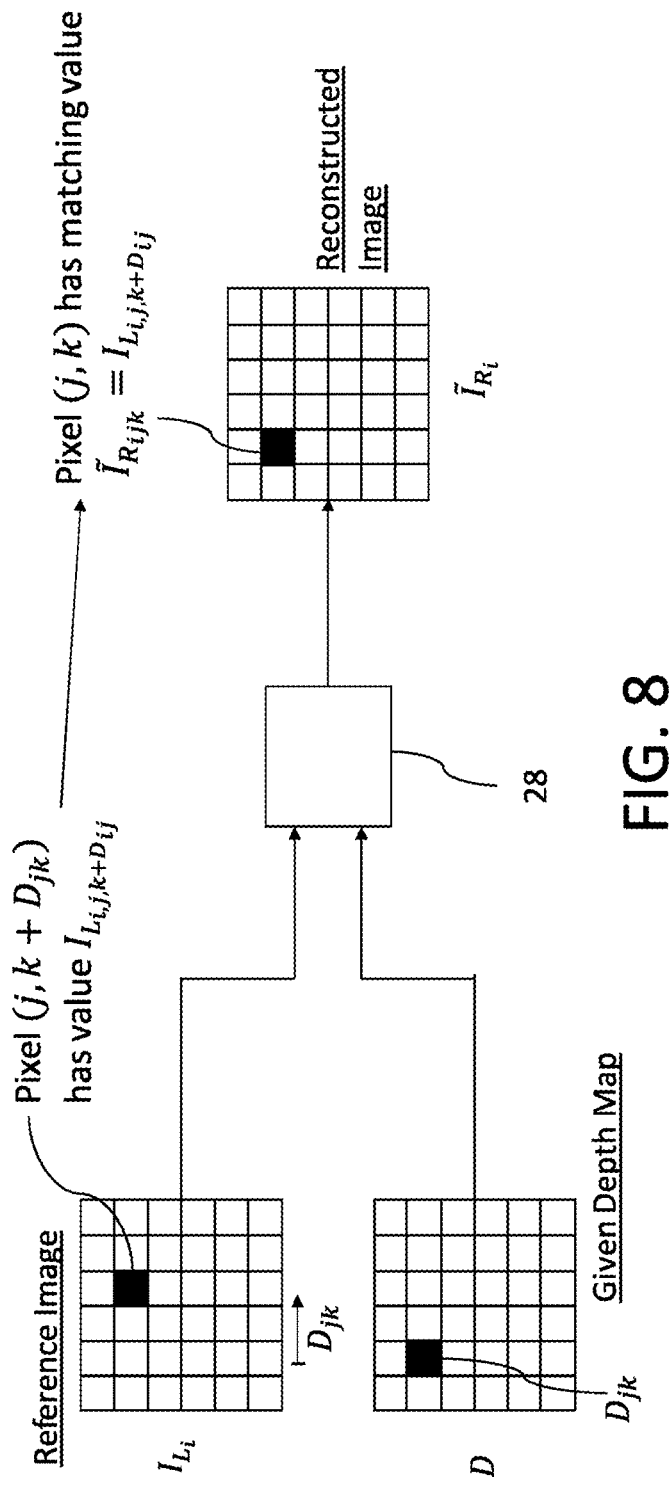
FIG. 8 shows a schematic function block diagram of an image reconstruction function.
Figure 9A:
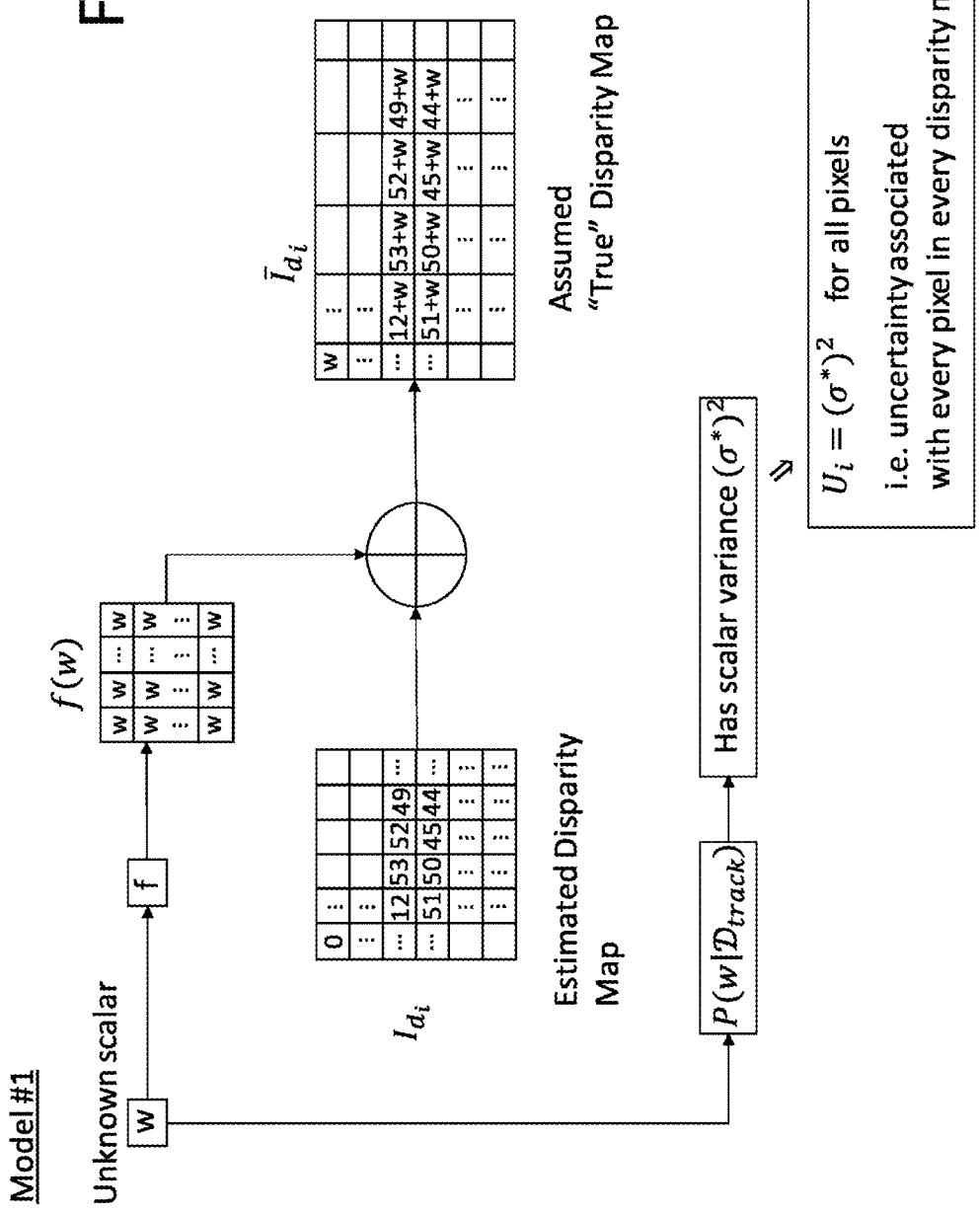
Figure 9B:
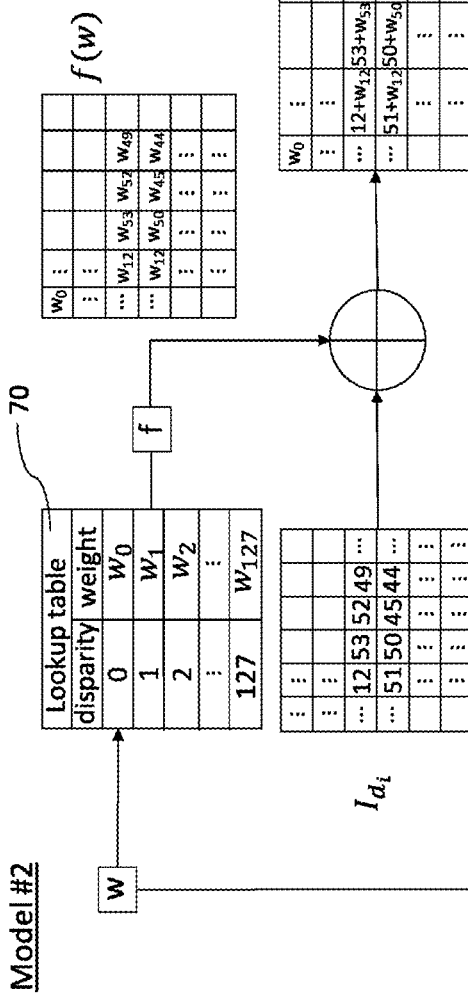
Figure 9B:
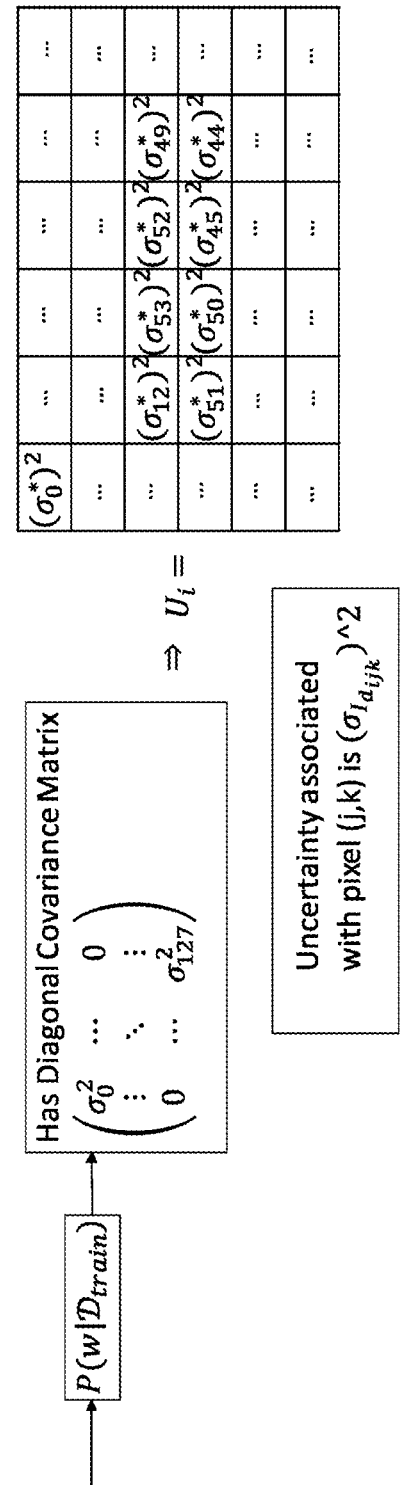
Figure 9D:
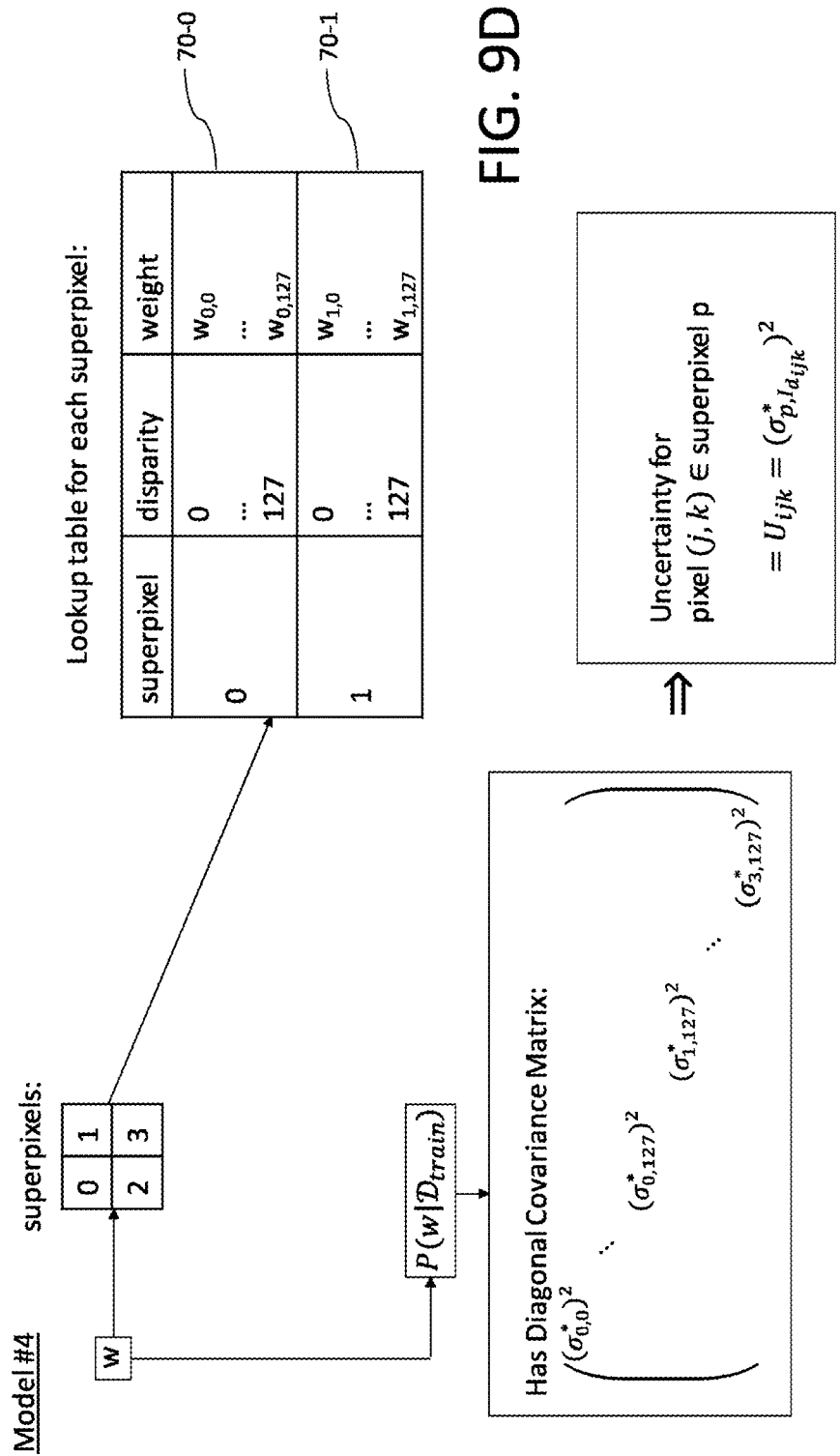

FIG. 8 illustrates the operation an image reconstruction function 28 which transform the left image $I_{L_i}$ based on a given disparity map D (which will be the modified disparity map at 1.b. above). Recall that the left image is taken as the reference image for the purpose of stereo depth extraction. Hence, according to a given disparity map D, pixel (j,k) in the right image $I_{R_i}$ corresponds to pixel $(j, k+D_{jk})$ in the left image $I_{L_i}$. To generate the reconstructed image, the image reconstruction function 28 simply sets the value of each pixel (j,k) in the reconstructed image $\tilde{I}_R$ to match the value of pixel $(j, k+D_{jk})$ in the left image $I_{L_i}$ where $D_{jk}$ is the value of pixel (j,k) in the given disparity map D, i.e. $\tilde{I}_{R_{ijk}} = I_{L_{ijk}+D_{jk}}$.

Perturbation Model Selection

In order to allow the above to serve as a basis for computations, a perturbation model is selected. The perturbation model is a parametric form for the disparity perturbation map, $f(w, I_{d_i})$. The following four models are considered by way of example.

Models 1 to 4 are described with reference to FIGS. 9A-D respectively. Additional details each model are shown in these Figures, and the description returns to those details later.

Model 1—"UM-Constant" (FIG. 9A): The simplest model: the same perturbation is applied to each pixel. This results in $P(w|\mathcal{D}_{train})$ being a probability distribution over the rank 0 tensor w, the value of which is added to each pixel of the disparity map to obtain the true disparity map, i.e.:

$$f(w, I_{d_i}) = w$$

where w is a scalar. In this case, the perturbation function depends only on the weights and the perturbation map is thus denoted $f(w)$. In practice, this can be implemented as a lookup table, to be used at run time, which has a single entry independent of pixel position and disparity.

Model 2—"UM-Disparity" (FIG. 9B): The perturbation applied to each pixel in the disparity map is a piecewise constant function of the disparity of the pixel, i.e.

$$f(w, I_{d_i})_{jk} = w_{I_{d_{ijk}}}.$$

This is achieved by letting the rank 1 tensor w parameterise a lookup table 70, such each pixel in the disparity map may be assigned to a bin which is associated with a constant perturbation. In other words, in practice, this means the lookup table used at run time has an entry for each disparity level (e.g. 256 entries for a disparity range of 256). A coarser version of this model could also be implemented with each perturbation weight associated with a subrange of the possible disparity values.

Model 3—"UM-Superpixel" (FIG. 9C): Here, w parameterises a superpixel model where local regions of the image are assigned different perturbations, so that the variance of the generative noise model, $P(\tilde{I}_d|I_{d_i})$, can be increased in certain sections of the image. This may be helpful if there is typically less contextual information available in certain sections of the image. This is similar to model 1, in that the perturbation function is independent of the actual disparity values, but allows different perturbation weight values to be applied to pixels in different superpixels. The perturbation function is $$f(w)_{jk} = w_{g(j,k)}$$

where g(j,k) is a map from pixel (j,k) to its superpixel. At runtime, the lookup table will have an entry for each superpixel.

Each superpixel may for example be 32×32 pixels in size. This is just an example, and superpixel regions can be any size, including 1×1 (i.e. the model could assign a perturbation weight to each individual pixel).

Model 4 (FIG. 9D): A combination of models 2 and 3. In this case, the perturbation applied to each pixels depends both on its disparity value and which superpixels it is contained within. In this case, a look-up table 70-p is defined for each superpixel p over all possible disparity values. There is still a simplifying constraint, namely that the same perturbation is applied to pixels in the same superpixel having the same disparity value.

All optimisable parameters are normalized by the maximum disparity value. If the pipeline for which uncertainty quantification is being performed has low confidence pixels removed, then these pixels are ignored when the image reconstruction is performed ($\tilde{I}_R(I_{d_i}, I_{L_i})$).

It is noted that other forms of perturbation function dependency may be incorporated to account for other sources of uncertainty. For example. the perturbation function may alternatively or additionally depend on one or more of the following factors:

image content; for example, the value of the perturbation function at pixel (j,k) may depend on a type of class of structure detected at that pixel, or some other object/structure recognition output associated with that pixel.

As a simple example, edge detection may be applied to determine if the pixel is part of an edge of a detected object. Introducing a dependency on edge classification allows the model to account for a possible higher level of uncertainty associated with edge pixels. More generally, this could depend on object or structure types/classes such as vehicle, pedestrian, road etc. Structure classes can be determined, for example, by applying structure/object recognition to some or all of the image.

lighting conditions, weather conditions or other environmental conditions as measured or otherwise determined at the time the relevant frame i was captured.

motion conditions—for example, the value of the perturbation function at pixel (j,k) may depend on a detected conditions associated with that pixel (e.g. whether the pixel belongs to a moving or static object, the speed/acceleration of the object etc.).

To facilitate this, different perturbation weights may be associated with different image/structure detection outputs, different environmental conditions, different motion detection outputs (just as, in models 2-4, different perturbation weights are associated with different depth values and/or different (super)pixel locations). In an online context, this translates into a dependence of estimated uncertainty on one or more of the above factors. To accommodate this, the lookup table is extended so that entries are provided for every possible combination of factors (e.g. as a simple example, model 2 or 3 could be extended to incorporate a dependence on a number of possible environmental conditions or structure classes, by providing a lookup table for each weather environmental or structure class in accordance with that model).

Prior

A spike and slab prior is used to parameterise an approximation of P(w), i.e. a mixture of two normal distributions where one has low variance and the other has high variance. This is justified by noting that although prior experience suggests that disparity matches for SGM are usually within a few pixels of the truth it is not impossible that the error could be larger, for example in the case of camera calibration issues. Specifically, the following is used:

$$P(w) = \frac{\mathcal{N}(0, \sigma_1^2) + \mathcal{N}(0, \sigma_2^2)}{2} \quad \text{Equation 19}$$

For models with low-dimensional w, it is feasible to sample the posterior distribution in Equation 12, with an MCMC sampler or similar. As hardware performance improves, this may also become viable for higher dimensionality w. Techniques based on MCMC sampling exist for likelihood functions where the gradient is not known, or where a simple proposal distribution will not suffice [16], which can also be applied in the present context.

Alternatively, in order to make inference tractable for higher-dimensionality models (at least given current hardware constraints), variational inference may be applied, which allows the gradient of the likelihood function to be used to speed up inference.

Variational Inference

As noted above, the posterior distribution $P(w|\mathcal{D}_{train})$ is approximated as a normal distribution given by Equation 7:

$$q(w|\sigma) = \mathcal{N}(w; 0, \sigma^2)$$

noting that w and $\sigma$ need not be scalars, in which case a normal distribution with diagonal covariance matrix $\sigma^2$ is used.

Note: $\mathcal{N}(w; 0, \sigma^2)$ may be written as $\mathcal{N}(0, \sigma^2)$ for simplicity below.

The training process attempts to minimise the Kullback-Leibler (KL) divergence between the approximation $q(w|\sigma)$ and the $P(w|\mathcal{D}_{train})$ to find $\sigma^*$—i.e. the uncertainty estimation parameter(s) that provide the best fit to the training data $\mathcal{D}_{train}$. This is equivalent to minimising the evidence lower bound (ELBO):

$$\sigma^* = \text{argmin}_\sigma KL[q(w|\sigma)||P(w)] - \mathbb{E}_{q(w|\sigma)}[logP(\mathcal{D}_{train}|w)] \quad \text{Equation 20}$$

where KL represents the Kullback-Leibler divergence. The KL divergence, also referred to as relative entropy, is a known function that quantifies the extent of difference between two distributions. $KL[q(w|\sigma)||P(w)]$ can be approximated as the difference between the cross entropy and entropy:

$$logq(w|a) - logP(w).$$

The likelihood term log $P(\mathcal{D}_{train}|W)$ is still expensive to evaluate, as the entire training dataset must be considered in each evaluation. Therefore, minibatch gradient descent is applied to Equation 20, to instead minimise the cost $$F_m = \frac{1}{M} KL[q(w|\sigma)||P(w)] - \mathbb{E}_{q(w|\sigma)}[logP(\mathcal{D}_m|w)] \quad \text{Equation 21}$$

where the training dataset $\mathcal{D}_{train}$ has been split into M equally sized minibatches, $\mathcal{D}_m$.

The expectation of the log likelihood on the proposal density, i.e.:

$$\mathbb{E}_{q(w|\sigma)}[logP(\mathcal{D}_m|w)]$$

is computed using Monte Carlo simulation (sampling) using the methodology disclosed in [1].

Within the simulation, log $P(\mathcal{D}_m|w)$ is evaluated for different combinations of perturbation weight values. Recalling the assumption of independent training examples:

$$\log P(\mathcal{D}_m|w) = \quad \text{Equation 22}$$
$$\log \prod_i P(I_{R_i}, I_{L_i}, I_{d_i}|w) = \sum_i \log P(I_{R_i}, I_{L_i}, I_{d_i}|w)$$

By definition:

$$P(I_{R_i}, I_{L_i}, I_{d_i}|w) = P(I_{R_i}|w, I_{L_i}, I_{d_i})P(I_{L_i}, I_{d_i}|w) = \quad \text{Equation 23}$$
$$P(I_{R_i}|w, I_{L_i}, I_{d_i})P(I_{L_i}, I_{d_i})$$

The final equality follows from Equation 13. Hence, Equation 22 becomes:

$$\log P(\mathcal{D}_m \mid w) = \sum_i \log P(I_{R_i} \mid w, I_{L_i}, I_{d_i}) + const.$$

with the likelihood function log $P(I_{R_i}|w, I_{L_i}, I_{d_i})$ being evaluated according to Equation 18. The constant term can be ignored in this optimization context as it has no effect on the optimization. Therefore, in order to perform the simulation, the likelihood function of Equation 18 is simply sampled (i.e. evaluated) for each of the training samples $(I_{R_i}, I_{L_i}, I_{d_i})$ using different perturbation weight values (and different combinations of perturbation weight values in the case of multiple perturbation weights). The value of the likelihood function for a given training example and a given perturbation weight value (scalar w)/combination of perturbation weight values (non-scalar w) is referred to herein as a "sampled value". By repeatedly sampling the likelihood function for different training examples and different (combinations of) weight values, a set of sampled values is obtained. And once a sufficiently large number of sampled values has been obtained, it can be used to estimate the expectation of the log likelihood on the proposal density, $\mathbb{E}_{q(w|\omega)}[\log P(\mathcal{D}_i|w)]$, for the a under consideration in the current iteration gradient descent iteration.

Determining Generative Noise Model

Having determined the uncertainty estimation parameter value(s) σ*, the generative nose model can be determined based on Equation 9 and Equation 10:

$$P(\bar{I}_{d_i} \mid I_{d_i}) = \mathbb{E}_{P(w|\mathcal{D}_{train})}[P(\bar{I}_{d_i} \mid w, I_{d_i})] = \qquad \text{Equation 24}$$
$$\int dw P(w \mid \mathcal{D}_{train}) P(\bar{I}_{d_i} \mid w, I_{d_i}) =$$
$$\int dw P(w \mid \mathcal{D}_{train}) \delta(\bar{I}_{d_i} - (f(w, I_{d_i}) + I_{d_i}))$$

In each of the perturbation models described above, it can be seen that the perturbation map satisfies:

$$f(w, I_{d_i})_{jk} \in w \, \forall \, j, k, I_{d_i} \qquad \text{Equation 25}$$

That is, each pixel of the perturbation map $f(w, I_{d_i})$ is equal to a single weight for each pixel (j,k) for any given disparity estimate $I_{d_i}$. Which of the weights it is equal to (if there are multiple weights) depends on the specifics of the perturbation model and, in some models, the disparity estimate $I_{d_i}$ itself.

This makes the evaluation of the integral of Equation 24 trivial because the delta function can simply be integrated-out. Hence, the covariance for each pixel is always one of the $σ^2$ from the approximating variational posterior, and the perturbation function $f$ defines which sigma is used for which pixel.

This significantly reduces the amount of computation that needs to be performed by the uncertainty estimator 4 at inference, because it means the covariance of the generative noise model $P(\bar{I}_{d_i}|I_{d_i})$ for pixel (j,k) is simply the covariance associated with the corresponding weight $$f(w, I_{d_i})_{jk}.$$

In other words, the uncertainty associated with pixel (j,k) is simply the covariance associated with the weight corresponding to that pixel.

Whilst the condition of Equation 25 makes the integral of Equation 24 trivial to evaluate, it is not an essential requirement, and more complex perturbation functions can be chosen, with the desired covariance being obtained by evaluating the integral in the final line of Equation 25.

Considering the four models detailed above, and referring again to FIGS. 9A-D:

Model 1 (FIG. 9A): the perturbation map associates every pixel with the same scalar weight w, hence the uncertainty associated with every weight is simply the determined scalar variance $(σ^*)^2$.

Model 2 (FIG. 9B): pixel (j,k) is associated with weight $$w_{I_{d_{ijk}}},$$

i.e. the weight having index $I_{d_{ijk}}$ in the lookup table. Hence the uncertainty associated with that pixel is the covariance of weight $$w_{I_{d_{ijk}}}$$

(i.e. the component of the diagonal covariance matrix $(σ^*)^2$ corresponding to weight $$w_{I_{d_{ijk}}}).$$

Model 3 (FIG. 9C): the uncertainty associated with each pixel is simply the covariance of the weight associated with the superpixel in which is contained.

Model 4 (FIG. 9D): for pixel (j,k) in super pixel p, the associated uncertainty is the covariance of weight $$w_{p, I_{d_{ijk}}};$$

that is, the weight having index $I_{d_{ijk}}$ in the lookup table associated with superpixel p.

Hyperparameters

The constants K and a in Equation 18 and $σ_1$ and $σ_2$ in Equation 19 are hyperparameters of the training process. Additional hyperparameters are given in Table 1. Some non-exhaustive example hyperparameter values are also given in Table 1 for perturbation models 1 to 3. Training and validation experiments have been conducted for these choices of hyperparameter for both stereo and mono depth extraction, as set out in further detail below.

TABLE 1

Hyperparameters of the learning model. $N_{mc}$ represents the number of Monte Carlo samples made from the variational approximation of the posterior to compute the log likelihood. Const, Disp and Super denoted models 1, 2 and 3 respectively.

| | Stereo SGM | | | Mono CNN | | |
|---|---|---|---|---|---|---|
| | Const | Disp | Super | Const | Disp | Super |
| Initial Learning Rate | 0.05 | 0.001 | 0.01 | 0.05 | 0.001 | 0.01 |
| Learning Rate Decay | 0.96 | 1 | 0.96 | 0.96 | 1 | 0.96 |
| Batch Size | 15 | 15 | 15 | 15 | 15 | 15 |
| $N_{mc}$ | 1 | 7 | 1 | 1 | 7 | 1 |
| $\alpha$ | $5 \times 10^{-8}$ | 1 | $10^{-4}$ | $5 \times 10^{-8}$ | 1 | $10^{-4}$ |
| $\kappa$ | 0.05 | 0.05 | 0.05 | 0.05 | 0.05 | 0.05 |
| $\sigma_1$ | 10 | 3 | 50 | 10 | 3 | 50 |
| $\sigma_2$ | 50 | 25 | 50 | 50 | 25 | 50 |
| $N_{epochs}$ | 15 | 25 | 1 | 15 | 40 | 1 |

In general, suitable values of the hyperparameter values may be found by manual experimentation, or through a full hyperparameter search. A full hyperparameter search could be conducted and may improve performance. The values used for the prior and likelihood hyperparameters may be scaled based on the validation data (both the held out stereo images, and LiDAR data). Adjusting hyperparameters in Bayesian methods is known as Empirical Bayes.

Validation with LiDAR

A validation dataset $\mathcal{D}_v = I_{L_i}, I_{R_i}, I_{d_i}, L_i)$ where $I_{L_i}, I_{R_i}$ are images captured by a vehicle from an instant in time when the vehicle is stationary, and which are captured almost simultaneously with a LiDAR scan $L_i$ (typically the time difference is approximately 0.05 seconds, which can be ignored). Using knowledge of the camera intrinsics from the camera calibration process, the LiDAR scan $L_i$ can be transformed and projected onto the right camera image plane to produce a ground truth for the right image aligned disparity map, which is denoted $I_{d_i^t}$. Note that since the LiDAR scans Li are sparse, the ground truth disparity map, $I_{d_i^t}$, will also be sparse.

The validation process comprises the following checks on the model.

The log likelihood of the models on the LiDAR data are computed and compared with the log likelihoods of the models on the held out training data (by computing the likelihood of the ground truth, given our inferred uncertainty model). In this case the data likelihood is simply the trained generative noise model $P(D|M) = P(\bar{I}_{d_i}|I_{d_i})$, with the projected lidar images playing the role of ground truth, $$\bar{I}_{d_i} = I_{d_i^t}.$$

Note that since there is no prior information on which model is correct, comparing the model likelihoods is equivalent to comparing the posterior model probabilities or computing Bayes factors for model comparison.

The squared normalised Euclidian distance is also evaluated at different disparities for the trained uncertainty model on the ground truth data, which effectively indicates where the uncertainty is overestimated, or under-estimated. If the uncertainty model is correctly calibrated then the mean standardised Squared Euclidian Distance should be approximately equal to 1, because the sum of squares of n is independent an identically distributed (i.i.d). $\mathcal{N}(0,1)$ random variables is distributed according to the $\chi^2$ distribution with mean n. Therefore, once the average is taken, it is expected to observe a mean standardised Squared Euclidian Distance equal to 1, provided the uncertainties are correctly calibrated.

Note that, in all checks, NaN pixels (resulting from sparsity) in the disparity maps being compared are ignored.

For the present purposes, the LiDAR should be well registered with the cameras. That is to say, the LiDAR and depth data need to be encoded in a common frame of reference, in order to allow a meaningful comparison. The raw data will generally not satisfy this condition, however bundle adjustment can be applied for this end. For example, the camera to Lidar registration process as set out in the following document can be applied for this purpose: Geiger et. al. "Automatic Camera and Range Sensor Calibration using a single Shot" http://citeseerx.ist.psu.edu/viewdoc/download?doi=10.1.1.471.130&rep=rep1&type=pdf.

Experiments
Outline

Experiments are performed on the KITTI depth evaluation benchmark [11, 40]. The depth has been turned into a disparity using the provided camera calibration. Results from the three methods set out above (i.e. uncertainty models 1-3) are compared with results obtained from using variational drop out [8]. Two disparity estimation are compared models as a first stage: a modified SGM pipeline described and a monocular CNN described, both described below. This also details how the uncertainty models are trained. Finally, the results from the trained models on the KITTI depth prediction evaluation [40] data set are compared.

The UMs detailed above were trained in TensorFlow Probability (formerly Edward), using the Adam Optimiser with exponential decay on the learning rate. Experiments were performed on a NVIDIA GeForce RTX 2080 Ti and all hyperparameters were optimised using 20% of the training data as validation set. The number of epochs ($N_{epochs}$), learning rate, learning rate decay constant and batch size were systematically optimised to improve the model performance. The UM Model hyperparameters $\sigma_1$, $\sigma_2$ were fitted based on physically understanding of the magnitude of typical errors. Searching around the chosen values showed the uncertainty models had low sensitivity to changes in these values. It was assumed that the validation metric changed monotonically in the hyper-parameters $\alpha$, $\kappa$, a range was then searched to determine the optimum values. Due to memory constraints, the maximum number of Monte Carlo samples $N_{mc}$ was 7. The lower the number of samples, the greater variance in the gradient, hence smaller numbers of samples require a smaller learning rate. Indeed, convergence may in some instances be successfully achieved with $N_{mc}=1$. The used hyper parameter values are shown in Table 1.

Stereo Disparity Estimation

For the first sert of results, disparity images are produced using a modified version of the Semi-Global Matching (SGM) algorithm. A census transform [18] is used to determine local matching costs rather than mutual information. Using a census transform gives a local cost that is more robust to radiometric error than using mutual information. The output of the stereo pipeline is a semi-dense disparity image.

Monocular Disparity Estimation

For the second set of results, disparity is predicted from monocular RGB images using the DeepLabv3+ [2] with MobileNetV2 [32] backend architecture. The softmax layer has been removed, in or-der to obtain a regression output. The disparity ground-truth was obtained by projecting the lidar depth according the KITTI camera calibration files into the sensor frame. Then the CNN was trained using the Adam optimiser [23] with the mean absolute error (MAE) as loss. The loss is only suffered on parts of the image where the sparse lidar ground-truth is available. In order to obtain the predictive uncertainty, Variational Dropout [8] was applied, following a similar approach as the disparity prediction in [22]. 50 dropout samples per image were obtained, and the predicted disparity mean and standard deviation statistics per pixel were calculated. The dropout rate was adjusted using a grid search on the KITTI validation set, in the interval [0.0, 0.9] with a step size of 0.1.

Results

Table 2 shows the disparity uncertainty prediction results, comparing the three models set out in Sec. 3.1 UM-Constant, UM-Disparity and UM-Superpixel, as well as Variational Dropout (VD) using various measures. The mean absolute error (MAE), the root mean squared error (RMSE), the negative log predictive density (NLPD), the mean predicted standard deviation (MSTD) and the run-time per frame in milliseconds (ms) are reported. MAE and RMSE are reported for completeness only and do not measure the uncertainty. The NLPD is a standard measure for predictive uncertainty [30] and is calculated as the negative log predicted density of a Gaussian $-\log \mathcal{N}(t;\mu,\sigma^2)$ per pixel, where t is the ground-truth disparity, $\mu$ is the predicted mean and a is the predicted standard deviation. Thus lower is better. It measures how well the predicted Gaussian fits the empirical errors. The MSTD is not a comparison metric, but shows the average magnitude of the predicted uncertain-ties. Each measure mean is calculated over the valid pixels in the disparity prediction method and the corresponding pixels in the ground-truth image.

As expected, the MAE and RMSE varies only for different disparity methods, since it does not take the uncertainty into account. The only exception is for VD, since the mean of the dropout samples can vary slightly from the point pre-diction without dropout. SGM performs better than CNN according the MAE, but worse regarding the RMSE. This indicates that SGM is more accurate in most cases, except for some outliers with larger magnitude. Of the SGM disparity uncertainties, the UM-Constant does best, but results are close. The UM-Disparity is a bit overconfident, as it predicts lower standard deviations on average. The UM-Disparity has the best results for all CNN predicted disparities, while VD is the worst. This is because VD underestimates the uncertainty, as shown by the lower MSTD.

Figure 10:
FIG. 10 shows an urban scene training example used for depth uncertainty training.
Figure 10:
Figure 10:
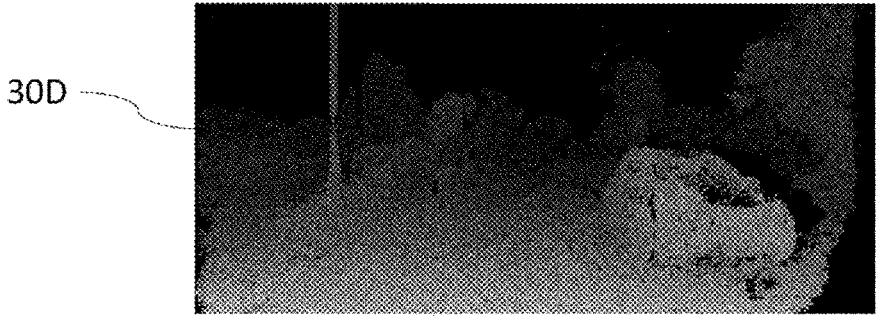
Figure 14:
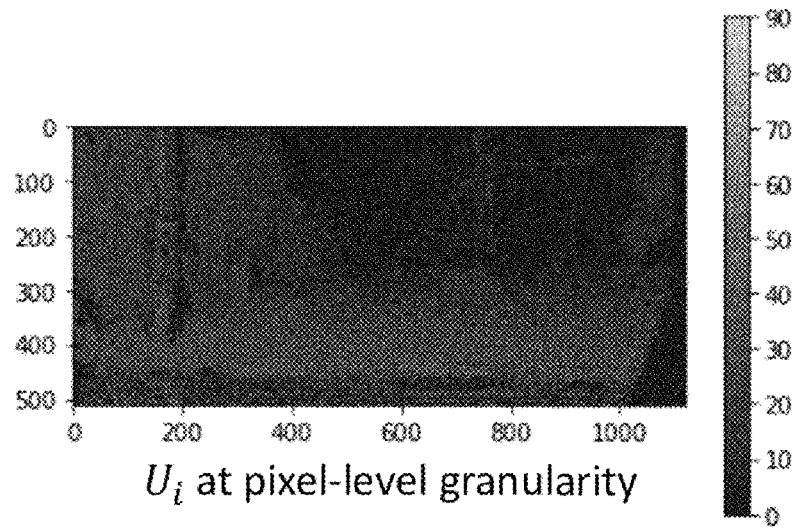
FIG. 14 shows standard deviation maps obtained for different perturbation models.
Figure 14:
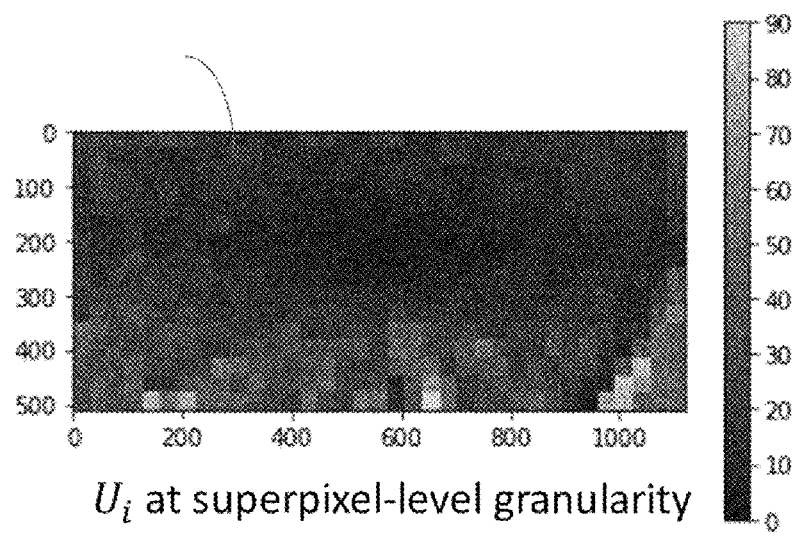

An example of the uncertainty map for models 2 and 3 is shown in FIG. 14, as applied to an urban scene shown in FIG. 10. Note that both models encode roughly the same information at a coarse level—that higher uncertainty should be assigned to larger disparities. However the UM-Superpixel possesses the ability to assign higher uncertainty for localized distortions, e.g. the unusually large variance in the lower right hand corner, which is due to the search space in this area of the image being artificially restricted, as pixels with low depths and consequently high disparities in the right image will fall outside of the field of view for the left image. Note that both maps seem to assign higher uncertainty to higher disparities, i.e. the foreground of the scene, which is in the bottom half of the map. However, the super-pixel map is far less detailed as it is effectively an average uncertainty over all scenes.

TABLE 2

Evaluation results on the KITTI selected set, comparing various disparity (stage-1) and uncertainty (stage-2) prediction methods. The mean absolute error (MAE), the root mean squared error (RMSE), the negative log predictive density (NLPD), the mean predicted standard deviation (MSTD) and the runtime per frame in milliseconds (ms) are measured.

| Stage-1 Disparity | Stage-2 Uncertainty | MAE | RMSE | NLPD | MSTD | Stage-1 Runtime | Stage-2 Runtime |
|---|---|---|---|---|---|---|---|
| Stereo SGM | UM-Constant | 2.28 | 8.16 | 3.62 | 8.66 | 36.57 | 0.20 |
| Stereo SGM | UM-Disparity | 2.28 | 8.16 | 3.11 | 9.99 | 36.57 | 7.65 |
| Stereo SGM | UM-Superpixel | 2.28 | 8.16 | 3.93 | 13.35 | 36.57 | 6.92 |
| Mono CNN | UM-Constant | 7.83 | 9.17 | 3.67 | 10.37 | 35.87 | 0.41 |
| Mono CNN | UM-Disparity | 7.83 | 9.27 | 3.84 | 8.96 | 35.87 | 7.52 |
| Mono CNN | UM-Superpixel | 7.83 | 9.27 | 3.74 | 10.41 | 35.87 | 6.97 |
| Mono CNN | VD | 7.84 | 9.28 | 10.63 | 5.40 | 35.87 | 2,629.94 |

FIG. 10 shows a particular training example for the purpose of illustration. This shows the left and right images and estimated disparity maps of a single training example, denoted by reference numerals 30L, 30R and 30D respectively.

Figure 11:
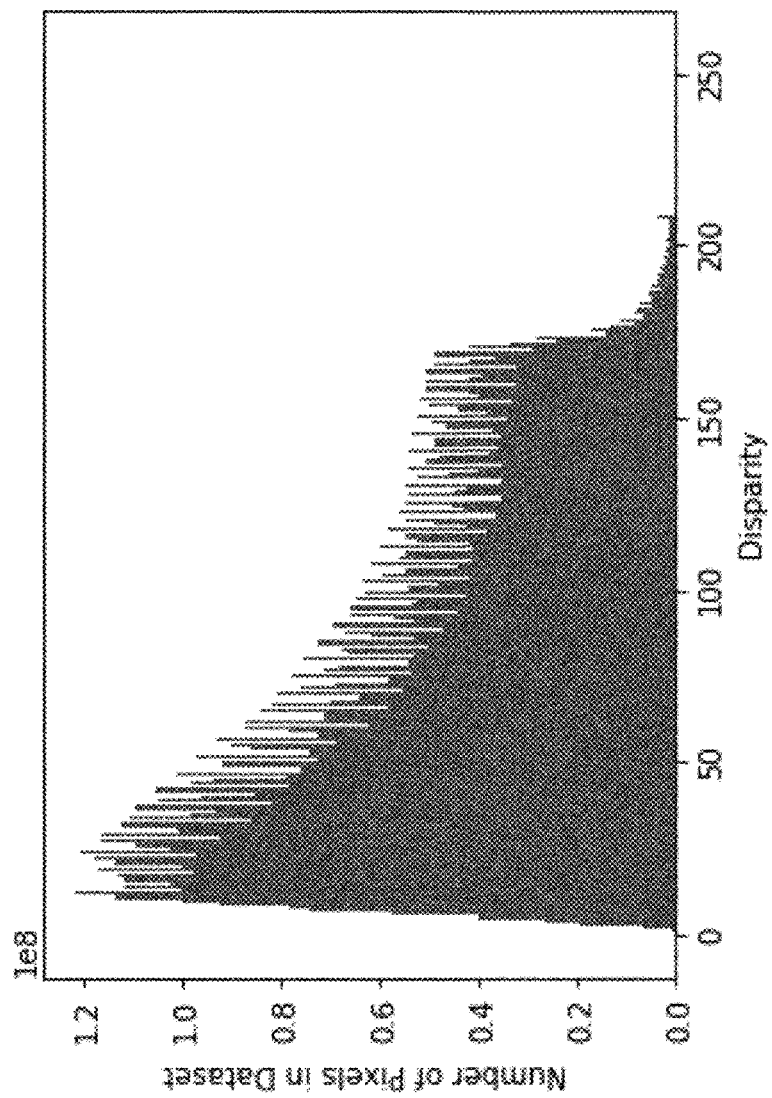
FIG. 11 shows a plot of total pixels per disparity in a training set.

A histogram of the reference stereo method pixel disparities across the whole training data set is shown in FIG. 11. That is, FIG. 11 shows, for each possible disparity value on the horizontal axis, the total number of pixels assigned that disparity across the whole training set (vertical axis). It can be seen that lower disparities are generally more common.

Figure 12:
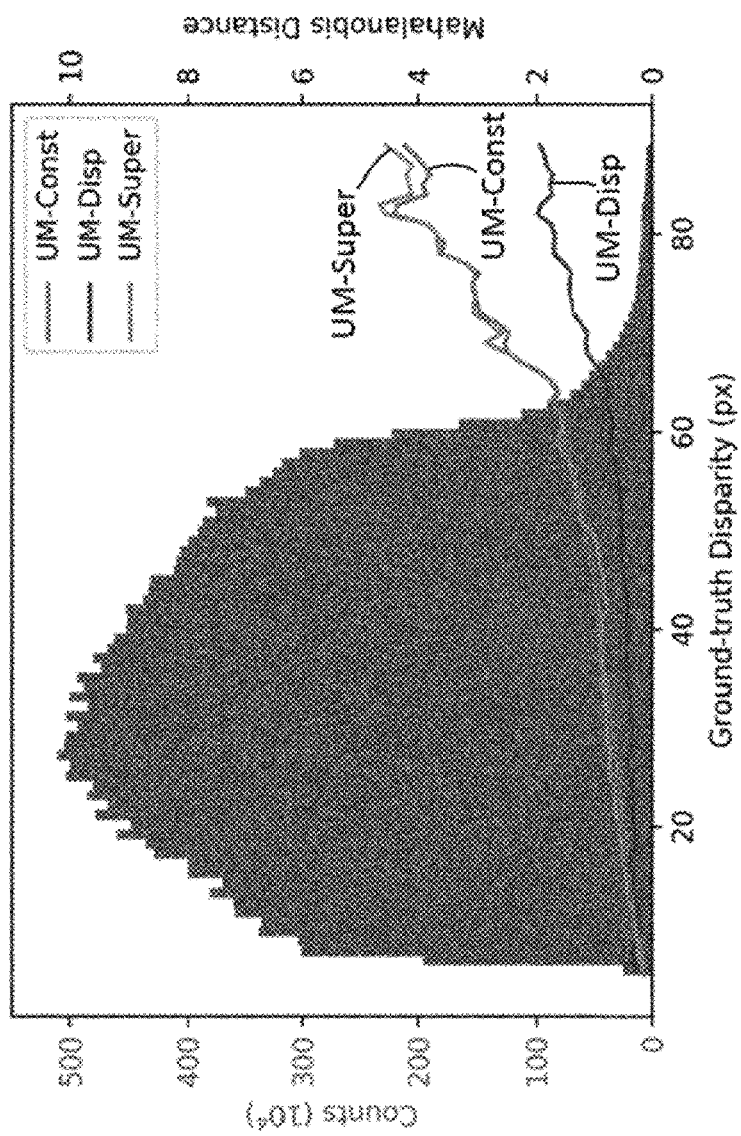
FIG. 12 shows experimental results for a disparity-based depth uncertainty model (model 2 below)
Figure 13:
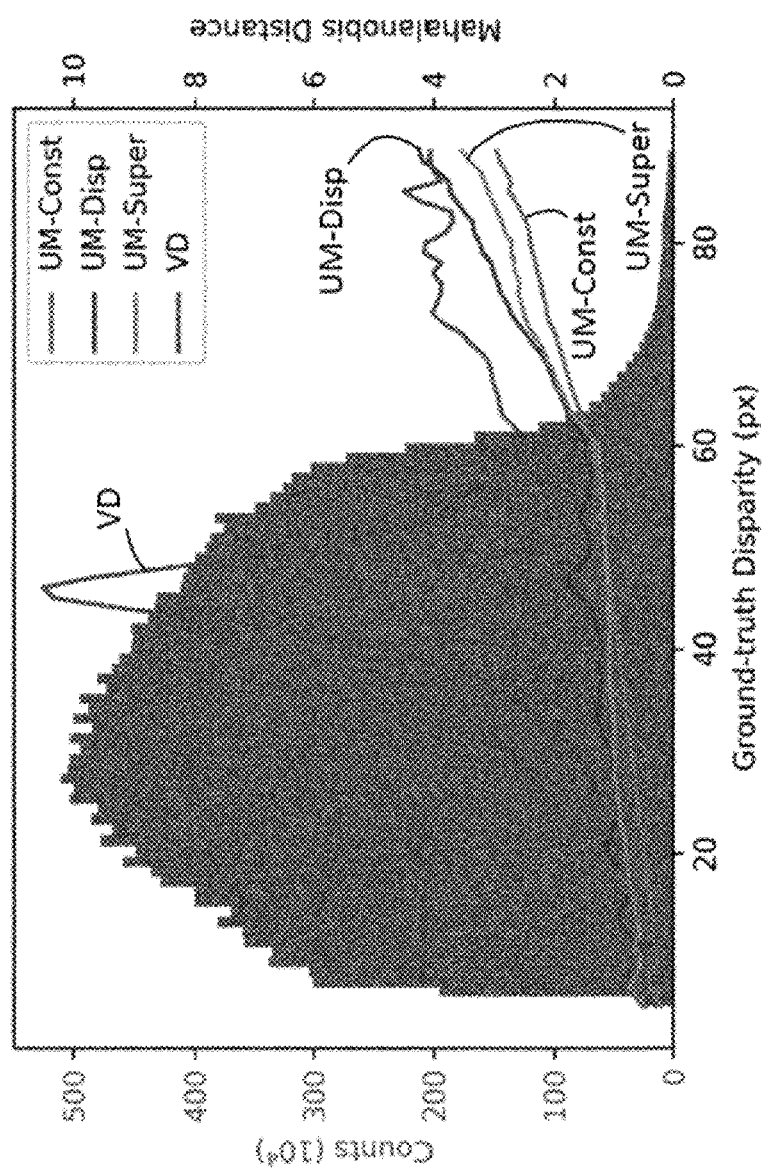
FIG. 13 shows experimental results for a super pixel-based uncertainty model (model 3 below)

FIGS. 12 and 13 show mean Mahalanobis distances (right y-axis) per ground-truth disparity bin for the different uncertainty models, evaluated on the KITTI validation set. In the background bin counts (left y-axis) are shown. FIG. 12 shows the results for stereo SGM and FIG. 13 shows the results for Mono CNN, FIGS. 12 and 13 plot a histogram of mean Mahalanobis distances (MD) per ground-truth disparity. The background shows the number of pixels in each disparity bin. Note that the MD is a relative measure of the error in relation to the standard deviation, i.e. a value of x means the error magnitude was x times the standard deviation. Thus an ideal uncertainty model would always have an MD error of 1, which means that the ground-truth is exactly 1 standard deviations away from the point prediction.

It is observed that the disparity distribution is skewed, with the majority lying in the range 5-50. The models is over-confident where les data is available and thus predicts a lower uncertainty despite larger errors, as indicated by the MD larger than 1. The UM-Constant model predicts a constant standard deviation, thus the MS histogram is equivalent to the normalized RMSE. As expected, the errors grow larger for increased disparity.

REFERENCES

Reference is made to the following, each of which is incorporated herein by reference in its entirety:

[1] C. Blundell, J. Cornebise, K. Kavukcuoglu, and D. Wierstra. Weight uncertainty in neural networks. arXiv preprint arXiv:1505.05424, 2015. 4, 5
[2] L.-C. Chen, Y. Zhu, G. Papandreou, F. Schroff, and Adam. Encoder-decoder with atrous separable convolution for semantic image segmentation. In ECCV, 2018. 2, 5
[8] Y. Gal and Z. Ghahramani. Dropout as a bayesian approximation: Representing model uncertainty in deep learning. In *international conference on machine learning*, pages 1050-1059, 2016. 2, 3, 5
[11] A. Geiger, P. Lenz, C. Stiller, and R. Urtasun. Vision meets robotics: The kitti dataset, *International Journal of Robotics Research* (IJRR), 2013, 2, 5
[15] C. Godard, O. Mac Aodha, and G. J. Brostow. Unsupervised monocular depth estimation with left-right consistency. CVPR, 2(6):7, 2017. 1, 2, 3, 4
[16] P. Green and S. Maskell. Estimating the parameters of dynamical systems from big data using sequential montecarlo samplers. Mechanical Systems and Signal Processing, 93:379-396, 2017. 5
[17] R. Haeusler, R. Nair, and D. Kondermann. Ensemble learn-ing for confidence measures in stereo vision. In *Proceed-ings of the IEEE Conference on Computer Vision and Pattern Recognition*, pages 305-312, 2013. 2, 3
[18] H. Hirschmuller. Stereo processing by semiglobal matching and mutual information. *IEEE Transactions on pattern analysis and machine intelligence*, 30(2):328-341, 2008, 2, 3
[22] A. Kendall and Y. Gal. What Uncertainties Do We Need in Bayesian Deep Learning for Computer Vision? In NIPS, pages 5574-558, 2017. 3, 5
[23] D. P. Kingma and J. Ba. Adam: A method of optimization. arXiv preprint arXiv:1412.6980, 2014. 5
[30] J. Quinonero-Candela, C. E. Rasmussen. Sinz, O. Bousquet and B. Schölkopf. Evaluating predictive uncertainty challenge. In *Machine Learning Challenges. Evaluating Predictive Uncertainty, Visual Object Class Recognising Tectual Entailment*, pages 1-27. Springer, 2006. 5
[32] M. Sandler, A. Howard, M. Zhu, A. Zhmoginov, an L.-C. Chen. Mobilenetv2, Inverted residuals and linear bottle-necks. In CVPR, 2018. 5
[40] J. Uhrig N. Schneider. L. Schneider, U. Frank T. Brox, and A. Geiger. Sparsity invariant cnns. In *International Conference on 3D Vision* (3DV), 2017. 2, 5

The invention claimed is:

1. A computer-implemented method of processing sensor data for perceiving structure in an environment, the method comprising performing, by a computer system:
   processing the sensor data to determine at least one probabilistic structure observation as an observed structure distribution, including executing a perception function for: receiving, as at least one input, a structure observation, and computing a perception output based on the at least one input;
   determining a set of input samples, each input sample comprising a simulated structure observation sampled based on the structure distribution;
   providing each input sample to the perception function to compute sampled perception outputs therefrom; and
   applying a statistical analysis to the sampled perception outputs, and thereby determining one or more uncertainty estimation parameters for estimating the uncertainty in perception outputs of the perception function, the statistical analysis comprising:
      fitting a distribution to at least some of the sampled perception outputs,
      determining an uncertainty estimate for the at least some sampled perception outputs based on the one or more uncertainty estimation parameters, the uncertainty estimate denoting a predicted distribution, and
      adapting the one of more uncertainty estimation parameters to minimize a difference between the fitted distribution and the predicted distribution.

2. The method of claim 1, wherein the processing step comprises processing at least a first portion of the sensor data to determine a first type of probabilistic structure observation as a first observed structure distribution, and processing at least a second portion of the sensor data to determine a second type of probabilistic structure observation as a second observed structure distribution; the perception function for: receiving, as first and a second inputs, structure observations of the first and second types respectively, and computing a perception output by combining the first and second inputs;
   wherein each input sample comprises a simulated structure observation of the first type and a simulated structure observation of the second type, as sampled based on the first and second observed structure distributions respectively.

3. The method of claim 2, wherein the first type of probabilistic structure observation is a probabilistic depth estimate and the second type of probabilistic structure observation is a probabilistic 2D object detection result.

4. The method of claim 1, wherein the perception function is a 3D object localization function.

5. The method of claim 1, wherein the or each probabilistic structure observation is determined by computing a deterministic structure observation and determining an uncertainty estimate for the deterministic structure observation, in a form of one or more distribution parameters of the observed structure distribution.

6. The method of claim 1, wherein the one or more uncertainty estimation parameters define an uncertainty estimation function for determining an uncertainty estimate based on one or more uncertainty source inputs.

7. The method of claim 6, wherein each of at least some of the sampled perception outputs denotes at least one detected object, and the one or more uncertainty source inputs comprise one or more detected object attributes.

8. The method of claim 7, wherein the one or more detected object attributes comprise at least one of: an object type; a measure of object occlusion; a depth of the detected object; a detected object coordinate comprising a position, orientation, and/or size coordinate; or an indication of object motion.

9. The method of claim 6, wherein the one or more uncertainty source inputs comprise:
   an uncertainty estimate provided for the input;
   a lighting, weather and/or other environmental condition; and/or
   pixel location information.

10. The method of claim 6, wherein the uncertainty estimation function outputs the uncertainty estimate in a form of a covariance or other uncertainty distribution parameter(s).

11. The method of claim 6, wherein the statistical analysis comprises:
   determining one or more uncertainty source inputs;
   determining the uncertainty estimate by applying the uncertainty estimation function to those one or more uncertainty source inputs.

12. The method of claim 1, wherein each of the at least some sampled perception outputs denote at least one detected object, and a distribution is fitted to each of those sampled perception outputs for each detected object.

13. The method of claim 1, wherein the input samples are determined by applying Monte Carlo sampling to the perception function based on the or each observed structure distribution.

14. The method of claim 1, wherein the sensor data comprises depth data and optical sensor data.

15. A processing system comprising:
   an input configured to receive sensor data for perceiving structure in an environment;
   a memory; and
   one or more processors configured to execute computer code stored in the memory which, when executed, causes the one or more processors to:
      process the sensor data to determine at least one probabilistic structure observation as an observed structure distribution, including executing a perception function for: receiving, as at least one input, a structure observation, and computing a perception output based on the at least one input;
      determine a set of input samples, each input sample comprising: a simulated structure observation sampled based on the structure distribution;
      provide each input sample to the perception function to compute a sampled perception output therefrom; and
      apply a statistical analysis to the sampled perception outputs, and thereby determine one or more uncertainty estimation parameters for estimating the uncertainty in perception outputs of the perception function, the statistical analysis comprising:
         fitting a distribution to at least some of the sampled perception outputs,
         determining an uncertainty estimate for the at least some sampled perception outputs based on the one or more uncertainty estimation parameters, the uncertainty estimate denoting at least one predicted distribution, and
         adapting the one of more uncertainty estimation parameters to minimize a difference between the fitted distribution and the predicted distribution.

16. The processing system of claim 15, wherein the computer code causes the one or more processors to:
   process the at least one structure observation input in a perception pipeline to compute the perception output:
   determine one or more uncertainty source inputs pertaining to the structure observation input, the one or more uncertainty source inputs comprising an uncertainty estimate provided for the structure observation input; and
   determine for the perception output an associated uncertainty estimate by applying the one or more uncertainty estimation parameters to the one or more uncertainty source inputs.

17. The processing system according to claim 15, embodied in an autonomous vehicle or other mobile robot.

18. The processing system according to claim 15, embodied in a simulator.

19. A computer program product comprising executable code embodied in a non-transitory computer-readable storage medium which is configured, when executed on one or more processors, to implement operations comprising:
   processing at least a first portion of sensor data to determine a first type of probabilistic structure observation as a first observed structure distribution;
   processing at least a second portion of sensor data to determine a second type of probabilistic structure observation as a second observed structure distribution;
   executing a perception function for: receiving, as first and second inputs, structure observations of the first and second types respectively, and computing a perception output by combining the first and second inputs;
   determining a set of input samples, each input sample comprising: a simulated structure observation of the first type sampled based on the first observed structure distribution, and a simulated structure observation of the second type sampled based on the second observed structure distribution;
   providing each input sample to the perception function to compute a sampled perception output therefrom; and
   applying a statistical analysis to the sampled perception outputs, and thereby determining one or more uncertainty estimation parameters for estimating the uncertainty in perception outputs of the perception function.

20. The computer program product of claim 19, wherein the first type of probabilistic structure observation is a probabilistic depth estimate and the second type of probabilistic structure observation is a probabilistic 2D object detection result.

* * * * *